(12) United States Patent
Kim et al.

(10) Patent No.: US 12,339,478 B2
(45) Date of Patent: Jun. 24, 2025

(54) SPECTRAL FILTER, AND IMAGE SENSOR AND ELECTRONIC DEVICE INCLUDING SPECTRAL FILTER

(71) Applicant: SAMSUNG ELECTRONICS CO., LTD., Suwon-si (KR)

(72) Inventors: Hyochul Kim, Yongin-si (KR); Younggeun Roh, Seoul (KR); Jaesoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 618 days.

(21) Appl. No.: 17/722,655

(22) Filed: Apr. 18, 2022

(65) Prior Publication Data

US 2022/0342130 A1    Oct. 27, 2022

(30) Foreign Application Priority Data

Apr. 22, 2021 (KR) .................. 10-2021-0052535
Mar. 11, 2022 (KR) .................. 10-2022-0030947

(51) Int. Cl.
*G02B 5/28* (2006.01)
*G02B 5/20* (2006.01)
(Continued)

(52) U.S. Cl.
CPC ........... *G02B 5/285* (2013.01); *H04N 25/131* (2023.01); *H04N 25/135* (2023.01)

(58) Field of Classification Search
CPC ........ G02B 5/201; G02B 5/285; G02B 5/288; G02B 5/284; G02B 5/28; G02B 5/22;
(Continued)

(56) References Cited

U.S. PATENT DOCUMENTS

| 7,071,566 B2 * | 7/2006 | Cole ................ H01L 31/02024 |
| | | 257/E31.115 |
| 7,999,934 B2 | 8/2011 | Naya et al. |

(Continued)

FOREIGN PATENT DOCUMENTS

| CN | 100463244 C | 2/2009 |
| JP | 6259155 B1 | 1/2018 |

(Continued)

OTHER PUBLICATIONS

Communication issued Oct. 31, 2023 by the Japanese Patent Office in Japanese Patent Application No. 2022-069375.

(Continued)

*Primary Examiner* — Mustak Choudhury
(74) *Attorney, Agent, or Firm* — Sughrue Mion, PLLC

(57) ABSTRACT

Provided is a spectral filter, and an image sensor and an electronic device each including the spectral filter. The spectral filter includes: at least one first filter having a central wavelength in a first wavelength region; and at least one second filter having a central wavelength in a second wavelength region. The first filter includes: a plurality of first metal reflection layers vertically spaced apart from each other; and at least one first cavity provided between the plurality of first metal reflection layers. The second filter includes: a second metal reflection layer and a Bragg reflection layer vertically spaced apart from each other; and at least one second cavity disposed between the second metal reflection layer and the Bragg reflection layer.

26 Claims, 42 Drawing Sheets

(51) Int. Cl.
*H04N 25/13* (2023.01)
*H04N 25/131* (2023.01)

(58) Field of Classification Search
CPC ........ G02B 3/0006; G02B 5/20; G02B 5/265;
G02B 26/00; G02B 5/282; G02B 1/02;
G02B 3/0037; H01L 27/14629; H01L
27/14621
See application file for complete search history.

(56) References Cited

U.S. PATENT DOCUMENTS

| | | | |
|---|---|---|---|
| 9,848,135 B2 * | 12/2017 | Geelen | G01J 3/2823 |
| 11,156,752 B2 | 10/2021 | Hwang et al. | |
| 2015/0144770 A1 | 5/2015 | Choi | |
| 2018/0340826 A1 * | 11/2018 | Scherer | G01J 3/108 |
| 2019/0004222 A1 * | 1/2019 | Hwang | G01J 3/12 |
| 2019/0187347 A1 | 6/2019 | Bilger et al. | |
| 2019/0198541 A1 | 6/2019 | Shinohara | |
| 2019/0297278 A1 | 9/2019 | Sumi et al. | |
| 2020/0109991 A1 | 4/2020 | Tack et al. | |
| 2020/0333518 A1 | 10/2020 | Takagi et al. | |
| 2021/0033466 A1 | 2/2021 | Kim et al. | |
| 2021/0148757 A1 | 5/2021 | Kim et al. | |
| 2021/0318171 A1 | 10/2021 | Inada et al. | |
| 2021/0318477 A1 | 10/2021 | Kim et al. | |
| 2022/0003906 A1 | 1/2022 | Kim et al. | |
| 2022/0065696 A1 | 3/2022 | Kim et al. | |
| 2022/0165992 A1 * | 5/2022 | Daskalakis | H10K 85/6572 |

FOREIGN PATENT DOCUMENTS

| | | | |
|---|---|---|---|
| JP | 2019-114642 A | | 7/2019 |
| JP | 2020-194129 A | | 12/2020 |
| JP | 2022-528689 A | | 6/2022 |
| KR | 10-1355898 B1 | | 1/2014 |
| KR | 10-2018-0015067 A | | 2/2018 |
| KR | 10-2019-0002615 A | | 1/2019 |
| KR | 10-2019-0100838 A | | 8/2019 |
| KR | 20190100838 A | * | 8/2019 |
| KR | 10-2019-0106646 A | | 9/2019 |
| KR | 10-2021-0014491 A | | 2/2021 |
| KR | 10-2021-0020469 A | | 2/2021 |
| KR | 10-2021-0125397 A | | 10/2021 |
| KR | 10-2022-0003955 A | | 1/2022 |
| WO | 2020/149056 A1 | | 7/2020 |
| WO | 2020/201633 A1 | | 10/2020 |

OTHER PUBLICATIONS

Office Action issued Sep. 10, 2024 by the Korean Patent Office for KR Patent Application No. 10-2022-0030947.
Communication dated Oct. 11, 2022 issued by the European Patent Office in European Patent Application No. 22169212.2.

* cited by examiner

| F1 (UV1) | F6 (B1) | F11 (B4) | F16 (G4) | F21 (G6) |
| F2 (UV2) | F7 (B2) | F12 (B5) | F17 (G5) | F22 (G7) |
| F3 (UV3) | F8 (B3) | F13 (R2) | F18 (R5) | F23 (NIR2) |
| F4 (G1) | F9 (G3) | F14 (R3) | F19 (R6) | F24 (NIR3) |
| F5 (G2) | F10 (R1) | F15 (R4) | F20 (NIR1) | F25 (NIR4) |

(a)

(b)

(c)

(d)

(e)

SPECTRAL FILTER, AND IMAGE SENSOR AND ELECTRONIC DEVICE INCLUDING SPECTRAL FILTER

CROSS-REFERENCE TO RELATED APPLICATIONS

This application is based on and claims priority under 35 U.S.C. § 119 to Korean Patent Application Nos. 10-2021-0052535, filed on Apr. 22, 2021 and 10-2022-0030947 filed on Mar. 11, 2022 in the Korean Intellectual Property Office, the disclosures of which are incorporated by reference herein in their entirety.

BACKGROUND

1. Field

The present disclosure relates to a spectral filter, and an image sensor and an electronic device each including the spectral filter.

2. Description of the Related Art

In related arts, image sensors classify wavelength bands into three sections, i.e., red (R), green (G), and blue (B); however, to improve color expression accuracy and object recognition performance, an image sensor with a spectral filter dividing wavelength bands into more sections needs to be developed. Existing spectral filters have been used for special-purpose cameras which include bulky and complex optical element parts, and research and development of technologies regarding an image sensor with a spectral filter integrated on a semiconductor chip is still ongoing.

SUMMARY

Provided are a spectral filter, and an image sensor and an electronic device each including the spectral filter.

Additional aspects will be set forth in part in the description which follows and, in part, will be apparent from the description, or may be learned by practice of the presented embodiments of the disclosure.

According to an aspect of an embodiment, a spectral filter includes: at least one first filter having a central wavelength in a first wavelength region; and at least one second filter having a central wavelength in a second wavelength region, wherein the first filter includes: a plurality of first metal reflection layers vertically spaced apart from each other; and at least one first cavity provided between the plurality of first metal reflection layers, and the second filter includes: a second metal reflection layer and a Bragg reflection layer vertically spaced apart from each other; and at least one second cavity disposed between the second metal reflection layer and the Bragg reflection layer.

The central wavelength in the first wavelength region may be shorter than the central wavelength in the second wavelength region. In such a case, the first metal reflection layer may include Al, Ag, Au, Ti, W, or TiN, and the second metal reflection layer may include Cu, Ag, Au, Ti, W, or TiN. The second metal reflection layer may further include poly-Si.

The first metal reflection layer and the second metal reflection layer may have a thickness of about 10 nm to about 80 nm.

The Bragg reflection layer may have a structure in which at least one first material layer and at least one second material layer, which have different refractive indexes, are alternately stacked.

The at least one first filter may constitute a first filter array including a plurality of first filters having different central wavelengths, and the at least one second filter may constitute a second filter array including a plurality of second filters having different central wavelengths.

The central wavelength of the first filter may be adjusted by changing a thickness or an effective refractive index of the first cavity, and the central wavelength of the second filter may be adjusted by changing a thickness or an effective refractive index of the second cavity.

The first filter may further include a first dielectric layer and a second dielectric layer disposed below and above the first cavity, respectively, and the second filter may further include a third dielectric layer and a fourth dielectric layer disposed below and above the second cavity, respectively.

Each of the first to fourth dielectric layers may have a single-layer or a multi-layer structure.

A thickness or an effective refractive index of each of the first and second dielectric layers may be adjusted according to a central wavelength of the first filter, and a thickness or an effective refractive index of each of the third and fourth dielectric layers may be adjusted according to a central wavelength of the second filter.

The spectral filter may further include a plurality of microlenses provided at the at least one first filter and the at least one second filter.

The spectral filter may further include a color filter disposed on the same plane as the at least one first filter and the at least one second filter.

The spectral filter may further include an additional filter provided at the at least one first filter and the at least one second filter and transmitting a particular wavelength band. The additional filter may include a color filter or a broadband filter.

A short-wavelength absorption filter may be provided at a part of the at least one first filter and the at least one second filter, and a long-wavelength cut-off filter may be provided another part of the at least one first filter and the at least one second filter.

According to an aspect of another embodiment, an image sensor includes: a spectral filter; and a pixel array receiving light transmitted through the spectral filter, wherein the spectral filter includes: at least one first filter having a central wavelength in a first wavelength region; and at least one second filter having a central wavelength in a second wavelength region, wherein the first filter includes: a plurality of first metal reflection layers vertically spaced apart from each other; and at least one first cavity provided between the plurality of first metal reflection layers, and the second filter includes: a second metal reflection layer and a Bragg reflection layer vertically spaced apart from each other; and at least one second cavity disposed between the second metal reflection layer and the Bragg reflection layer.

The pixel array may include a plurality of pixels, and each pixel may include a wiring layer including a driver circuit and a photodiode disposed at the wiring layer.

The central wavelength in the first wavelength region may be shorter than the central wavelength in the second wavelength region.

The Bragg reflection layer may have a structure in which at least one first material layer and at least one second material layer, which have different refractive indexes, are alternately stacked.

The at least one first filter may constitute a first filter array including a plurality of first filters having different central wavelengths, and the at least one second filter may constitute a second filter array including a plurality of second filters having different central wavelengths.

The central wavelength of the first filter may be adjusted by changing a thickness or an effective refractive index of the first cavity, and the central wavelength of the second filter may be adjusted by changing a thickness or an effective refractive index of the second cavity.

The first filter may further include a first dielectric layer and a second dielectric layer disposed below and above the first cavity, respectively, and the second filter may further include a third dielectric layer and a fourth dielectric layer disposed below and above the second cavity, respectively.

A thickness or an effective refractive index of each of the first and second dielectric layers may be adjusted according to a central wavelength of the first filter, and a thickness or an effective refractive index of each of the third and fourth dielectric layers may be adjusted according to a central wavelength of the second filter.

The spectral filter may further include a plurality of microlenses provided at the at least one first filter and the at least one second filter.

The spectral filter may further include a color filter disposed on the same plane as the at least one first filter and the at least one second filter.

The spectral filter may further include an additional filter provided at the at least one first filter and the at least one second filter and transmitting a particular wavelength band.

The image sensor may further include a timing controller, a row decoder, and an output circuit.

An electronic device includes the above-described image sensor.

The electronic device may include a mobile phone, a smartphone, a tablet, a smart tablet, a digital camera, a camcorder, a notebook computer, a television, a smart television, a smart refrigerator, a security camera, a robot, or a medical camera.

According to an aspect of yet another embodiment, disclosed is a spectral filter including: a first filter having a central wavelength in a first wavelength region; and a second filter having a central wavelength in a second wavelength region, wherein the first filter includes: two first metal reflection layers vertically spaced apart from each other; and a first cavity provided between the two first metal reflection layers, and the second filter includes: a second metal reflection layer and a Bragg reflection layer vertically spaced apart from each other; and a second cavity disposed between the second metal reflection layer and the Bragg reflection layer, wherein the second metal refection layer and the Bragg reflection layer are of different materials.

According to an aspect of one embodiment, An image sensor including: a spectral filter; and a pixel array receiving light transmitted through the spectral filter, wherein the spectral filter includes: a first filter having a central wavelength in a first wavelength region; and a second filter having a central wavelength in a second wavelength region, wherein the first filter includes: a plurality of first metal reflection layers vertically spaced apart from each other; and a first cavity provided between the plurality of first metal reflection layers, and the second filter includes: a second metal reflection layer and a Bragg reflection layer vertically spaced apart from each other; and a second cavity disposed between the second metal reflection layer and the Bragg reflection layer wherein the plurality of first metal reflection layers include Al, Ag, Au, Ti, W, or TiN, and the second metal reflection layer includes Cu, wherein the first filter further includes a first dielectric layer and a second dielectric layer disposed below and above the first cavity, respectively, and the second filter further includes a third dielectric layer and a fourth dielectric layer disposed below and above the second cavity, respectively, and wherein the central wavelength of the first filter is based on a thickness or an effective refractive index of each of the first and the second dielectric layers, and the central wavelength of the second filter is based on a thickness or an effective refractive index of each of the third and the fourth dielectric layers.

BRIEF DESCRIPTION OF THE DRAWINGS

The above and other aspects, features, and aspects of certain embodiments of the disclosure will be more apparent from the following description taken in conjunction with the accompanying drawings, in which:

FIG. 34 is a plan view of another example of a spectral filter applicable to the image sensor of FIG. 31;

DETAILED DESCRIPTION

Figure 1:
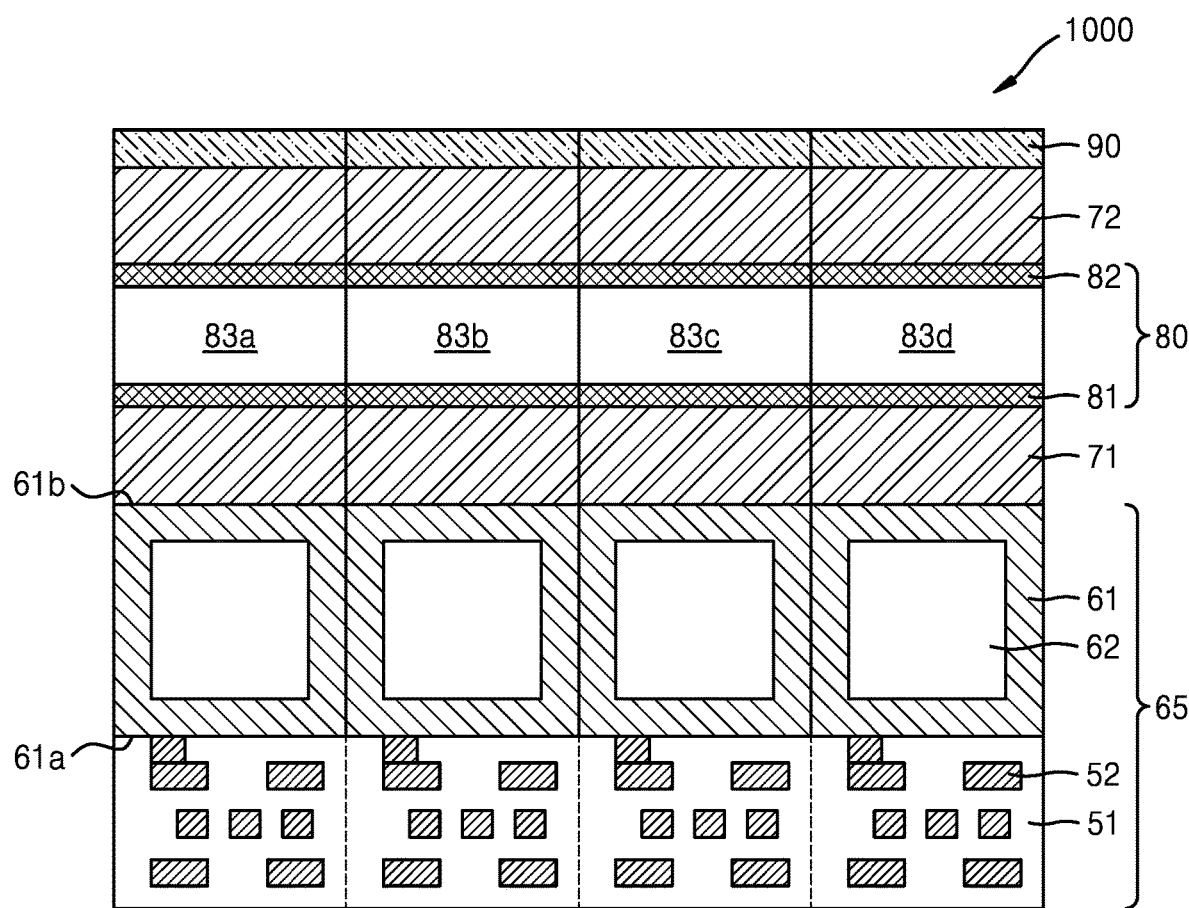
FIG. 1 is a schematic diagram of a cross-section of an image sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or variations thereof.

The use of the terms "a," "an," "the" and similar referents in the context of describing embodiments (especially in the context of the following claims) are to be construed to cover both the singular and the plural. The operations of all methods described herein can be performed in any suitable order unless otherwise indicated herein or otherwise clearly contradicted by context, and embodiments are not limited to the described order of the operations.

Moreover, the terms "part," "module," etc. refer to a unit processing at least one function or operation, and may be implemented by a hardware, a software, or a combination thereof.

The connecting lines or connectors shown in the various figures presented are intended to represent exemplary functional relationships and/or physical or logical couplings between the various elements, and thus it should be noted that many alternative or additional functional relationships, physical connections or logical connections may be present in a practical device.

The use of any and all examples, or exemplary language provided herein, is intended merely to better illuminate technical ideas and does not pose a limitation on the scope of embodiments unless otherwise claimed.

FIG. 1 is a schematic diagram of a cross-section of an image sensor 1000 according to an example embodiment. The image sensor 1000 of FIG. 1 may include, for example, a complementary metal oxide semiconductor (CMOS) image sensor or a charge-coupled device (CCD) image sensor.

With reference to FIG. 1, the image sensor 1000 may include a pixel array 65 and a resonator structure 80 disposed on the pixel array 65. The pixel array 65 may include a plurality of pixels disposed in a two-dimensional (2D) manner, and the resonator structure 80 may include a plurality of resonators disposed in correspondence with the plurality of pixels. FIG. 1 illustrates a case where the pixel array 65 includes four pixels, and the resonator structure 80 includes four resonators.

Each pixel of the pixel array 65 may include a photodiode 62, which is a photoelectric transformation element, and a driver circuit 52 to drive the photodiode 62. The photodiode 62 may be buried in a semiconductor substrate 61. The semiconductor substrate 61 may be, for example, a silicon substrate. However, the disclosure is not limited thereto. A wiring layer 51 may be disposed on a lower surface 61a of the semiconductor substrate 61, and the driver circuit 52, such as a metal oxide silicon field effect transistor (MOSFET), etc. may be disposed in the wiring layer 51.

The resonator structure 80 including a plurality of resonators may be disposed above the semiconductor substrate 61. Each resonator may be disposed to transmit light of a particular desired wavelength region. Each resonator may include a first reflection layer 81 and a second reflection layer 82, which are spaced apart from each other, and cavities 83a, 83b, 83c, and 83d disposed between the first reflection layer 81 and the second reflection layer 82. Each of the first reflection layer 81 and the second reflection layer 82 may include, for example, a metal reflection layer or a Bragg reflection layer. Each of the cavities 83a, 83b, 83c, and 83d may be disposed to cause resonance of light of a particular desired wavelength region.

A first functional layer 71 may be disposed between an upper surface 61b of the semiconductor substrate 61 and the resonator structure 80. The first functional layer 71 may improve a transmittance of light passing through the resonator structure 80 and incident towards the photodiode 62. To this end, the first functional layer 71 may include a dielectric layer or a dielectric pattern with adjusted refractive index.

A second functional layer 72 may be disposed on an upper surface of the resonator structure 80. The second functional layer 72 may improve a transmittance of light incident towards the resonator structure 80. To this end, the second functional layer 72 may include a dielectric layer or a dielectric pattern with adjusted refractive index. A third functional layer 90 may be further disposed on an upper surface of the second functional layer 72. The third functional layer 90 may include, for example, an anti-reflection layer, a condenser lens, a color filter, a short-wavelength absorption filter, a long-wavelength cut-off filter, etc. However, this is only an example.

At least one of the first to third functional layers 71, 72, and 90 may constitute a spectral filter described below together with the resonator structure 80. Hereinafter, a spectral filter according to an example embodiment is described in detail.

Figure 2:
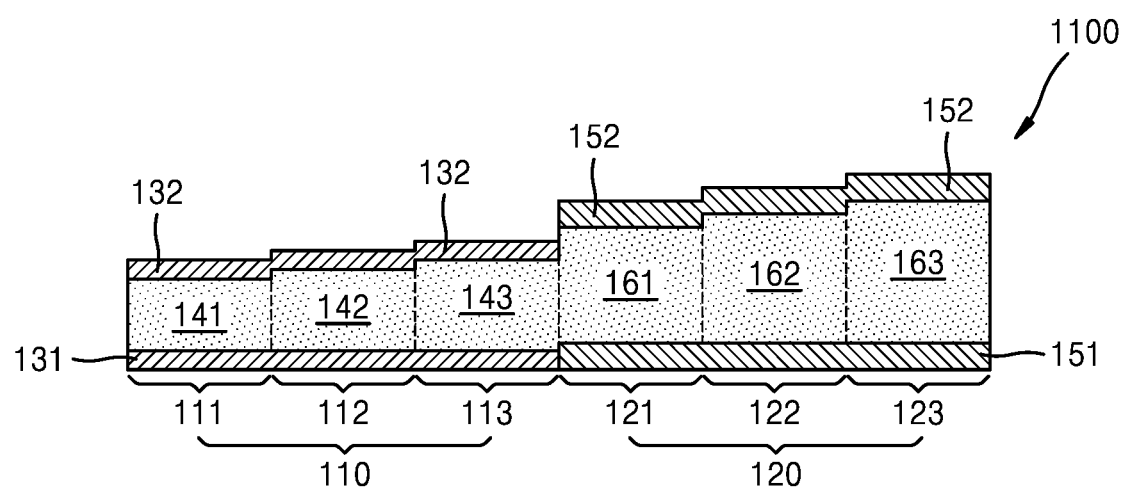
FIG. 2 is a cross-sectional view of a spectral filter according to an example embodiment.

FIG. 2 is a cross-sectional view of a spectral filter according to an example embodiment.

With reference to FIG. 2, a spectral filter 1100 may include a plurality of filters disposed in a 2D manner. FIG. 2 illustrates a cross-section of six filters (i.e., a first filter 111, a second filter 112, a third filter 113, a fourth filter 121, a fifth filter 122, and a sixth filter 123) as an example.

The spectral filter 1100 may include a first filter array 110 and a second filter array 120 disposed on a plane. Although the first and second filter arrays 110 and 120 may be disposed on substantially the same plane, the disclosure is not limited thereto. The first filter array 110 may include at least one filter having a central wavelength in a first wavelength region. The first wavelength region may range from, for example, about 250 nm to about 600 nm. However, this is merely exemplary, and the first wavelength region may also have various wavelength ranges according to a design consideration. FIG. 2 illustrates a case where the first filter array 110 includes the first to third filters 111, 112, and 113.

The second filter array 120 may include at least one filter having a central wavelength in a second wavelength region. The second wavelength region may be longer than the first wavelength region. For example, the second wavelength region may range from about 600 nm to about 1100 nm. However, this is merely exemplary, and the second wavelength region may also have various wavelength ranges according to a design consideration. FIG. 2 illustrates a case where the second filter array 120 includes the fourth to sixth filters 121, 122, and 123.

Although FIG. 2 illustrates that the first filter array 110 includes three filters (i.e., the first to third filters 111, 112, and 113) and the second filter array 120 includes three filters (i.e., the fourth to sixth filters 121, 122, and 123), such illustration is merely an example, and the number of filters constituting the first and second filter arrays 110 and 120 respectively may vary.

Each of the first to third filters 111, 112, and 113 constituting the first filter array 110 may transmit a particular central wavelength in the first wavelength region and have a Fabry-Perot structure in which a cavity (i.e., a first cavity 141, a second cavity 142, or a third cavity 143) is disposed between two first metal reflection layers 131 and 132 spaced apart from each other.

When light passes through the first metal reflection layers 131 and 132 and is incident onto the cavity 141, 142, or 143, the light may internally reflect in the cavity 141, 142, or 143 between the first metal reflection layers 131 and 132 during which a constructive interference and a destructive interference occur. The light having a particular central wavelength and satisfying a constructive interference condition may exit to the outside of a filter (i.e. the first filter 111, the second filter 112, or the third filter 113). A wavelength band and a central wavelength of the light passing through the filter 111,112, or 113 may be determined according to a reflection band of the first metal reflection layers 131 and 132 and the characteristic of the cavity 141, 142, or 143.

The first metal reflection layers 131 and 132 may include a first metal capable of reflecting light of the first wavelength region. For example, the first metal may include Al, Ag, Au, Ti, W, TiN, etc. However, the disclosure is not limited thereto. Although the first metal reflection layers 131 and 132 may have a thickness of tens of nanometers, this is merely exemplary. For example, the first metal reflection layers 131 and 132 may have a thickness of about 10 nm to about 80 nm. Specifically, the first metal reflection layers 131 and 132 may have a thickness of about 10 nm to about 30 nm.

The first to third cavities 141, 142, and 143 disposed between the first metal reflection layers 131 and 132 may include a dielectric material having a certain refractive index, as a resonant layer. For example, the first to third cavities 141, 142, and 143 may include silicon, silicon oxide, silicon nitride, hafnium oxide, or titanium oxide. However, the disclosure is not limited thereto.

The first to third filters 111, 112, and 113 may have different central wavelengths in the first wavelength region. To this end, the first filter 111, the second filter 112, and the third filter 113 may respectively include the first cavity 141, the second cavity 142, and the third cavity 143 having different thicknesses. FIG. 2 illustrates a case where the second cavity 142 is thicker than the first cavity 141, and the third cavity 143 is thicker than the second cavity 142. In this case, among the first to third filters 111, 112, and 113, the third filter 113 may have the longest central wavelength, and the first filter 111 may have the shortest central wavelength. Furthermore, some filters may have multiple central wavelengths according to a thickness of a cavity.

Each of the fourth to sixth filters 121, 122, and 123 constituting the second filter array 120 may transmit a particular central wavelength in the second wavelength region and have a Fabry-Perot structure in which a cavity (i.e., a fourth cavity 161, a fifth cavity 162, or a sixth cavity 163) are disposed between two second metal reflection layers 151 and 152 spaced apart from each other. A wavelength band and a central wavelength of the light passing through a filter (i.e. the fourth filter 121, the fifth filter 122, or the sixth filter 123) may be determined according to a reflection band of the second metal reflection layers 151 and 152 and the characteristic of the cavity 161, 162, or 163.

The second metal reflection layers 151 and 152 may include a second metal capable of reflecting light in the second wavelength region. For example, the second metal may include Cu, Ag, Au, Ti, W, Tin, etc. However, the disclosure is not limited thereto. The second metal reflection layers 151 and 152 may further include poly-Si in addition to the second metal. Although the second metal reflection layers 151 and 152 may have a thickness of tens of nanometers, this is merely exemplary. For example, the second metal reflection layers 151 and 152 may have a thickness of about 10 nm to about 80 nm. Specifically, the second metal reflection layers 151 and 152 may have a thickness of about 40 nm to about 50 nm.

The second metal constituting the second metal reflection layers 151 and 152 may be a metal different from the first metal constituting the first metal reflection layers 131 and 132 described above. For example, when the first metal reflection layers 131 and 132 include Al, the second metal reflection layers 151 and 152 may include Cu. Furthermore, for example, when the first metal reflection layers 131 and 132 include Al, the second metal reflection layers 151 and 152 may include Ag. Furthermore, for example, when the first metal reflection layers 131 and 132 include Ag, the second metal reflection layers 151 and 152 may include Cu.

The fourth to sixth cavities 161, 162, and 163 disposed between the second metal reflection layers 151 and 152 may include a dielectric material having a certain refractive index, as a resonant layer. For example, the fourth to sixth cavities 161, 162, and 163 may include silicon, silicon oxide, silicon nitride, hafnium oxide, or titanium oxide.

The fourth to sixth cavities 161, 162, and 163 disposed between the second metal reflection layers 151 and 152 may include the same material as the first to third cavities 141, 142, and 143 disposed between the first metal reflection layers 131 and 132. In this case, a thickness of the fourth to sixth cavities 161, 162, and 163 disposed between the second metal reflection layers 151 and 152 may be different than a thickness of the first to third cavities 141, 142, and 143 disposed between the first metal reflection layers 131 and 132. The fourth to sixth cavities 161, 162, and 163 disposed between the second metal reflection layers 151 and 152 may include a material different than a material included in the first to third cavities 141, 142, and 143 disposed between the first metal reflection layers 131 and 132.

The fourth to sixth filters 121, 122, and 123 may have different central wavelengths in the second wavelength region. To this end, the fourth filter 121, the fifth filter 122, and the sixth filter 123 may respectively include the fourth cavity 161, the fifth cavity 162, and the sixth cavity 163 having different thicknesses. FIG. 2 illustrates a case where the fifth cavity 162 is thicker than the fourth cavity 161, and the sixth cavity 163 is thicker than the fifth cavity 162. In this case, among the fourth to sixth filters 121, 122, and 123, the sixth filter 123 may have the longest central wavelength, and the fourth filter 121 may have the shortest central wavelength. Furthermore, some filters may have multiple central wavelengths according to a thickness of a cavity.

As described above, by arranging the first filter array 110 in which the first to third cavities 141, 142, and 143 are disposed between the first metal reflection layers 131 and 132 and the second filter array 120 in which the fourth to sixth cavities 161, 162, and 163 are disposed between the second metal reflection layers 151 and 152 on a plane, a spectral filter having characteristics of broadband including the first wavelength region and the second wavelength region (e.g., the wavelength range from ultraviolet light to near-infrared light) may be implemented.

Figure 3A:
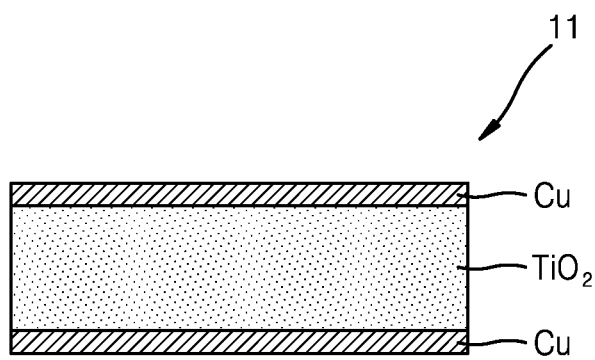
FIG. 3A is a diagram of a filter including a $TiO_2$ cavity between Cu reflection layers.
Figure 3B:
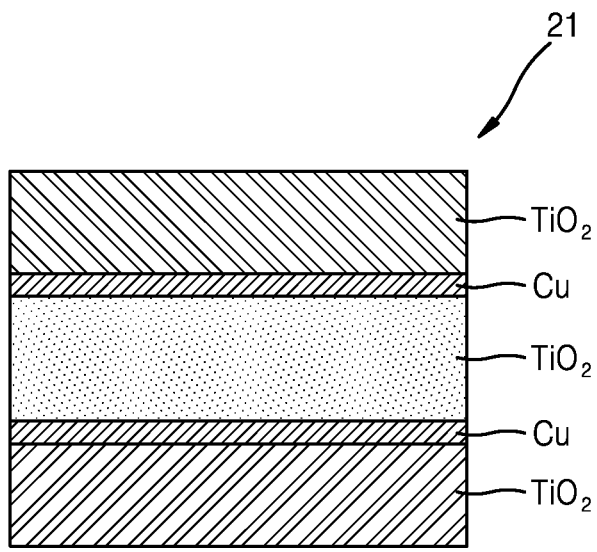
FIG. 3B is a diagram of a filter including $TiO_2$ dielectric layers respectively disposed above and below the structure of FIG. 3A.

FIG. 3A is a diagram of a filter 11 including a $TiO_2$ cavity between Cu reflection layers. FIG. 3B is a diagram of a filter 21 including $TiO_2$ dielectric layers respectively disposed above and below the structure of FIG. 3A.

Figure 4:
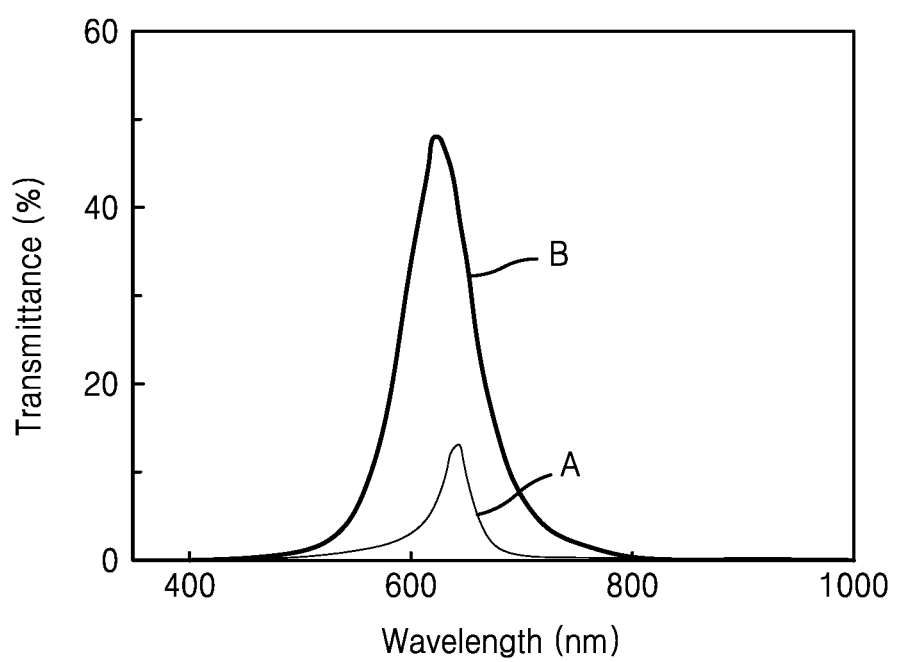
FIG. 4 illustrates transmission spectrums of the filter of FIG. 3A and the filter of FIG. 3B.

FIG. 4 illustrates transmission spectrums of the filter 11 of FIG. 3A and the filter 21 of FIG. 3B. In FIG. 4, "A" denotes transmission spectrums of the filter 11 of FIG. 3A, and "B" denotes transmission spectrums of the filter 21 of FIG. 3B. With reference to FIG. 4, the filter 21 of FIG. 3B has a higher transmittance than the filter 11 of FIG. 3A.

As such, by further arranging $TiO_2$ dielectric layers above and below the structure in which a $TiO_2$ cavity is disposed between Cu reflection layers, the filter 21 having an improved transmittance may be implemented. Here, a thickness of the $TiO_2$ dielectric layer may be adjusted according to a central wavelength of the filter 21.

Figure 5:
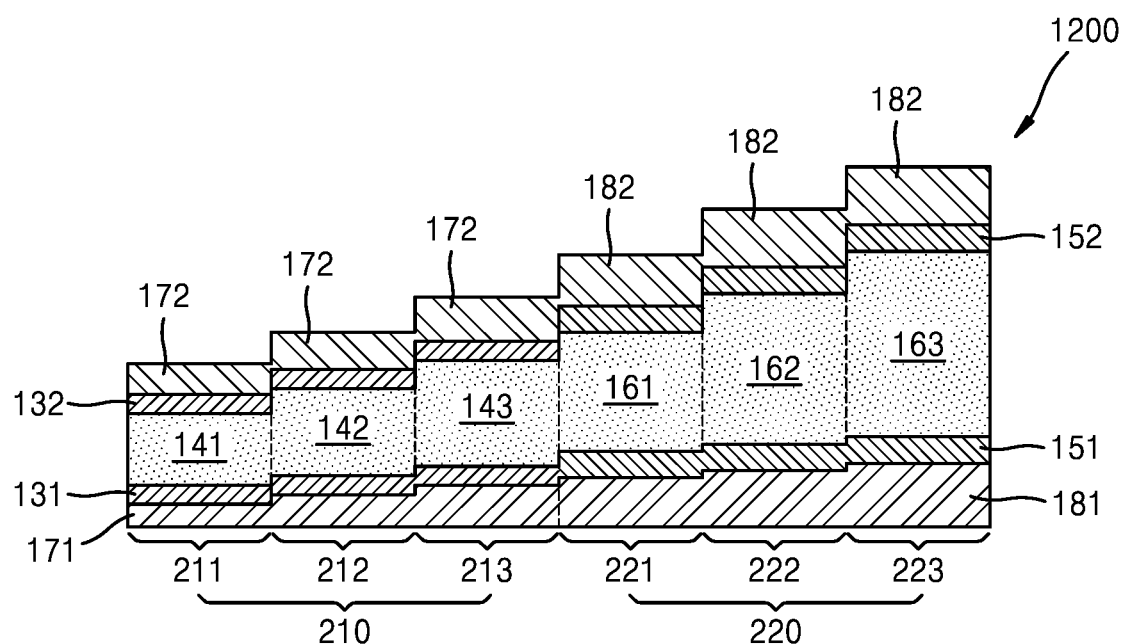
FIG. 5 is a schematic cross-sectional view of a spectral filter according to another example embodiment.

FIG. 5 is a schematic cross-sectional view of a spectral filter 1200 according to another example embodiment.

With reference to FIG. 5, a first filter array 210 may include a first filter 211, a second filter 212, and a third filter 213 having central wavelengths in the first wavelength region. A second filter array 220 may include a fourth filter 221, a fifth filter 222, a sixth filter 223 having central wavelengths in the second wavelength region.

Each of the first to third filters 211, 212, and 213 constituting the first filter array 210 may include two first metal reflection layers 131 and 132 spaced apart from each other, the cavity 141, 142, or 143 disposed between the first metal reflection layers 131 and 132, a first dielectric layer 171, and a second dielectric layer 172, which are respectively disposed below and above the cavity 141, 142, or 143. The first filter 211, the second filter 212, and the third filter 213 may respectively include the first cavity 141, the second cavity 142, and the third cavity 143, which have different thicknesses so that the first to third filters 211, 212, and 213 have different central wavelengths in the first wavelength region. The descriptions on the first metal reflection layers 131 and 132 and the first to third cavities 141, 142, and 143 are provided above.

The first dielectric layer 171 may be disposed below the first metal reflection layer 131, and the second dielectric layer 172 may be disposed above the first metal reflection layer 132. The first and second dielectric layers 171 and 172 may improve a transmittance of the first to third filters 211, 212, and 213. The first and second dielectric layers 171 and 172 may have a single-layer structure. Each of the first and second dielectric layers 171 and 172 may include, for example, titanium oxide, silicon nitride, hafnium oxide, silicon oxide, high index polymer, etc. However, the foregoing are provided only as examples.

A thickness of the first and second dielectric layers 171 and 172 may vary according to a central wavelength of the first to third filters 211, 212, and 213. FIG. 5 illustrates a case where the thickness of the first and second dielectric layers 171 and 172 increases as the central wavelength of the first to third filters 211, 212, and 213 increases. The thickness of each of the first and second dielectric layers 171 and 172 may be about 10 nm to 20000 nm; however, the present disclosure is not limited thereto.

Each of the fourth to sixth filters 221, 222, and 223 constituting the second filter array 220 may include two second metal reflection layers 151 and 152 spaced apart from each other, the cavity 161, 162, or 163 disposed between the second metal reflection layers 151 and 152, a third dielectric layer 181, and a fourth dielectric layer 182, which are respectively disposed below and above the cavity 161, 162, or 163. The fourth filter 221, the fifth filter 222, and the sixth filter 223 may respectively include the fourth cavity 161, the fifth cavity 162, and the sixth cavity 163, which have different thicknesses so that the fourth to sixth filters 221, 222, and 223 have different central wavelengths in the second wavelength region. The descriptions on the second metal reflection layers 151 and 152 and the fourth to sixth cavities 161, 162, and 163 are provided above.

The third dielectric layer 181 may be disposed below the second metal reflection layer 151, and the fourth dielectric layer 182 may be disposed above the second metal reflection layer 152. The third and fourth dielectric layers 181 and 182 may improve the transmittance of the fourth to sixth filters 221, 222, and 223. The third and fourth dielectric layers 181 and 182 may have a single-layer structure. Similar to the first and second dielectric layers 171 and 172 described above, each of the third and fourth dielectric layers 181 and 182 may include, for example, titanium oxide, silicon nitride, hafnium oxide, silicon oxide, high index polymer, etc.; however, the present disclosure is not limited thereto.

A thickness of the third and fourth dielectric layers 181 and 182 may vary according to a central wavelength of the fourth to sixth filters 221, 222, and 223. FIG. 5 illustrates a case where the thickness of the third and fourth dielectric layers 181 and 182 increases as the central wavelength of the fourth to sixth filters 221, 222, and 223 increases. The thickness of each of the third and fourth dielectric layers 181 and 182 may be about 10 nm to 20000 nm; however, the present disclosure is not limited thereto.

Figure 6:
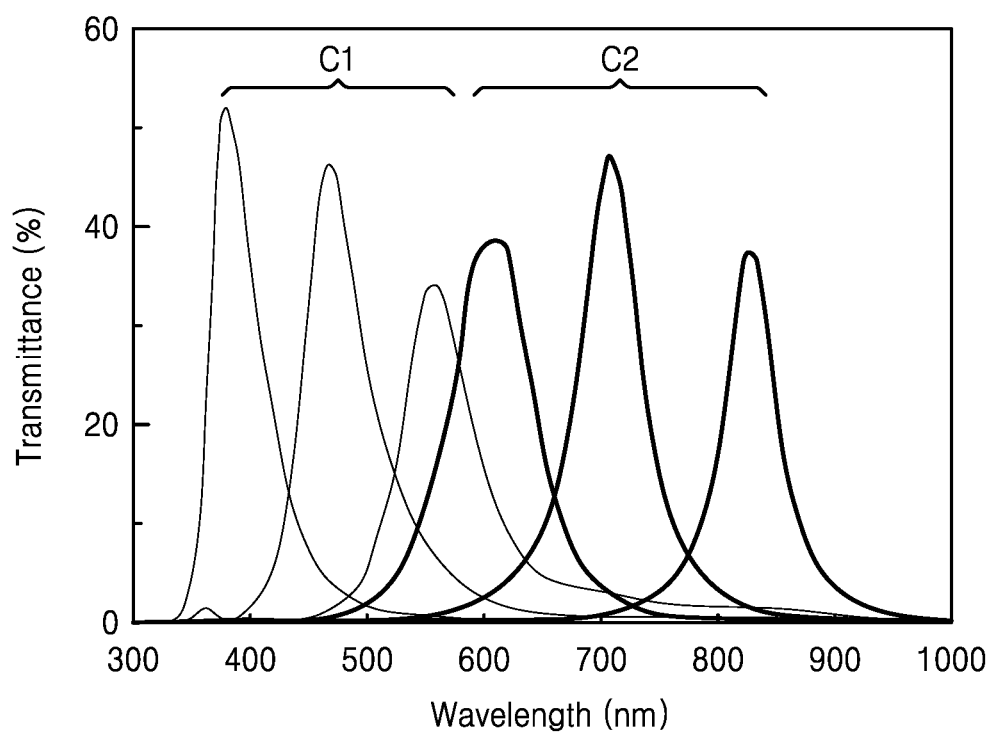
FIG. 6 illustrates transmission spectrums of the spectral filter of FIG. 5.

FIG. 6 illustrates transmission spectrums of the spectral filter 1200 of FIG. 5. Here, the first metal reflection layers 131 and 132 include Al, the second metal reflection layers 151 and 152 include Cu, and the first to sixth cavities 141, 142, 143, 161, 162, and 163 include $TiO_2$. The first to fourth dielectric layers 171, 172, 181, and 182 include $TiO_2$. In FIG. 6, "C1" denotes transmission spectrums of the first filter array 210, and "C2" denotes transmission spectrums of the second filter array 220.

Figure 7:
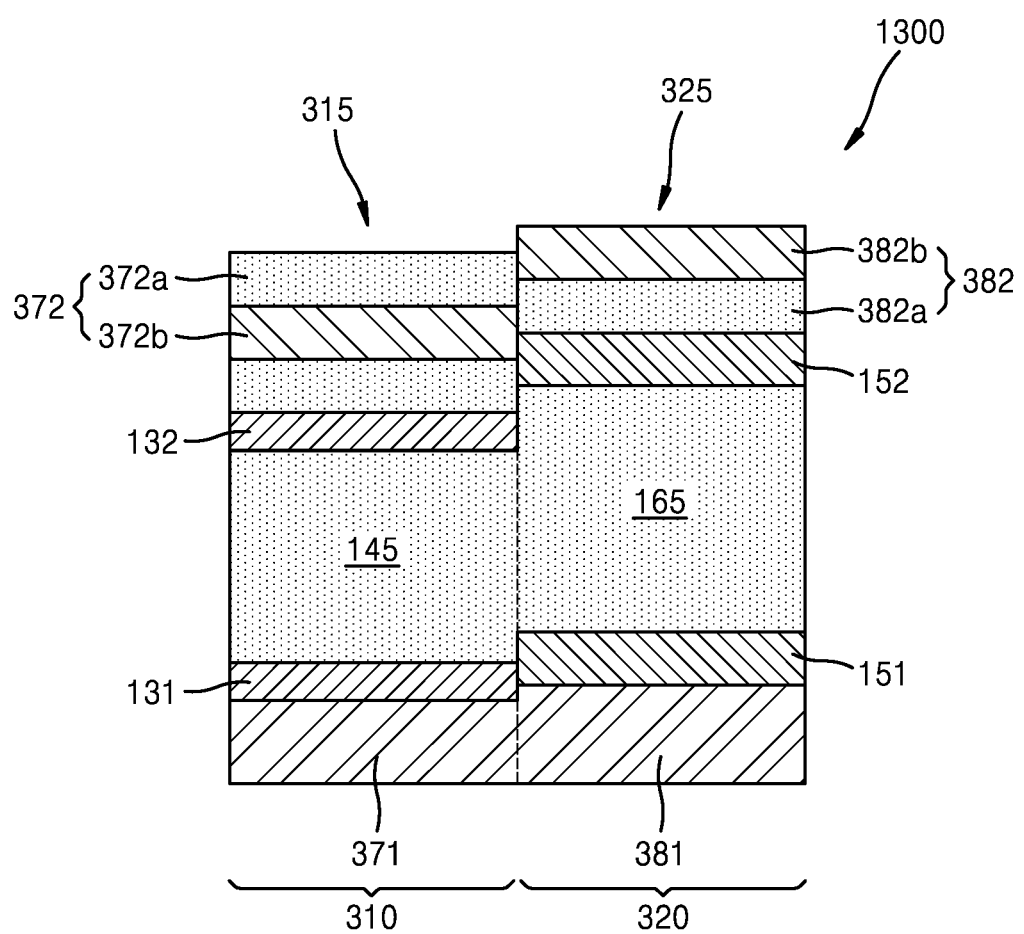
FIG. 7 is a schematic cross-sectional view of a spectral filter according to another example embodiment.

FIG. 7 is a schematic cross-sectional view of a spectral filter 1300 according to another example embodiment.

With reference to FIG. 7, a first filter array 310 may include at least one filter having a central wavelength in the first wavelength region. A second filter array 320 may include at least one filter having a central wavelength in the second wavelength region.

FIG. 7 illustrates a case where the first filter array 310 includes one filter (i.e., a first filter 315), and the second filter array 320 includes one filter (i.e., a second filter 325) for convenience. When each of the first and second filter arrays 310 and 320 includes a plurality of filters, the plurality of filters may include cavities having different thicknesses.

The first filter 315 constituting the first filter array 310 may include two first metal reflection layers 131 and 132 spaced apart from each other, a first cavity 145 disposed between the first metal reflection layers 131 and 132, a first dielectric layer 371, and a second dielectric layer 372 respectively disposed below and above the first cavity 145.

The first dielectric layer 371 may be disposed below the first metal reflection layer 131, and the second dielectric layer 372 may be disposed above the first metal reflection layer 132. Each of the first and second dielectric layers 371 and 372 may include titanium oxide, silicon nitride, hafnium oxide, silicon oxide, high index polymer, etc., but the disclosure is not limited thereto.

The first dielectric layer 371 may have a single-layer structure. However, the disclosure is not limited thereto, and the first dielectric layer 371 may also have a multi-layer structure. The second dielectric layer 372 may have the multi-layer structure. For example, the second dielectric layer 372 may have a structure in which a first material layer 372a and a second material layer 372b, which are different from each other, are alternately stacked. A thickness and number of material layers constituting the second dielectric layer 372 may be adjusted according to a central wavelength of the first filter 315. The second dielectric layer 372 may include three or more material layers which are different from each other.

The second filter 325 constituting the second filter array 320 may include two second metal reflection layers 151 and 152 spaced apart from each other, a second cavity 165 disposed between the second metal reflection layers 151 and 152, a third dielectric layer 381, and a fourth dielectric layer 382 respectively disposed below and above the second cavity 165.

The third dielectric layer 381 may be disposed below the second metal reflection layer 151, and the fourth dielectric layer 382 may be disposed above the second metal reflection layer 152. Similar to the first and second dielectric layers 371 and 372 described above, each of the third and fourth dielectric layers 381 and 382 may include, for example, titanium oxide, silicon nitride, hafnium oxide, silicon oxide, high index polymer, etc.; however, the present disclosure is not limited thereto.

The third dielectric layer 381 may have a single-layer structure or a multi-layer structure. The fourth dielectric layer 382 may have a multi-layer structure. For example, the fourth dielectric layer 382 may have a structure in which a first material layer 382a and a second material layer 382b, which are different from each other, are alternately stacked. A thickness and number of material layers constituting the fourth dielectric layer 382 may be adjusted according to a central wavelength of the second filter 325. The fourth dielectric layer 382 may include three or more material layers which are different from each other.

Figure 8:
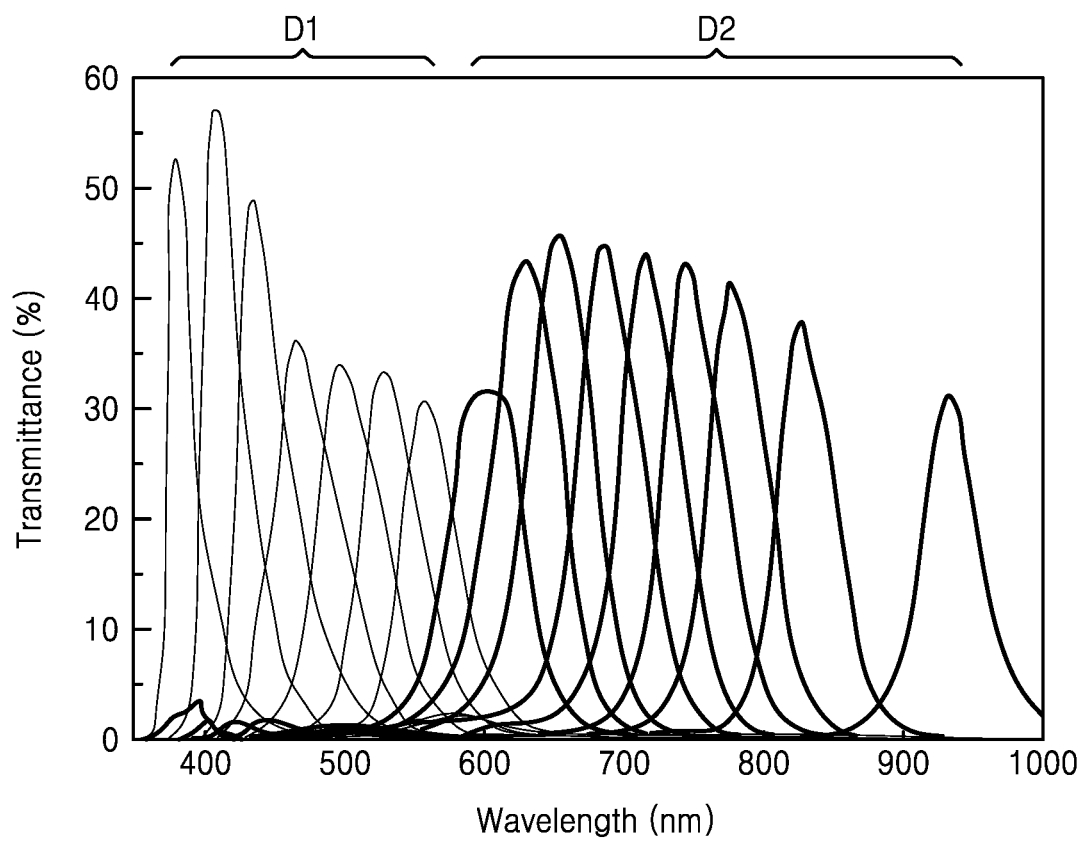
FIG. 8 illustrates transmission spectrums of the spectral filter of FIG. 7.

FIG. 8 illustrates transmission spectrums of the spectral filter 1300 of FIG. 7. FIG. 8 illustrates transmission spectrums in a case where, in the spectral filter 1300 of FIG. 7, the first filter array 310 includes seven filters having different central wavelengths, and the second filter array 320 includes nine filters having different central wavelengths.

The first metal reflection layers 131 and 132 may include Al, the second metal reflection layers 151 and 152 may include Cu, and the first and second cavities 145 and 165 may include a multi-layer film of $TiO_2$ and SiN. Each of the first and third dielectric layers 371 and 381 may include SiN, and each of the second and fourth dielectric layers 372 and 382 may include a multi-layer film of $TiO_2$ and SiN. In FIG. 8, "D1" denotes transmission spectrums of the first filter array 310, and "D2" denotes transmission spectrums of the second filter array 320. With reference to FIG. 8, the spectral filter 1300 may implement broadband characteristics and high transmittance.

Figure 9:
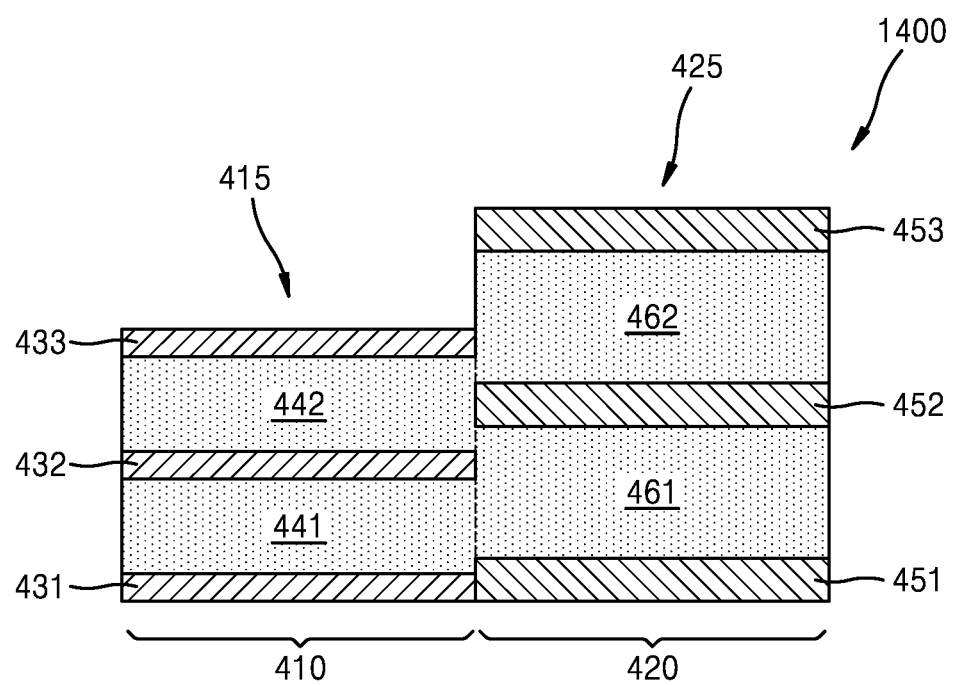
FIG. 9 is a schematic cross-sectional view of a spectral filter according to another example embodiment.

FIG. 9 is a schematic cross-sectional view of a spectral filter 1400 according to another example embodiment. FIG. 9 illustrates a case where a first filter array 410 includes one filter (i.e., a first filter 415), and a second filter array 420 includes one filter (i.e., a second filter 425) for convenience.

The first filter 415 constituting the first filter array 410 may include three first metal reflection layers 431, 432, and 433 spaced apart from each other and two first cavities 441 and 442 disposed between the first metal reflection layers 431, 432, and 433.

The first metal reflection layers 431, 432, and 433 may include a first metal capable of reflecting light of the first wavelength region. The first cavities 441 and 442 may include, for example, a dielectric material such as silicon, silicon oxide, silicon nitride, hafnium oxide, titanium oxide, etc.

The second filter 425 constituting the second filter array 420 may include three second metal reflection layers 451, 452, and 453 spaced apart from each other and two second cavities 461 and 462 disposed between the second metal reflection layers 451, 452, and 453.

The second metal reflection layers 451, 452, and 453 may include a second metal capable of absorbing light of the second wavelength region. The second cavities 461 and 462 may include, for example, a dielectric material such as silicon, silicon oxide, silicon nitride, hafnium oxide, titanium oxide, etc.

Although the foregoing embodiments describe a case where the first filter 415 includes two cavities (i.e., the first cavities 441 and 442), and the second filter 425 includes two cavities (i.e., the second cavities 461 and 462), each of the first and second filters 415 and 425 may also include three or more cavities. Furthermore, although the foregoing embodiments describe a case where both of the first and second filters 415 and 425 have a multi-cavity structure, one of the first and second filters 415 and 425 may have a single-cavity structure, and the other one may have a multi-cavity structure.

Figure 10:
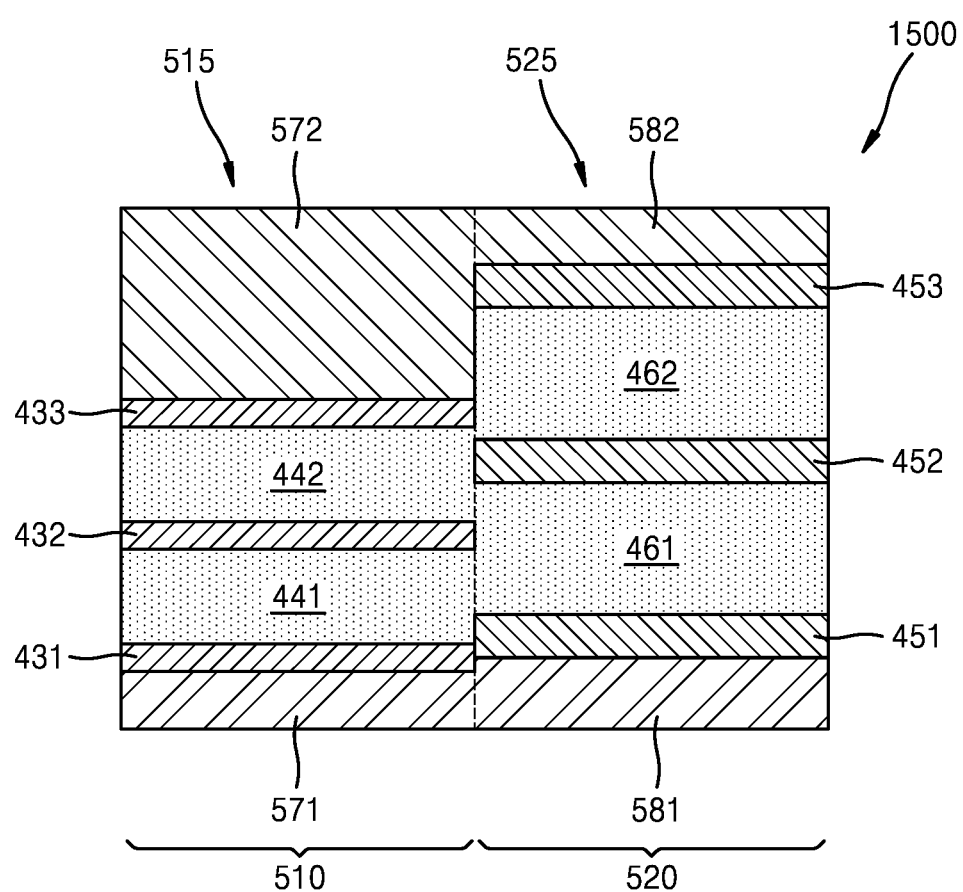
FIG. 10 is a schematic cross-sectional view of a spectral filter according to another example embodiment.

FIG. 10 is a schematic cross-sectional view of a spectral filter 1500 according to another example embodiment. FIG. 10 illustrates a case where a first filter array 510 includes one filter (i.e., a first filter 515), and a second filter array 520 includes one filter (i.e., a second filter 525) for convenience.

With reference to FIG. 10, the first filter 515 constituting the first filter array 510 may include three first metal reflection layers 431, 432, and 433 spaced apart from each other, two first cavities 441 and 442 disposed between the first metal reflection layers 431, 432, and 433, a first dielectric layer 571, and a second dielectric layer 572 respectively disposed below and above the first cavities 441 and 442. The descriptions on the first metal reflection layers 431, 432, and 433 and the first cavities 441 and 442 are provided above.

The first dielectric layer 571 may be disposed below the first metal reflection layer 431, and the second dielectric layer 572 may be disposed above the first metal reflection layer 433. The first and second dielectric layers 571 and 572 may improve the transmittance and have a single-layer or multi-layer structure. Each of the first and second dielectric layers 571 and 572 may include, for example, titanium oxide, silicon nitride, hafnium oxide, silicon oxide, high index polymer, etc., but the disclosure is not limited thereto.

The second filter 525 constituting the second filter array 520 may include three second metal reflection layers 451, 452, and 453 spaced apart from each other, two second cavities 461 and 462 disposed between the second metal reflection layers 451, 452, and 453, a third dielectric layer 581, and a fourth dielectric layer 582 respectively disposed below and above the second cavities 461 and 462. The descriptions on the second metal reflection layers 451, 452, and 453 and the second cavities 461 and 462 are provided above.

The third dielectric layer 581 may be disposed below the second metal reflection layer 451, and the fourth dielectric layer 582 may be disposed above the second metal reflection layer 453. The third and fourth dielectric layers 581 and 582 may have a single-layer or a multi-layer structure, and may include, for example, titanium oxide, silicon nitride, hafnium oxide, silicon oxide, high index polymer, etc., but the disclosure is not limited thereto.

Figure 11:
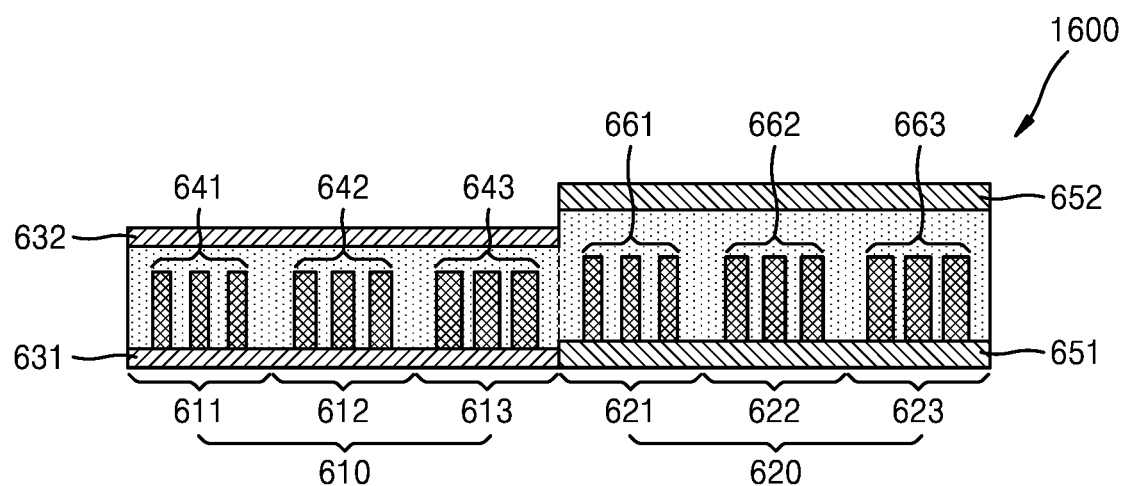
FIG. 11 is a schematic cross-sectional view of a spectral filter according to another example embodiment.

FIG. 11 is a schematic cross-sectional view of a spectral filter 1600 according to another example embodiment.

With reference to FIG. 11, a first filter array 610 may include at least one filter having a central wavelength in the first wavelength region, and a second filter array 620 may include at least one filter having a central wavelength in the second wavelength region. FIG. 11 illustrates a case where the first filter array 610 includes a first filter 611, a second filter 612, and a third filter 613, and the second filter array 620 includes a fourth filter 621, a fifth filter 622, and a sixth filter 623.

Each of the first to third filters 611, 612, and 613 constituting the first filter array 610 may include two first metal reflection layers 631 and 632 spaced apart from each other and a cavity (i.e., a first cavity 641, a second cavity 642, or a third cavity 643) disposed between the first metal reflection layers 631 and 632. The description on the first metal reflection layers 631 and 632 is provided above, and thus any redundant description thereon is omitted.

The first to third filters 611, 612, and 613 may have different central wavelengths in the first wavelength region. To this end, the first filter 611, the second filter 612, and the third filter 613 may respectively include the first cavity 641, the second cavity 642, and the third cavity 643 having different effective refractive indexes. Each of the first to third cavities 641, 642, and 643 may include a first material layer and at least one second material layer disposed in the first material layer and having a refractive index different than that of the first material layer.

FIG. 11 illustrates a case where each of the first to third cavities 641, 642, and 643 includes a first material layer and a plurality of second material layers disposed side by side in the first material layer and perpendicular to the first metal reflection layer 631. FIG. 11 illustrates a case where the second material layer has a mesa structure. However, the disclosure is not limited thereto, and the second material layer may be connected to the first metal reflection layers 631 and 632 disposed thereabove and therebelow through, for example, the Damascene process. Here, each of the first and second material layers may include, for example, silicon, silicon oxide, silicon nitride, titanium oxide, etc. Specifically, the first material layer may include silicon oxide, and the second material layer may include titanium oxide.

The first to third cavities 641, 642, and 643 may change an effective refractive index based on a width of the second material layer. FIG. 11 illustrates a case where the second material layer has a width increasing from the first cavity 641 towards the third cavity 643. In this case, among the first to third cavities 641, 642, and 643, the third cavity 643 may have the greatest effective refractive index, and the first cavity 641 may have the least effective refractive index. Among the first to third filters 611, 612, and 613, the third filter 613 may have the longest central wavelength, and the first filter 611 may have the shortest central wavelength. Furthermore, some filters may have multiple central wavelengths according to a thickness or an effective refractive index of a cavity.

The foregoing embodiments describe a case where the plurality of second material layers are disposed perpendicular to the first metal reflection layer 631; however, the disclosure is not limited thereto, and the plurality of second material layers may be disposed parallel with the first metal reflection layer 631.

Each of the fourth to sixth filters 621, 622, and 623 constituting the second filter array 620 may include two second metal reflection layers 651 and 652 spaced apart from each other and a cavity (i.e., a fourth cavity 661, a fifth cavity 662, or a sixth cavity 663) disposed between the second metal reflection layers 651 and 652. The description on the second metal reflection layers 651 and 652 is provided above, and thus any redundant description thereon is omitted.

The fourth to sixth filters 621, 622, and 623 may have different central wavelengths in the second wavelength region. To this end, the fourth filter 621, the fifth filter 622, and the sixth filter 623 may respectively include the fourth cavity 661, the fifth cavity 662, and the sixth cavity 663 having different effective refractive indexes. Each of the fourth to sixth cavities 661, 662, and 663 may include a first material layer and at least one second material layer disposed in the first material layer and having a refractive index different than that of the first material layer.

FIG. 11 illustrates a case where each of the fourth to sixth cavities 661, 662, and 663 includes a first material layer and a plurality of second material layers disposed side by side in the first material layer and perpendicular to the second metal reflection layer 651. Here, each of the first and second material layers may include, for example, silicon, silicon oxide, silicon nitride, titanium oxide, etc.

The fourth to sixth cavities 661, 662, and 663 may change an effective refractive index based on a width of the second material layer. FIG. 11 illustrates a case where the second material layer has a width increasing from the fourth cavity 661 towards the sixth cavity 663. In this case, among the fourth to sixth cavities 661, 662, and 663, the sixth cavity 663 may have the greatest effective refractive index, and the fourth cavity 661 may have the least effective refractive index. Among the fourth to sixth filters 621, 622, and 623, the sixth filter 623 may have the longest central wavelength, and the fourth filter 621 may have the shortest central wavelength. Furthermore, some filters may have multiple central wavelengths according to a thickness or an effective refractive index of a cavity.

The foregoing embodiments describe a case where both of the first filter array 610 and the second filter array 620 have a single-cavity structure. However, both of the first filter array 610 and the second filter array 620 may have a multi-single structure. Moreover, one of the first filter array 610 and the second filter array 620 may have the single-cavity structure, and the other may have the multi-cavity structure.

Figure 12:
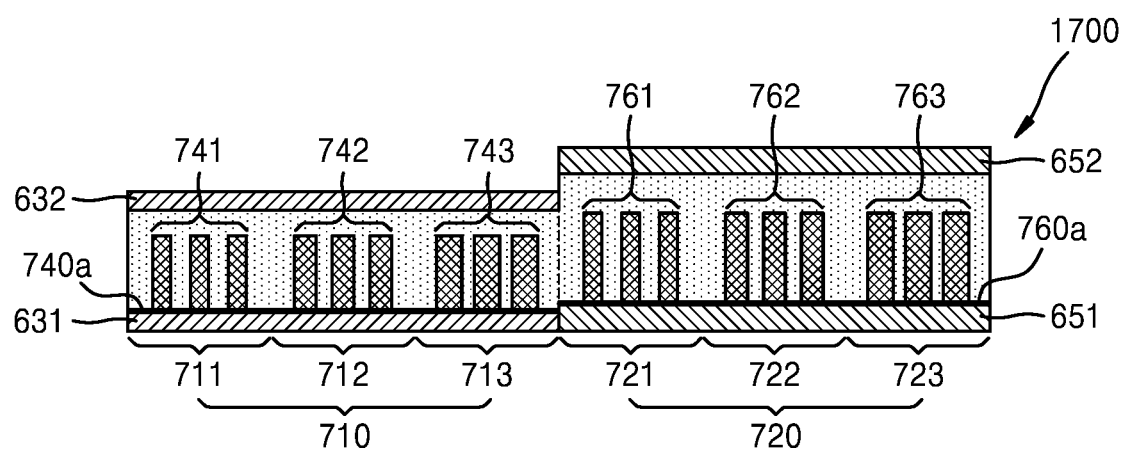
FIG. 12 is a schematic cross-sectional view of a spectral filter according to another example embodiment.

FIG. 12 is a schematic cross-sectional view of a spectral filter 1700 according to another example embodiment. The spectral filter 1700 of FIG. 12 may be identical to the spectral filter 1600 of FIG. 11 except that, in the spectral filter 1700, a cavity further includes an etch stop layer.

A first filter 711, a second filter 712, and a third filter 713 constituting a first filter array 710 may respectively include a first cavity 741, a second cavity 742, and a third cavity 743 having different effective refractive indexes. Here, each of the first to third cavities 741, 742, and 743 may include an etch stop layer 740a disposed on the first metal reflection layer 631, a first material layer disposed in the etch stop layer 740a and at least one second material layer disposed in the first material layer. The etch stop layer 740a may facilitate a patterning process for formation of a cavity. The etch stop layer 740a may include, for example, silicon oxide, titanium oxide, hafnium oxide, etc., but the disclosure is not limited thereto. The etch stop layer 740a may include a material having an etching rate two or more times (e.g., five or more times) lower than that of a dielectric material constituting the first to third cavities 741, 742, and 743. Specifically, when the first to third cavities 741, 742, and 743 include silicon oxide, the etch stop layer 740a may include hafnium oxide.

A fourth filter 721, a fifth filter 722, and a sixth filter 723 constituting a second filter array 720 may respectively include a fourth cavity 761, a fifth cavity 762, and a sixth cavity 763 having different effective refractive indexes. Here, each of the fourth to sixth cavities 761, 762, and 763 may include an etch stop layer 760a disposed on the second metal reflection layers 651 and 652, a first material layer disposed in the etch stop layer 760a and at least one second material layer disposed in the first material layer.

Figure 13:
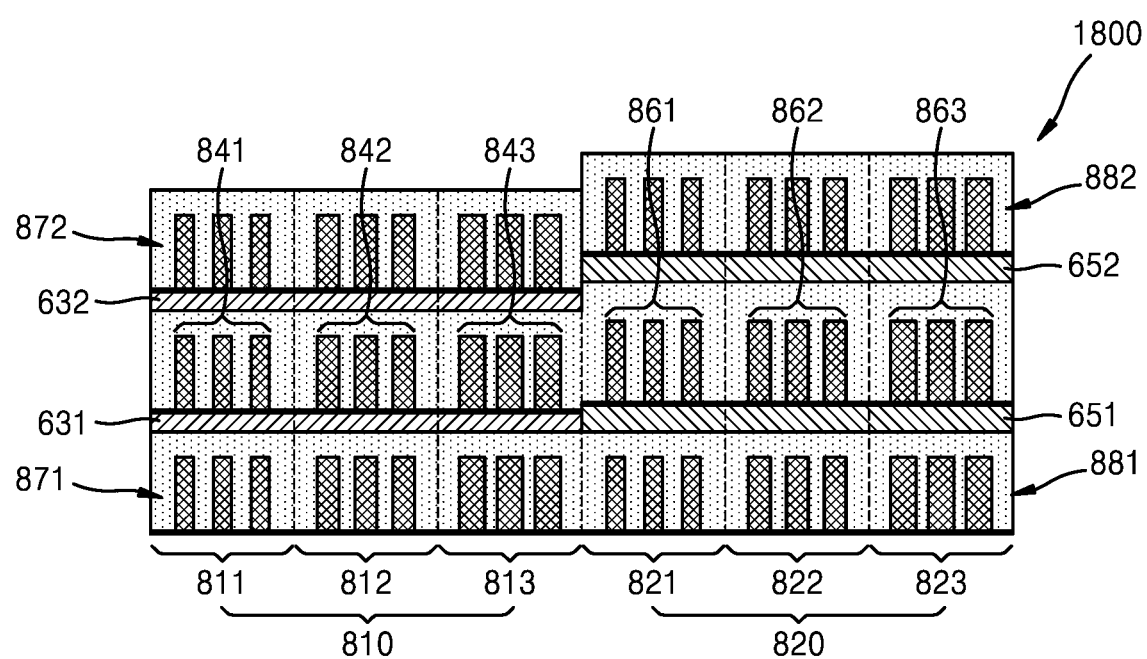
FIG. 13 is a schematic cross-sectional view of a spectral filter according to another example embodiment.

FIG. 13 is a schematic cross-sectional view of a spectral filter 1800 according to another example embodiment. The spectral filter 1800 of FIG. 13 may be identical to the spectral filter 1700 of FIG. 12 except that, in the spectral filter 1800, a first dielectric layer 871 and a second dielectric layer 872 are respectively disposed at a lower portion and an upper portion of a first filter array 810, and a third dielectric layer 881 and a fourth dielectric layer 882 are respectively disposed at a lower portion and an upper portion of a second filter array 820.

With reference to FIG. 13, each of a first filter 811, a second filter 812, and a third filter 813 constituting the first filter array 810 may include two first metal reflection layers 631 and 632 spaced apart from each other, a cavity (i.e., a first cavity 841, a second cavity 842, or a third cavity 843) disposed between the first metal reflection layers 631 and 632, and the first and second dielectric layers 871 and 872 respectively disposed below and above the cavity 841, 842, or 843. The first filter 811, the second filter 812, and the third filter 813 may respectively include the first cavity 841, the second cavity 842, and the third cavity 843, which have different effective refractive indexes so that the first to third filters 811, 812, and 813 have different central wavelengths in the first wavelength region.

The first dielectric layer 871 may be disposed below the first metal reflection layer 631, and the second dielectric layer 872 may be disposed above the first metal reflection layer 632. The first and second dielectric layers 871 and 872 may improve the transmittance of the first to third filters 811, 812, and 813.

Each of the first and second dielectric layers 871 and 872 may include a first material layer and at least one second material layer disposed in the first material layer and having a refractive index different than that of the first material layer. The first and second dielectric layers may include, for example, titanium oxide, silicon nitride, hafnium oxide, silicon oxide, high index polymer, etc., but the disclosure is not limited thereto. An effective refractive index of the first and second dielectric layers 871 and 872 may be adjusted by changing a width of the second material layer according to a central wavelength of the first to third filters 811, 812, and 813. Each of the first and second dielectric layers 871 and 872 may further include an etch stop layer.

Each of a fourth filter 821, a fifth filter 822, and a sixth filter 823 constituting the second filter array 820 may include two second metal reflection layers 651 and 652 spaced apart from each other, a cavity (i.e., a fourth cavity 861, a fifth cavity 862, or a sixth cavity 863) disposed between the second metal reflection layers 651 and 652, and the third and fourth dielectric layers 881 and 882 respectively disposed below and above the cavity 861, 862, or 863. The fourth filter 821, the fifth filter 822, and the sixth filter 823 may respectively include the fourth cavity 861, the fifth cavity 862, and the sixth cavity 863, which have different effective refractive indexes so that the fourth to sixth filters 821, 822, and 823 have different central wavelengths in the second wavelength region.

The third dielectric layer 881 may be disposed below the second metal reflection layer 651, and the fourth dielectric layer 882 may be disposed above the second metal reflection layer 652. Each of the third and fourth dielectric layers 881 and 882 may include a first material layer and at least one second material layer disposed in the first material layer and having a refractive index different than that of the first material layer. An effective refractive index of the third and fourth dielectric layers 881 and 882 may be adjusted by changing a width of the second material layer according to a central wavelength of the fourth to sixth filters 821, 822, and 823. Each of the third and fourth dielectric layers 881 and 882 may further include an etch stop layer.

Figure 14:
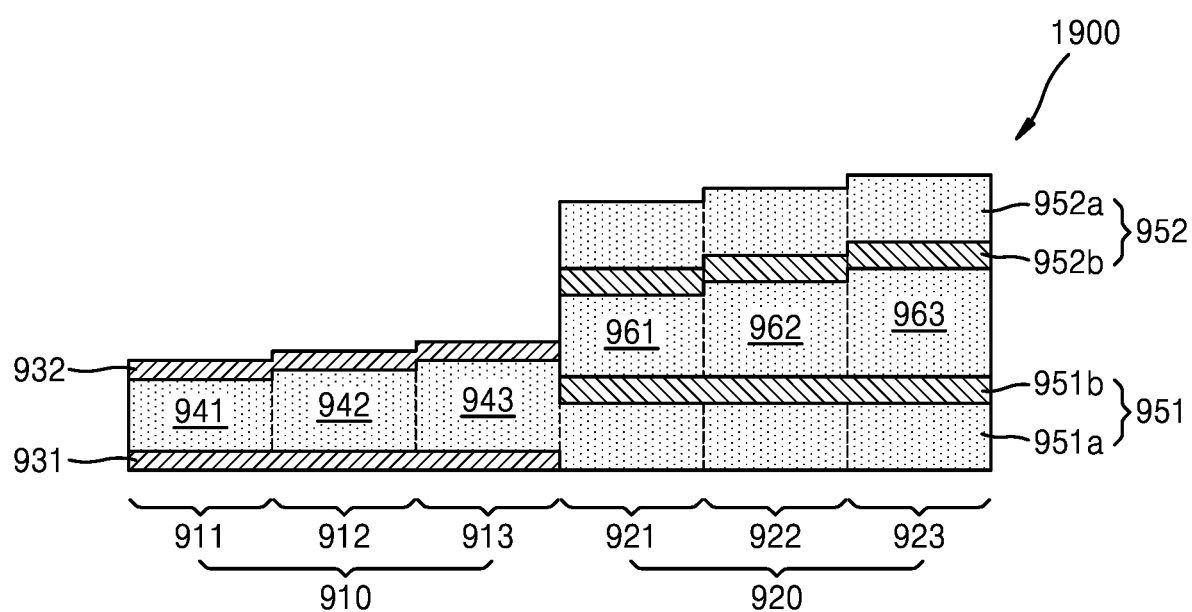
FIG. 14 is a schematic cross-sectional view of a spectral filter according to another example embodiment.

FIG. 14 is a schematic cross-sectional view of a spectral filter 1900 according to another example embodiment.

With reference to FIG. 14, a first filter array 910 may include at least one filter having a central wavelength in the first wavelength region, and a second filter array 920 may include at least one filter having a central wavelength in the second wavelength region. FIG. 14 illustrates a case where the first filter array 910 includes a first filter 911, a second filter 912, and a third filter 913, and the second filter array 920 includes a fourth filter 921, a fifth filter 922, and a sixth filter 923.

The first wavelength region may be shorter than the second wavelength region. For example, the first wavelength region may range from about 250 nm to about 600 nm, and the second wavelength region may range from about 600 nm to about 1100 nm. However, this is merely an example, and the first and second wavelength regions may vary according to design considerations. Alternatively, the first wavelength region may be longer than the second wavelength region.

Each of the first to third filters 911, 912, and 913 constituting the first filter array 910 may transmit a particular central wavelength in the first wavelength region and have a Fabry-Perot structure in which a cavity (i.e., a first cavity 941, a second cavity 942, or a third cavity 943) is disposed between two metal reflection layers 931 and 932 spaced apart from each other.

When light is incident on the cavity 941, 942, or 943 by passing through the metal reflection layers 931 and 932, the light may internally reflect in the cavity 941, 942, or 943 between the metal reflection layers 931 and 932 during which a constructive interference and a destructive interference occur. Light having a particular central wavelength and satisfying a constructive interference condition may exit to the outside of a filter (i.e. the first filter 911, the second filter 912, or the third filter 913). A wavelength band and a central wavelength of the light passing through the filter 911, 912, or 913 may be determined according to a reflection band of the reflection layers 931 and 932 and the characteristic of the cavity 941, 942, or 943.

The metal reflection layers 931 and 932 may include a certain metal capable of reflecting light of the first wavelength region. When the first wavelength region is shorter than the second wavelength region, the metal reflection layers 931 and 932 may include, for example, Al, Ag, Au, Ti, W, TiN, etc. When the first wavelength region is longer than the second wavelength region, the metal reflection layers 931 and 932 may include, for example, Cu, Ag, Au, TiN, Ti, W, etc. However, the foregoing is provided only as an example. The metal reflection layers 931 and 932 may further include poly-Si. The metal reflection layers 931 and 932 may have a thickness of tens of nanometers; however, the present disclosure is not limited thereto. For example, the metal reflection layers 931 and 932 may have a thickness of about 10 nm to about 80 nm.

The first to third cavities 941, 942, and 943 disposed between the metal reflection layers 931 and 932 may include, for example, silicon, silicon oxide, silicon nitride, or titanium oxide; however, the present disclosure is not limited thereto. The first to third filters 911, 912, and 913 may have different central wavelengths in the first wavelength region. To this end, the first filter 911, the second filter 912, and the third filter 913 may respectively include the first cavity 941, the second cavity 942, and the third cavity 943 having different thicknesses. Although it is not shown in the drawings, as the first filter 911, the second filter 912, and the third filter 913 respectively include cavities having different effective refractive indexes, the first to third filters 911, 912, and 913 may have different central wavelengths.

Each of the fourth to sixth filters 921, 922, and 923 constituting the second filter array 920 may transmit a particular central wavelength in the second wavelength region and have a Fabry-Perot structure in which a cavity (i.e., a fourth cavity 961, a fifth cavity 962, or a sixth cavity 963) is disposed between two Bragg reflection layers 951 and 952 spaced apart from each other.

When light is incident on the cavity 961, 962, or 963 by passing through the Bragg reflection layers 951 and 952, the light may internally reflect in the cavity 961, 962, or 963 between the Bragg reflection layers 951 and 952 during which a constructive interference and a destructive interference occur. Light having a particular central wavelength and satisfying a constructive interference condition may exit to the outside of a filter (i.e. the first filter 921, the second filter 922, or the third filter 923). A wavelength band and a central wavelength of the light passing through the filter 921, 922, or 923 may be determined according to a reflection band of the Bragg reflection layers 951 and 952 and the characteristics of the cavity 961, 962, or 963.

The Bragg reflection layers 951 and 952 may be a distributed Bragg reflector (DBR). The Bragg reflection layers 951 and 952 may have a structure in which at least one first material layer 951*a* and 952*a* and at least one second material layer 951*b* and 952*b*, which have different refractive indexes, are alternately stacked. The first material layers 951*a* and 952*a* or the second material layers 951*b* and 952*b* may include, for example, silicon oxide, titanium oxide, silicon nitride, or silicon. However, this is only an example.

When one of the first material layers 951*a* and 952*a* and the second material layers 951*b* and 952*b* constituting the Bragg reflection layers 951 and 952 includes, for example, a material (e.g., silicon, etc.) capable of absorbing light of the first wavelength region (e.g., light of short wavelength), the light of the first wavelength region may be prevented from passing through the fourth to sixth filters 921, 922, and 923.

The fourth to sixth cavities 961, 962, and 963 disposed between the Bragg reflection layers 951 and 952 may include, for example, silicon, silicon oxide, silicon nitride, hafnium oxide or titanium oxide; however, the present disclosure is not limited thereto.

The fourth to sixth filters 921, 922, and 923 may have different central wavelengths in the second wavelength region. To this end, the fourth filter 921, the fifth filter 922, and the sixth filter 923 may respectively include the fourth cavity 961, the fifth cavity 962, and the sixth cavity 963 having different thicknesses. Although it is not shown in the drawings, as the fourth filter 921, the fifth filter 922, and the sixth filter 993 respectively include cavities having different effective refractive indexes, the fourth to sixth filters 921, 922, and 923 may have different central wavelengths.

As described above, by arranging the first filter array 910 in which the first to third cavities 941, 942, and 943 are disposed between the metal reflection layers 931 and 932 and the second filter array 920 in which the fourth to sixth cavities 961, 962, and 963 are disposed between the Bragg metal reflection layers 951 and 952 on a plane, a spectral filter having broadband characteristics in the first wavelength region and the second wavelength region may be implemented.

Figure 15:
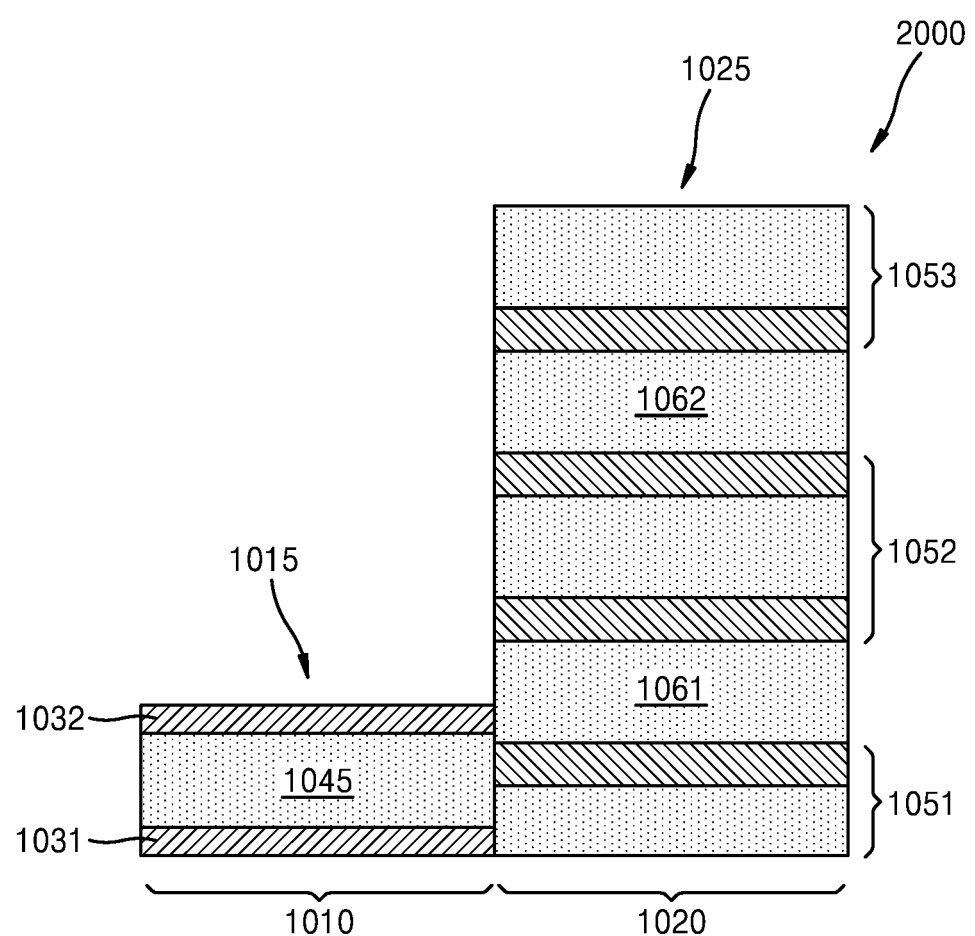
FIG. 15 is a schematic cross-sectional view of a spectral filter according to another example embodiment.

FIG. 15 is a schematic cross-sectional view of a spectral filter 2000 according to another example embodiment. FIG. 15 illustrates a case where a first filter array 1010 includes one filter (i.e., a first filter 1015), and a second filter array 1020 includes one filter (i.e., a second filter 1025) for convenience.

With reference to FIG. 15, the first filter 1015 constituting the first filter array 1010 may include two metal reflection layers 1031 and 1032 spaced apart from each other, and a first cavity 1045 disposed between the metal reflection layers 1031 and 1032. The descriptions on the metal reflection layers 1031 and 1032 and the first cavity 1045 are provided above.

The second filter 1025 constituting the second filter array 1020 may have a multi-cavity structure. Specifically, the second filter 1025 may include three Bragg reflection layers 1051, 1052, and 1053 spaced apart from each other and two second cavities 1061 and 1062 disposed between the Bragg reflection layers 1051, 1052, and 1053. The descriptions on the Bragg reflection layers 1051, 1052, and 1053 and the second cavities 1061 and 1062 are provided above. The number of first and second material layers constituting each of the Bragg reflection layers 1051, 1052, and 1053 may vary. Although FIG. 15 illustrates a case where the second filter 1025 include two cavities (i.e., second cavities 1061 and 1062), the disclosure is not limited thereto, and the second filter 1025 may include three or more cavities.

Figure 16:
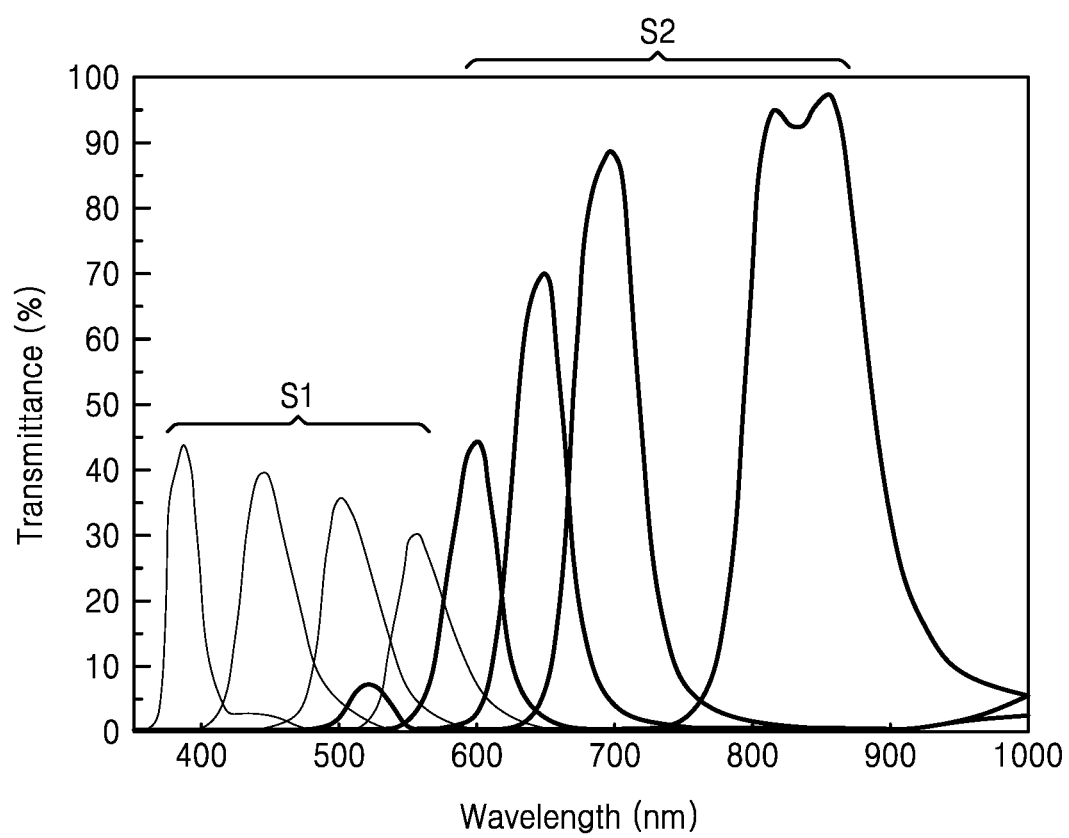
FIG. 16 illustrates transmission spectrums of the spectral filter of FIG. 15.

FIG. 16 illustrates transmission spectrums of the spectral filter 2000 of FIG. 15. FIG. 16 illustrates transmission spectrums in a case where, in the spectral filter 2000 of FIG. 15, the first filter array 1010 includes four filters having different central wavelengths, and the second filter array 1020 includes four filters having different central wavelengths.

In the first filter array 1010, the metal reflection layers 1031 and 1032 include Al, and the first cavity 1045 includes a multi-layer of $TiO_2$ and SiN. In the second filter array 1020, the Bragg reflection layers 1051, 1052, and 1053 include Si and $SiO_2$, and the second cavities 1061 and 1062 include $SiO_2$. In FIG. 16, "S1" denotes transmission spectrums of the first filter array 1010, and "S2" denotes transmission spectrums of the second filter array 1020.

The foregoing embodiments illustrate a case where the first filter 1015 has a single-cavity structure, and the second filter 1025 has a multi-cavity structure. However, the first filter 1015 may have a multi-cavity structure, and the second filter 1025 may have a single-cavity structure. Moreover, both of the first filter 1015 and the second filter 1025 may have a multi-cavity structure.

Figure 17:
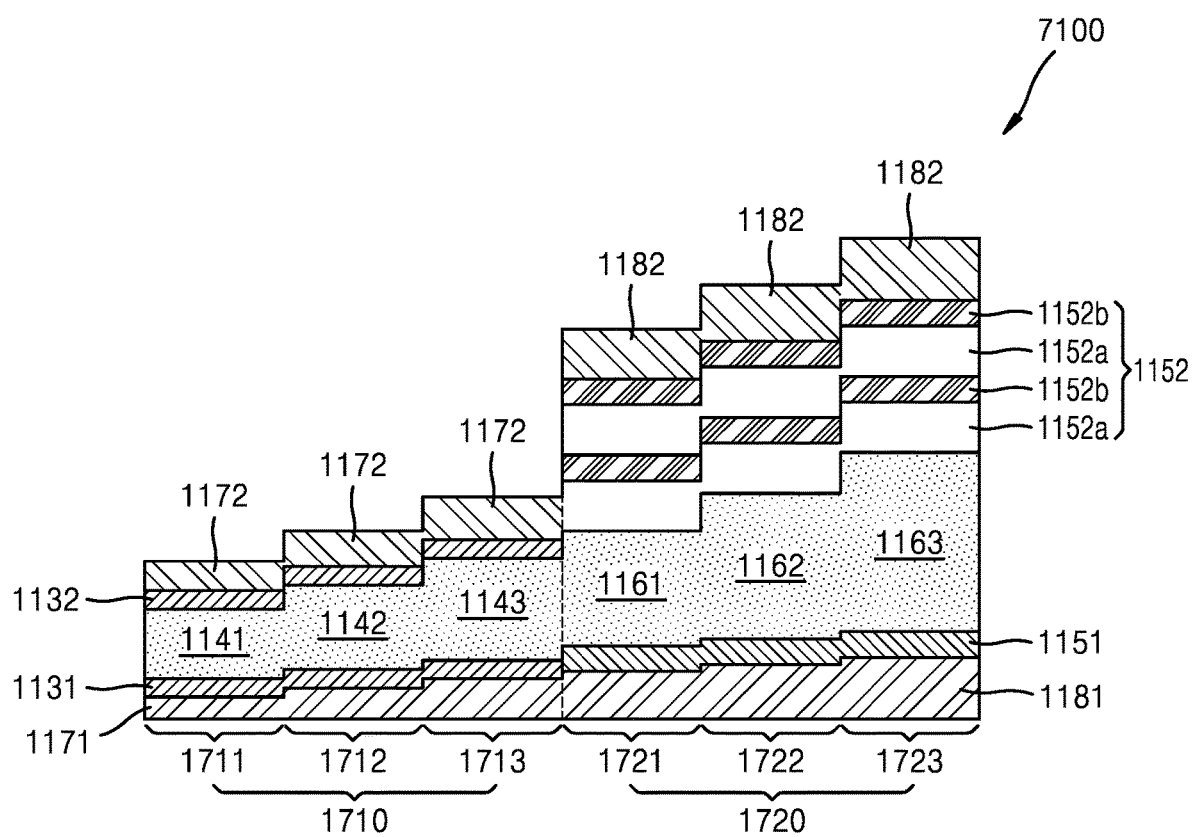
FIG. 17 is a schematic cross-sectional view of a spectral filter according to another example embodiment.

FIG. 17 is a schematic cross-sectional view of a spectral filter 7100 according to another example embodiment.

With reference to FIG. 17, a first filter array 1710 may include at least one filter having a central wavelength in the first wavelength region, and a second filter array 1720 may include at least one filter having a central wavelength in the second wavelength region. FIG. 17 illustrates a case where the first filter array 1710 includes a first filter 1711, a second filter 1712, and a third filter 1713, and the second filter array 1720 includes a fourth filter 1721, a fifth filter 1722, and a sixth filter 1723.

The first wavelength region may be shorter than the second wavelength region. For example, the first wavelength region may range from about 250 nm to about 600 nm, and the second wavelength region may range from about 600 nm to about 1100 nm. However, this is merely an example, and the first and second wavelength regions may vary according to design considerations.

Each of the first to third filters 1711, 1712, and 1713 constituting the first filter array 1710 may transmit a particular central wavelength in the first wavelength region and have a Fabry-Perot structure in which a cavity (i.e., a first cavity 1141, a second cavity 1142, or a third cavity 1143) is disposed between two first metal reflection layers 1131 and 1132 spaced apart from each other. A wavelength band and a central wavelength of the light passing through a filter (i.e. the first filter 1711, the second filter 1712, or the third filter 1713) may be determined according to a reflection band of the first metal reflection layers 1131 and 1132 and the characteristic of the cavity 1141, 1142, or 1143.

The first metal reflection layers 1131 and 1132 may include a certain metal capable of reflecting light in the first wavelength region. When the first wavelength region is a short-wavelength region, and the second wavelength region is a long-wavelength region, the first metal reflection layers 1131 and 1132 may include, for example, Al, Ag, Au, Ti, W, TiN, etc. However, the foregoing is provided only as an example. The first metal reflection layers 1131 and 1132 may have a thickness of tens of nanometers; however, the present disclosure is not limited thereto. For example, the first metal reflection layers 1131 and 1132 may have a thickness of about 10 nm to about 80 nm.

The first to third cavities 1141, 1142, and 1143 disposed between the first metal reflection layers 1131 and 1132 may include, for example, silicon, silicon oxide, silicon nitride, or titanium oxide; however, the present disclosure is not limited thereto. The first to third filters 1711, 1712, and 1713 may have different central wavelengths in the first wavelength region. To this end, the first filter 1711, the second filter 1712, and the third filter 1713 may respectively include the first cavity 1141, the second cavity 1142, and the third cavity 1143 having different thicknesses.

A first dielectric layer 1171 may be further provided below each of the first to third cavities 1141, 1142, and 1143, and a second dielectric layer 1172 may be further provided above the first to third cavities 1141, 1142, and 1143. The first and second dielectric layers 1171 and 1172 may improve the transmittance of the first to third filters 1711, 1712, and 1713. The first and second dielectric layers 1171 and 1172 may have a single-layer structure or a multi-layer structure. Each of the first and second dielectric layers 1171 and 1172 may include, for example, titanium oxide, silicon nitride, hafnium oxide, silicon oxide, high index polymer, etc. However, the foregoing is provided only as an example.

A thickness of the first and second dielectric layers 1171 and 1172 may vary according to a central wavelength of the first to third filters 1711, 1712, and 1713. FIG. 17 illustrates a case where the thickness of the first and second dielectric layers 1171 and 1172 increases as the central wavelengths of the first to third filters 1711, 1712, and 1713 increase. The thickness of each of the first and second dielectric layers 1171 and 1172 may be about 10 nm to 20000 nm; however, the present disclosure is not limited thereto.

Each of the fourth to sixth filters 1721, 1722, and 1723 constituting the second filter array 1720 may transmit a particular central wavelength in the second wavelength region and have a Fabry-Perot structure in which cavities (i.e., a fourth cavity 1161, a fifth cavity 1162, and a sixth cavity 1163) are disposed between a second metal reflection layer 1151 and a Bragg reflection layer 1152 spaced apart from each other. The second reflection layer 1151 may be disposed below the fourth to sixth cavities 1161, 1162, and 1163, and the Bragg reflection layer 1152 may be disposed above the fourth to sixth cavities 1161, 1162, and 1163. A wavelength band and a central wavelength of the light passing through a filter (i.e. the fourth filter 1721, the fifth filter 1722, or the sixth filter 1723) may be determined according to a reflection band of the second metal reflection layer 1151 and the Bragg reflection layer 1152 and the characteristic of the cavity 1161, 1162, or 1163.

When the first wavelength region is a short-wavelength region, and the second wavelength region is a long-wavelength region, the second metal reflection layers 1151 may include, for example, Cu, Ag, Au, Ti, W, TiN, etc. However, the foregoing is provided only as an example. The second metal reflection layer 1151 may further include poly-Si. The second metal reflection layer 1151 may have a thickness of tens of nanometers; however, the present disclosure is not limited thereto. For example, the second metal reflection layer 1151 may have a thickness of about 10 nm to about 80 nm.

The Bragg reflection layer 1152 may be a DBR. The Bragg reflection layer 1152 may have a structure in which at least one first material layer 1152a and at least one second material layer 1152b, which have different refractive indexes, are alternately stacked. The first material layer 1152a or the second material layer 1152b may include, for example, silicon oxide, titanium oxide, silicon nitride, or silicon. However, this is only an example. Specifically, the first material layer 1152a may include silicon oxide, and the second material layer 1152b may include silicon.

When one of the first and second material layers 1152a and 1152b constituting the Bragg reflection layer 1152 includes, for example, a material (e.g., silicon, etc.) capable of absorbing light of the first wavelength region (e.g., light of short wavelength), the light of the first wavelength region may be prevented from passing through the fourth to sixth filters 1721, 1722, and 1723.

The fourth to sixth cavities 1161, 1162, and 1163 disposed between the second metal reflection layer 1151 the Bragg reflection layer 1152 may include, for example, silicon, silicon oxide, silicon nitride, hafnium oxide or titanium oxide; however, the present disclosure is not limited thereto.

The fourth to sixth filters 1721, 1722, and 1723 may have different central wavelengths in the second wavelength region. To this end, the fourth filter 1721, the fifth filter 1722, and the sixth filter 1723 may respectively include the fourth cavity 1161, the fifth cavity 1162, and the sixth cavity 1163 having different thicknesses.

A third dielectric layer 1181 may be further disposed below the second metal reflection layer 1151, and a fourth dielectric layer 1182 may be further disposed above the Bragg reflection layer 1152. The third and fourth dielectric layers 1181 and 1182 may improve the transmittance of the fourth to sixth filters 1721, 1722, and 1723. The third and fourth dielectric layers 1181 and 1182 may have a single-layer structure or a multi-layer structure. Similar to the first and second dielectric layers 1171 and 1172 described above, each of the third and fourth dielectric layers 1181 and 1182 may include, for example, titanium oxide, silicon nitride, hafnium oxide, silicon oxide, high index polymer, etc.; however, the present disclosure is not limited thereto.

A thickness of the third and fourth dielectric layers 1181 and 1182 may vary according to a central wavelength of the fourth to sixth filters 1721, 1722, and 1723. FIG. 17 illustrates a case FIG. 17 illustrates a case where the thickness of the third and fourth dielectric layers 1181 and 1182 increases as the central wavelengths of the fourth to sixth filters 1721, 1722, and 1723 increase. The thickness of each of the third and fourth dielectric layers 1181 and 1182 may be about 10 nm to 20000 nm; however, the present disclosure is not limited thereto.

According to the embodiment, as the fourth to sixth filters 1721, 1722, and 1723 constituting the second filter array 1720 have a structure in which the fourth to sixth cavities 1161, 1162, 1163 are disposed between the second metal reflection layer 1151 and the Bragg reflection layer 1152, the transmittance of light of the second wavelength region may be further improved.

Figure 18A:
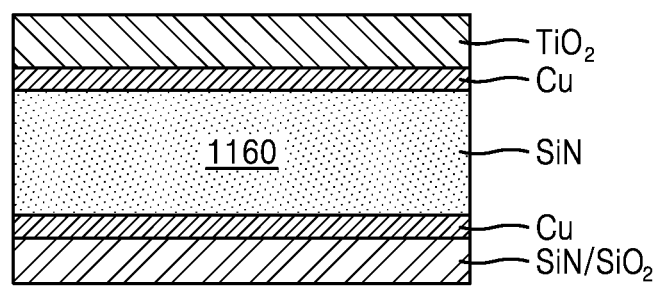
FIGS. 18A and 18B illustrate a filter structure including Cu metal layers both below and above a cavity and a transmission spectrum of such filter structure, respectively.
Figure 18B:
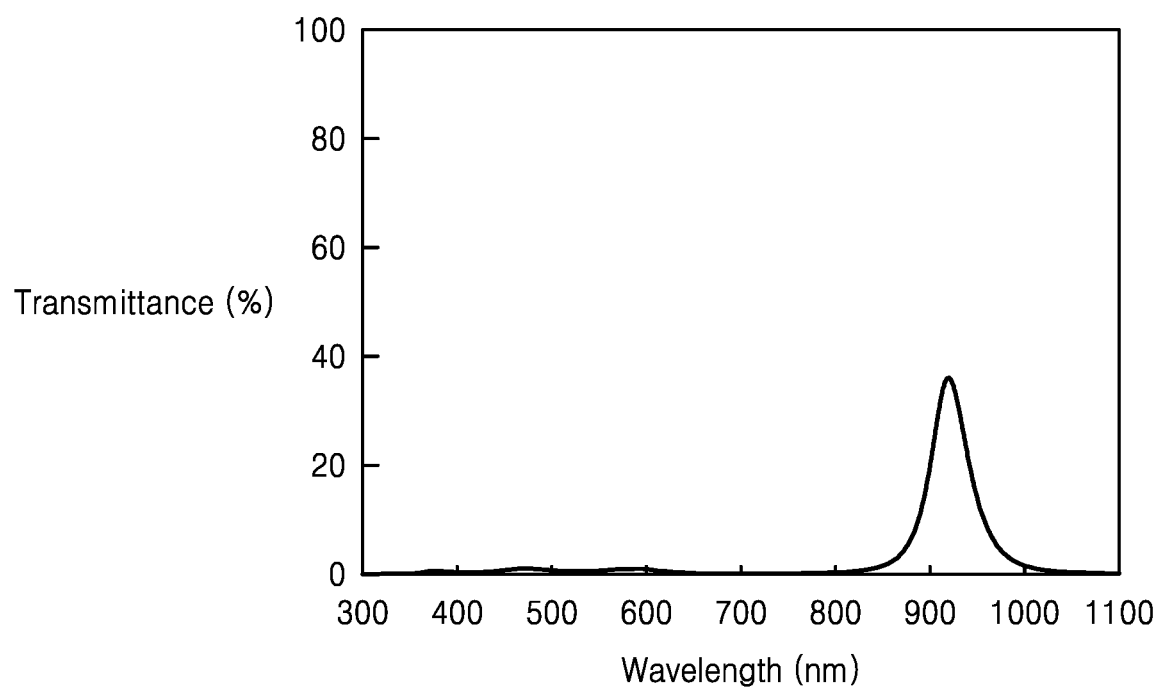

FIG. 18A illustrates a filter structure including Cu metal layers both below and above a cavity 1160 (the "Cu—Cu structure"), and FIG. 18B illustrates a transmission spectrum of the Cu—Cu structure of FIG. 18A. In FIG. 18A, a lower dielectric layer includes a SiN/SiO$_2$ multi-layer, and an upper dielectric layer includes a TiO$_2$ layer. Moreover, the cavity 1160 includes a SiN layer.

Figure 19A:
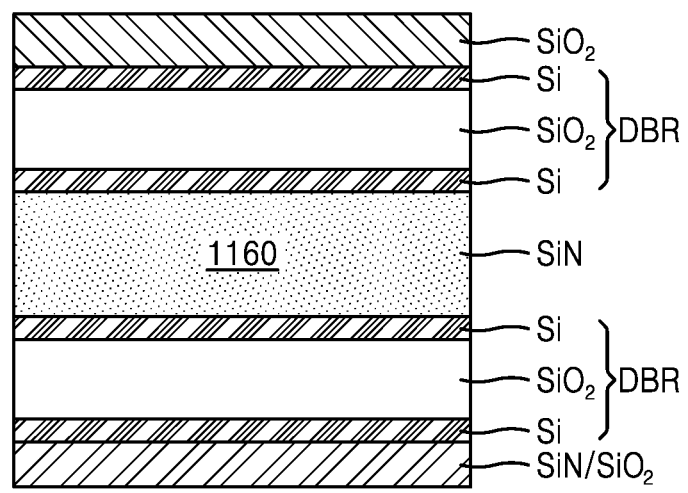
FIGS. 19A and 19B illustrate a filter structure including $Si/SiO_2$ Bragg reflection layers both below and above a cavity and a transmission spectrum of such filter structure, respectively.
Figure 19B:
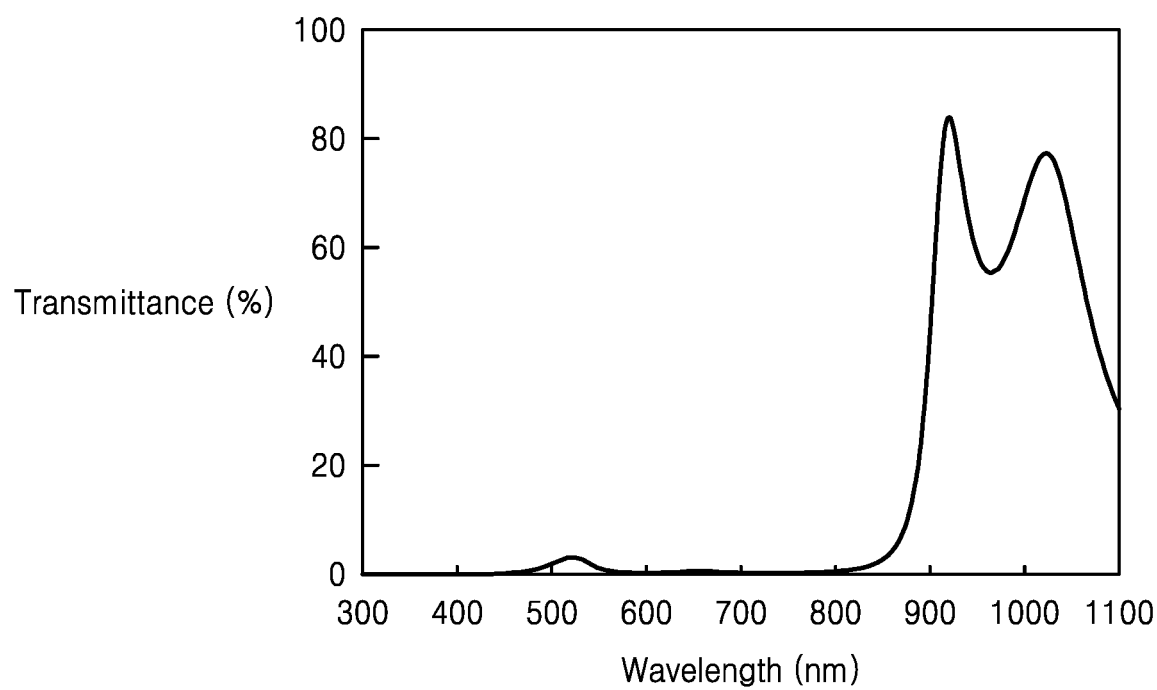

FIG. 19A illustrates a filter structure including Si/SiO$_2$ Bragg reflection layers both below and above the cavity 1160 (the "Si/SiO$_2$ DBR-Si/SiO$_2$ DBR structure") and FIG. 19B illustrates a transmission spectrum of the Si/SiO$_2$ DBR-Si/SiO$_2$ DBR structure of FIG. 19A. In FIG. 19A, a lower dielectric layer includes a SiN/SiO$_2$ multi-layer, and an upper dielectric layer includes a SiO$_2$ layer. Moreover, the cavity 1160 includes SiN layer.

Figure 20A:
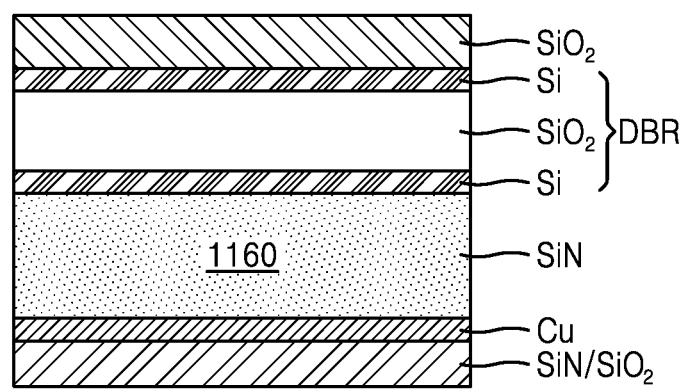
FIGS. 20A and 20B illustrate a filter structure including a Cu reflection layer below a cavity and a $Si/SiO_2$ Bragg reflection layer above the cavity and a transmission spectrum of such filter structure, respectively.
Figure 20B:
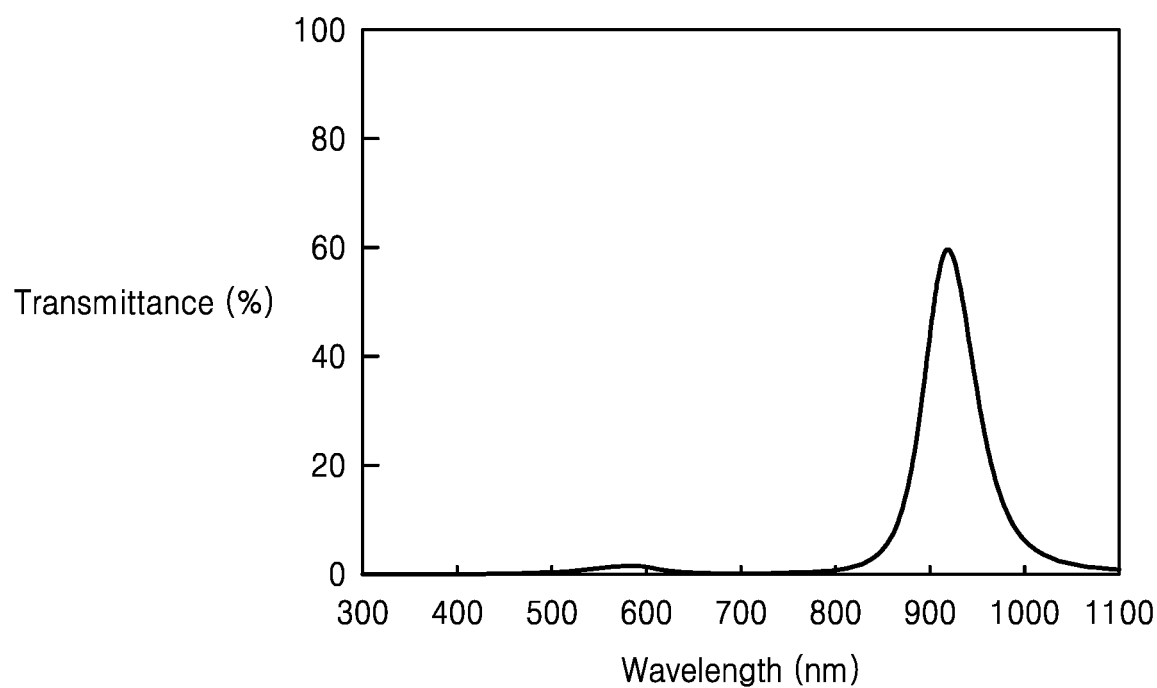

FIG. 20A illustrates a filter structure including a Cu metal reflection layer below the cavity 1160 and a Si/SiO$_2$ DBR layer above the cavity 1160 (the "Cu—Si/SiO$_2$ DBR structure") and FIG. 20B illustrates a transmission spectrum of the Cu—Si/SiO$_2$ DBR structure of FIG. 20B.

In FIG. 20A, a lower dielectric layer includes a SiN/SiO$_2$ multi-layer, and an upper dielectric layer includes a SiO$_2$ layer. Moreover, the cavity 1160 includes SiN layer. The filter structures illustrated in FIGS. 18A, 19A, and 20A may have a central wavelength of about 930 nm.

With reference to FIGS. 18B, 19B, and 20B, the Cu—Si/SiO$_2$ DBR structure of FIG. 20A may have an improved transmittance in comparison with the Cu—Cu structure of FIG. 18A. Furthermore, similar to the Cu—Cu structure of FIG. 18A, the Cu—Si/SiO$_2$ DBR structure of FIG. 20A may have a constant full width at half maximum of a transmission peak compared to the Si/SiO$_2$ DBR-Si/SiO$_2$ DBR structure of FIG. 19A.

The foregoing embodiments describe a case where both of the first filter array 1710 and the second filter array 1720 have a single-cavity structure. However, both of the first filter array 1710 and the second filter array 1720 may have a multi-single structure. Moreover, one of the first filter array 1710 and the second filter array 1720 may have the single-cavity structure, and the other may have the multi-cavity structure.

Figure 21:
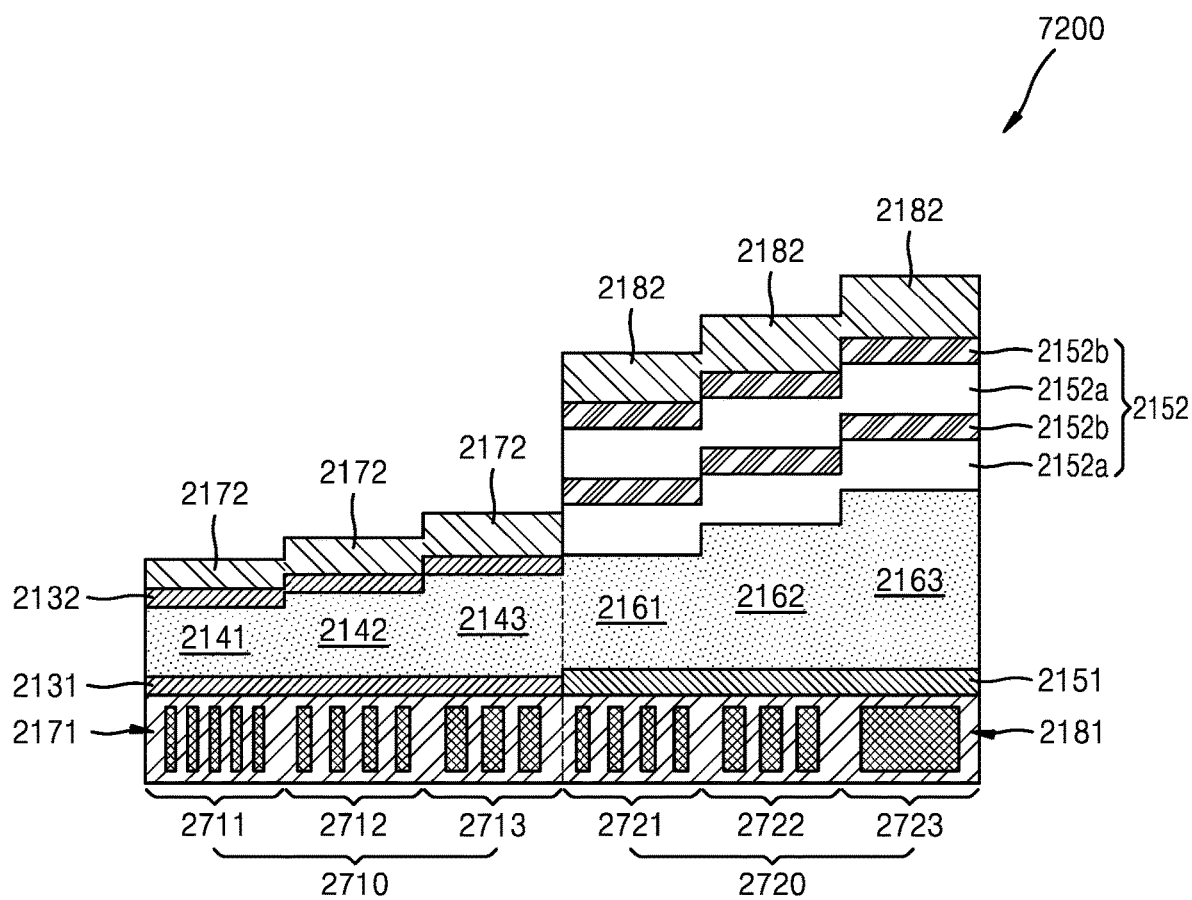
FIG. 21 is a schematic cross-sectional view of a spectral filter according to another example embodiment.

FIG. 21 is a schematic cross-sectional view of a spectral filter 7200 according to another example embodiment.

With reference to FIG. 21, a first filter array 2710 may include at least one filter having a central wavelength in the first wavelength region, and a second filter array 2720 may include at least one filter having a central wavelength in the second wavelength region. FIG. 21 illustrates a case where the first filter array 2710 includes a first filter 2711, a second filter 2712, and a third filter 2713, and the second filter array 2720 includes a fourth filter 2721, a fifth filter 2722, and a sixth filter 2723.

Each of the first to third filters 2711, 2712, and 2713 may have a Fabry-Perot structure in which a cavity (i.e., a first cavity 2141, a second cavity 2142, or a third cavity 2143) is disposed between two first metal reflection layers 2131 and 2132 spaced apart from each other. As the first metal reflection layers 2131 and 2132 and the first third cavities 2141, 2142, and 2143 are as described above with reference to FIG. 17, any redundant description thereon is omitted.

A first dielectric layer 2171 may be further provided below each of the first to third cavities 2141, 2142, and 2143, and a second dielectric layer 2172 may be further provided above the first to third cavities 2141, 2142, and 2143. The first and second dielectric layers 2171 and 2172 may improve the transmittance of the first to third filters 2711, 2712, and 2713.

The first dielectric layer 2171 may include a first material layer and at least one second material layer disposed in the first material layer and having a refractive index different than that of the first material layer. The first and second material layers may include, for example, titanium oxide, silicon nitride, hafnium oxide, silicon oxide, high index polymer, etc., but the disclosure is not limited thereto. An effective refractive index of the first dielectric layer 2171 may be adjusted by changing a width of the second material layer according to a central wavelength of the first to third filters 2711, 2712, and 2713. Here, the first dielectric layer 2171 may further include an etch stop layer.

The second dielectric layer 2172 disposed above each of the first to third cavities 2141, 2142, and 2143 may be as described above with reference to FIG. 17. That is, a thickness of the second dielectric layer 2172 may vary according to a central wavelength of the first to third filters 2711, 2712, and 2713. FIG. 21 illustrates a case where the thickness of the second dielectric layer 2172 increases as the central wavelengths of the first to third filters 2711, 2712, and 2713 increase.

Although it is not shown in the drawings, the second dielectric layer 2172 may have a structure similar to that of the first dielectric layer 2171. In this case, the second dielectric layer 2172 may include a first material layer and at least one second material layer disposed in the first material layer and having a refractive index different than that of the first material layer. An effective refractive index of the second dielectric layer 2172 may be adjusted by changing a width of the second material layer according to a central wavelength of the first to third filters 2711, 2712, and 2713.

Each of the fourth to sixth filters 2721, 2722, and 2723 may have a Fabry-Perot structure in which a cavity (i.e., a fourth cavity 2161, a fifth cavity 2162, or a sixth cavity 2163) is disposed between a second metal reflection layer 2151 and a Bragg reflection layer 2152 spaced apart from each other. The Bragg reflection layer 2152 may have a structure in which at least one first material layer 2152a and at least one second material layer 2152b, which have different refractive indexes, are alternately stacked. As the second metal reflection layer 2151, the fourth to sixth cavities 2161, 2162, and 2163, and the Bragg reflection layer 2152 are as described above with reference to FIG. 17, any redundant description thereon is omitted.

A third dielectric layer 2181 may be further disposed below the second metal reflection layer 2151, and a fourth dielectric layer 2182 may be further disposed above the Bragg reflection layer 2152. The third and fourth dielectric layers 2181 and 2182 may improve the transmittance of the fourth to sixth filters 2721, 2722, and 2723.

The third dielectric layer 2181 may include a first material layer and at least one second material layer disposed in the first material layer and having a refractive index different than that of the first material layer. The first and second material layers may include, for example, titanium oxide, silicon nitride, hafnium oxide, silicon oxide, high index polymer, etc., but the disclosure is not limited thereto. An effective refractive index of the third dielectric layer 2181 may be adjusted by changing a width of the second material layer according to a central wavelength of the fourth to sixth filters 2721, 2722, and 2723. Here, the third dielectric layer 2181 may further include an etch stop layer.

The fourth dielectric layer 2182 disposed above each of the fourth to sixth cavities 2161, 2162, and 2163 may be as described above with reference to FIG. 17. That is, a thickness of the fourth dielectric layer 2182 may vary according to a central wavelength of the fourth to sixth filters 2721, 2722, and 2723. FIG. 21 illustrates a case where the thickness of the fourth dielectric layer 2182 increases as the central wavelengths of the fourth to sixth filters 2721, 2722, and 2723 increase.

Although it is not shown in the drawings, the fourth dielectric layer 2182 may have a structure similar to that of the third dielectric layer 2181. In this case, the fourth dielectric layer 2182 may include a first material layer and at least one second material layer disposed in the first material layer and having a refractive index different than that of the first material layer. An effective refractive index of the fourth dielectric layer 2182 may be adjusted by changing a width of the second material layer according to a central wavelength of the fourth to sixth filters 2721, 2722, and 2723.

Figure 22:
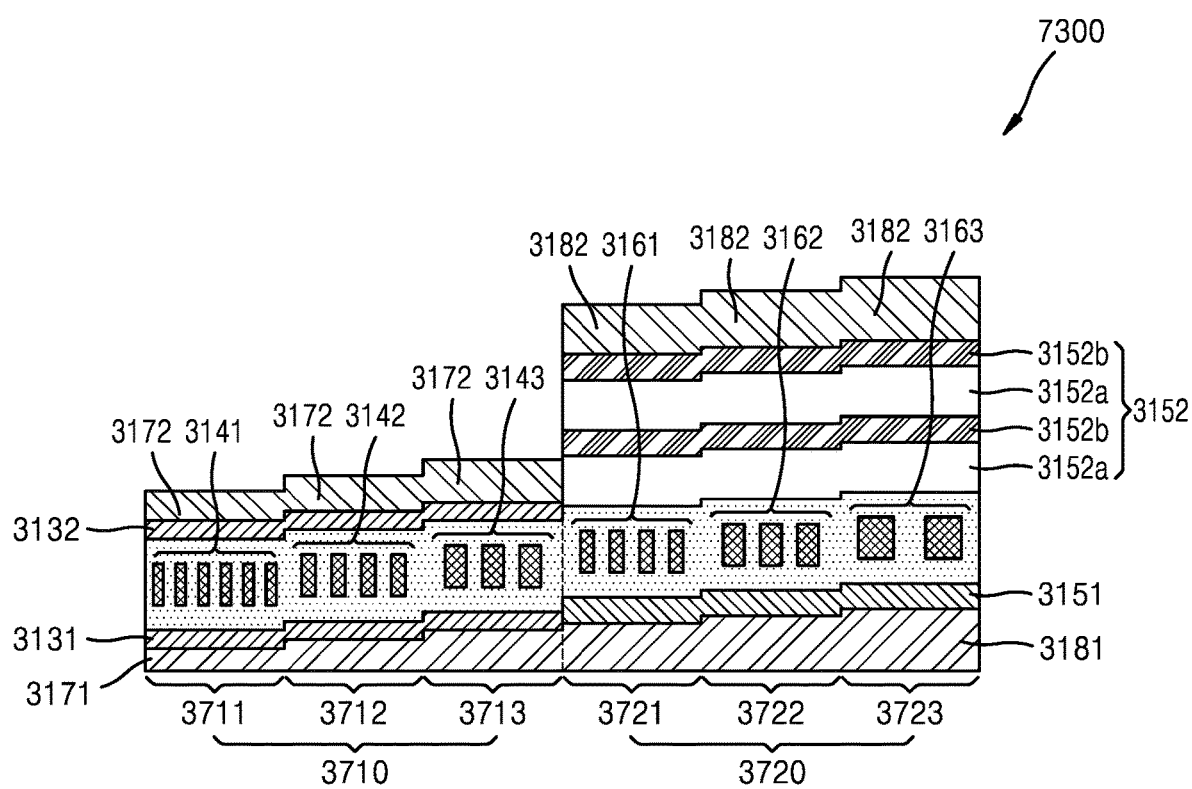
FIG. 22 is a schematic cross-sectional view of a spectral filter according to another example embodiment.

FIG. 22 is a schematic cross-sectional view of a spectral filter 7300 according to another example embodiment.

With reference to FIG. 22, a first filter array 3710 may include at least one filter having a central wavelength in the first wavelength region, and a second filter array 3720 may include at least one filter having a central wavelength in the second wavelength region. FIG. 22 illustrates a case where the first filter array 3710 includes a first filter 3711, a second filter 3712, and a third filter 3713, and the second filter array 3720 includes a fourth filter 3721, a fifth filter 3722, and a sixth filter 3723.

Each of the first to third filters 3711, 3712, and 3713 may have a Fabry-Perot structure in which a cavity (i.e., a first cavity 3141, a second cavity 3142, or a third cavity 3143) is disposed between two first metal reflection layers 3131 and 3132 spaced apart from each other. As the first metal reflection layers 3131 and 3132 are as described above with reference to FIG. 17, any redundant description thereon is omitted.

The first filter 3711, the second filter 3712, and the third filter 3713 may respectively include the first cavity 3741, the second cavity 3742, and the third cavity 3743 having different effective refractive indexes. Each of the first to third cavities 3741, 3742, and 3743 may include a first material layer and at least one second material layer disposed in the first material layer and having a refractive index different than that of the first material layer. Here, each of the first to third cavities 3141, 3142, and 3143 may further include an etch stop layer.

FIG. 22 illustrates a case where each of the first to third cavities 3141, 3142, and 3143 includes a first material layer and a plurality of second material layers disposed side by side in the first material layer. Here, each of the first and second material layers may include, for example, silicon, silicon oxide, silicon nitride, titanium oxide, etc. Specifically, the first material layer may include silicon oxide, and the second material layer may include titanium oxide.

The first to third cavities 3141, 3142, and 3143 may change an effective refractive index based on a width of the second material layer. For example, among the first to third cavities 3141, 3142, and 3143, the third cavity 3143 may have the greatest effective refractive index, and the first cavity 3141 may have the least effective refractive index. In this case, among the first to third filters 3711, 3712, and 3713, the third filter 3713 may have the longest central wavelength, and the first filter 3711 may have the shortest central wavelength.

A first dielectric layer 3171 may be further provided below each of the first to third cavities 3141, 3142, and 3143, and a second dielectric layer 3172 may be further provided above the first to third cavities 3141, 3142, and 3143. As the first and second dielectric layers 3171 and 3172 are as described above with reference to FIG. 17, any redundant description thereon is omitted. Meanwhile, the first dielectric layer 3171 and/or the second dielectric layer 3172 may have a structure similar to that of the first dielectric layer 2171 of FIG. 21.

Each of the fourth to sixth filters 3721, 3722, and 3723 may have a Fabry-Perot structure in which a cavity (i.e., a fourth cavity 3161, a fifth cavity 3162, or a sixth cavity 3163) is disposed between a second metal reflection layer 3151 and a Bragg reflection layer 3152 spaced apart from each other. The Bragg reflection layer 3152 may have a structure in which at least one first material layer 3152a and at least one second material layer 3152b, which have different refractive indexes, are alternately stacked. As the second metal reflection layer 3151 and the Bragg reflection layer 3152 are as described above with reference to FIG. 17, any redundant description thereon is omitted.

The fourth filter 3721, the fifth filter 3722, and the sixth filter 3723 may respectively include the fourth cavity 3161, the fifth cavity 3162, and the sixth cavity 3163 having different effective refractive indexes. Each of the fourth to sixth cavities 3161, 3162, and 3163 may include a first material layer and at least one second material layer disposed in the first material layer and having a refractive index different than that of the first material layer.

FIG. 22 illustrates a case where each of the fourth to sixth cavities 3161, 3162, and 3163 includes a first material layer and a plurality of second material layers disposed side by side in the first material layer. Here, each of the first and second material layers may include, for example, silicon, silicon oxide, silicon nitride, titanium oxide, etc. Specifically, the first material layer may include silicon oxide, and the second material layer may include titanium oxide.

The fourth to sixth cavities 3161, 3162, and 3163 may change an effective refractive index based on a width of the second material layer. For example, among the fourth to sixth cavities 3161, 3162, and 3163, the sixth cavity 3163 may have the greatest effective refractive index, and the fourth cavity 3161 may have the least effective refractive index. In this case, among the fourth to sixth filters 3721, 3722, and 3723, the sixth filter 3722 may have the longest central wavelength, and the fourth filter 3721 may have the shortest central wavelength.

A third dielectric layer 3181 may be further provided below each of the fourth to sixth cavities 3161, 3162, and 3163, and a fourth dielectric layer 3182 may be further provided above the fourth to sixth cavities 3161, 3162, and 3163. As the third and fourth dielectric layers 3181 and 3182 are as described above with reference to FIG. 17, any redundant description thereon is omitted. Meanwhile, the third dielectric layer 3181 and/or the fourth dielectric layer 3182 may have a structure similar to that of the third dielectric layer 2181 of FIG. 21.

Figure 23:
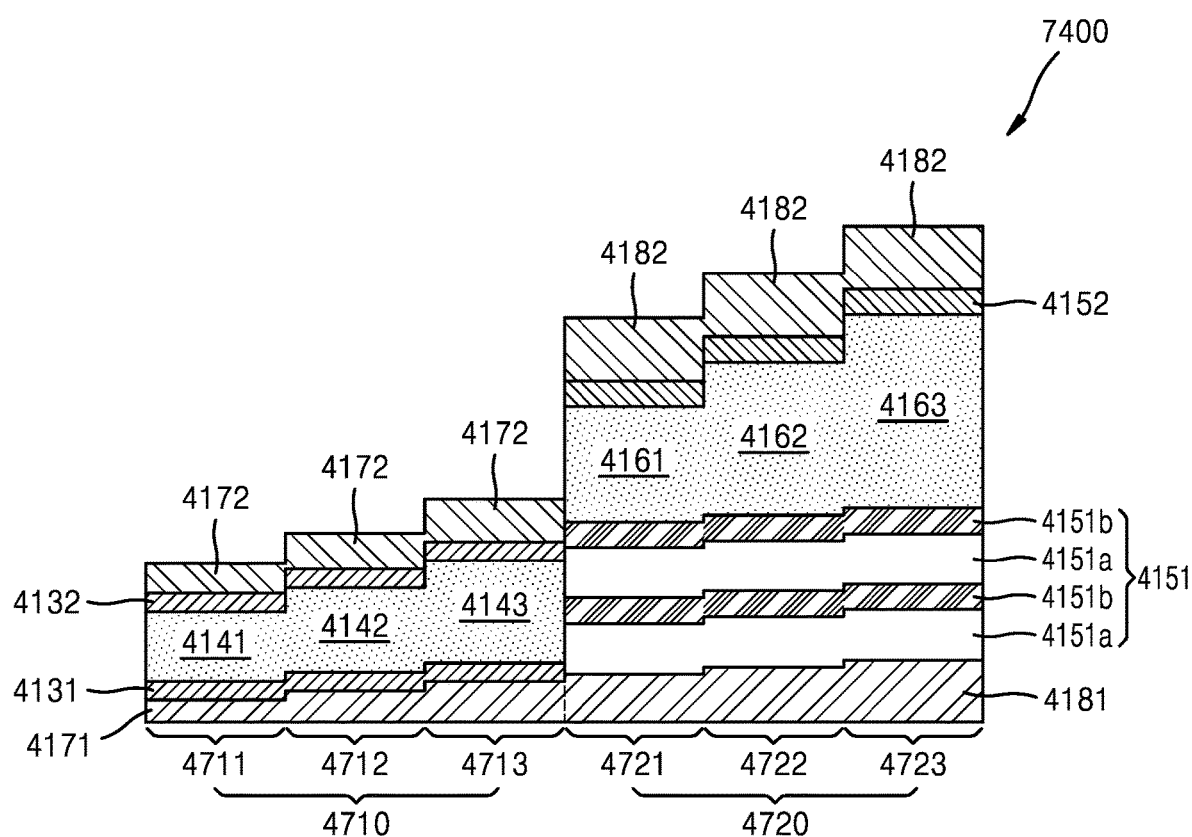
FIG. 23 is a schematic cross-sectional view of a spectral filter according to another example embodiment.

FIG. 23 is a schematic cross-sectional view of a spectral filter 7400 according to another example embodiment.

With reference to FIG. 23, a first filter array 4710 may include at least one filter having a central wavelength in the first wavelength region, and a second filter array 4720 may include at least one filter having a central wavelength in the second wavelength region. FIG. 23 illustrates a case where the first filter array 4710 includes a first filter 4711, a second filter 4712, and a third filter 4713, and the second filter array 4720 includes a fourth filter 4721, a fifth filter 4722, and a sixth filter 4723.

Each of the first to third filters 4711, 4712, and 4713 may have a Fabry-Perot structure in which a cavity (i.e., a first cavity 4141, a second cavity 4142, or a third cavity 4143) is disposed between two first metal reflection layers 4131 and 4132 spaced apart from each other. A first dielectric layer 4171 and a second dielectric layer 4172 may respectively be further disposed below and above the first to third cavities 4141, 4142, and 4143. As the first metal reflection layers 4131 and 4132, the first to third cavities 4141, 4142, and 4143, and the first and second dielectric layers 4171 and 4172 are as described above with reference to FIG. 17, any redundant description thereon is omitted. Meanwhile, the first to third cavities 4141, 4142, and 4143 may have a structure similar to that of the first to third cavities 3141, 3142, and 3143 of FIG. 22, and the first dielectric layer 4171 and/or the second dielectric layer 4172 may have a structure similar to that of the first dielectric layer 2171 of FIG. 21.

Each of the fourth to sixth filters 4721, 4722, and 4723 may have a Fabry-Perot structure in which a cavity (i.e., a fourth cavity 4161, a fifth cavity 4162, or a sixth cavity 4163) is disposed between a Bragg reflection layer 4151 and a second metal reflection layer 4152 spaced apart from each other. A third dielectric layer 4181 and a fourth dielectric layer 4182 may respectively be further disposed below and above the fourth to sixth cavities 4161, 4162, and 4163. As the forth to sixth cavities 4161, 4162, and 4163 and the third and fourth dielectric layers 4181 and 4182 are as described above with reference to FIG. 17, any redundant description thereon is omitted. Meanwhile, the fourth to sixth cavities 4161, 4162, and 4163 may have a structure similar to that of the fourth to sixth cavities 3161, 3162, and 3163 of FIG. 22, and the third dielectric layer 4181 and/or the fourth dielectric layer 4182 may have a structure similar to that of the third dielectric layer 2181 of FIG. 21.

The Bragg reflection layer 4151 may be disposed below the fourth to sixth cavities 4161, 4162, and 4163. The Bragg reflection layer 4151 may be a DBR. The Bragg reflection layer 4151 may have a structure in which at least one first material layer 4151a and at least one second material layer 4151b, which have different refractive indexes, are alternately stacked. The first material layer 4151a or the second material layer 4151b may include, for example, silicon oxide, titanium oxide, silicon nitride, or silicon. However, this is only an example. Specifically, the first material layer 4151a may include silicon oxide, and the second material layer 4151b may include silicon.

When one of the first and second material layers 4151a and 4151b constituting the Bragg reflection layer 4151 includes, for example, a material (e.g., silicon, etc.) capable of absorbing light of the first wavelength region (e.g., light of short wavelength), the light of the first wavelength region may be prevented from passing through the fourth to sixth filters 4721, 4722, and 4723.

The second metal reflection layer 4152 may be disposed above the fourth to sixth cavities 4161, 4162, and 4163. When the first wavelength region is a short-wavelength region, and the second wavelength region is a long-wavelength region, the second metal reflection layers 4152 may include, for example, Cu, Ag, Au, Ti, W, TiN, etc.; however, the present disclosure is not limited thereto. The second metal reflection layer 4152 may further include poly-Si.

Figure 24:
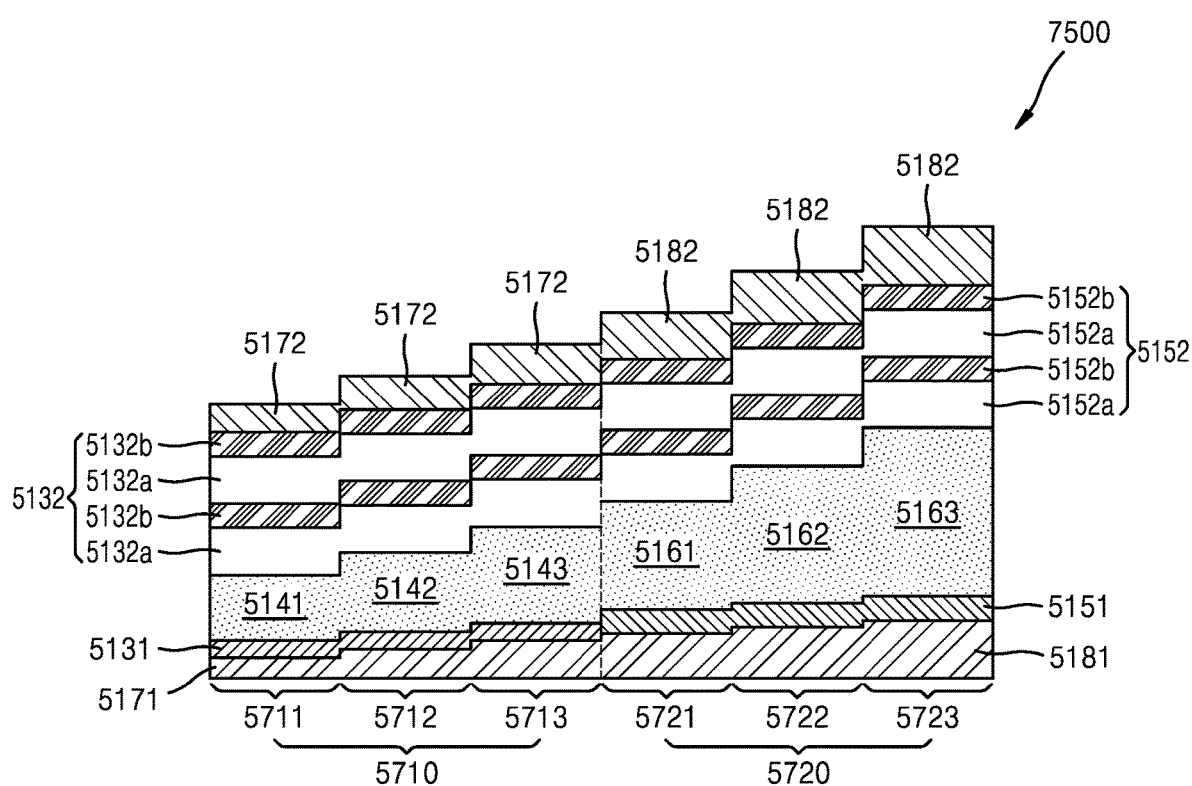
FIG. 24 is a schematic cross-sectional view of a spectral filter according to another example embodiment.

FIG. 24 is a schematic cross-sectional view of a spectral filter 7500 according to another example embodiment.

With reference to FIG. 24, a first filter array 5710 may include at least one filter having a central wavelength in the first wavelength region, and a second filter array 5720 may include at least one filter having a central wavelength in the second wavelength region. FIG. 24 illustrates a case where the first filter array 5710 includes a first filter 5711, a second filter 5712, and a third filter 5713, and the second filter array 5720 includes a fourth filter 5721, a fifth filter 5722, and a sixth filter 5723.

Each of the first to third filters 5711, 5712, and 5713 may have a Fabry-Perot structure in which a cavity (i.e., a first cavity 5141, a second cavity 5142, or a third cavity 5143) is disposed between a first metal reflection layer 5131 and a first Bragg reflection layer 5132. Each of the fourth to sixth filters 5721, 5722, and 5723 may have a Fabry-Perot structure in which a fourth cavity 5161, a fifth cavity 5162, and a sixth cavity 5163 are disposed between a second metal reflection layer 5151 and a second Bragg reflection layer 5152.

When the first wavelength region is a short-wavelength region, and the second wavelength region is a long-wavelength region, the first metal reflection layer 5131 may include, for example, Al, Ag, Au, Ti, W, TiN, etc., and the second metal reflection layer 5151 may include, for example, Cu, Ag, Au, Ti, W, TiN, etc. The second metal reflection layer 4152 may further include poly-Si.

Each of the first and second Bragg reflection layers 5132 and 5152 may have a structure in which at least one material layer 5132a and 5152a and at least one second material layer 5132b and 5152b having different refractive indexes are stacked alternately. The first material layers 5132a and 5152a or the second material layers 5132b and 5152b may include, for example, silicon oxide, titanium oxide, silicon nitride, or silicon. However, this is only an example.

The first to third cavities 5141, 5142, and 5143 may have different thicknesses. Moreover, the first to third cavities 5141, 5142, and 5143 may have different effective refractive indexes as illustrated in FIG. 22. The fourth to sixth cavities 5161, 5162, and 5163 may have different thicknesses. Moreover, the fourth to sixth cavities 5161, 5162, and 5163 may have different effective refractive indexes as illustrated in FIG. 22.

A first dielectric layer 5171 and a second dielectric layer 5172 may respectively be further disposed below and above the first to third cavities 5141, 5142, and 5143. The first and second dielectric layers 5171 and 5172 are as described above with reference to FIG. 17. Meanwhile, the first dielectric layer 5171 and/or the second dielectric layer 5172 may have a structure similar to that of the first dielectric layer 2171 of FIG. 21.

A third dielectric layer 5181 and a fourth dielectric layer 5182 may respectively be further disposed below and above the fourth to sixth cavities 5161, 5162, and 5163. The third and fourth dielectric layers 5181 and 5182 are as described above with reference to FIG. 17. Meanwhile, the third dielectric layer 5181 and/or the fourth dielectric layer 5182 may have a structure similar to that of the third dielectric layer 2181 of FIG. 21.

The foregoing embodiments illustrate a case where the first metal reflection layer 5131 and the first Bragg reflection layer 5132 are respectively disposed below and above the first to third cavities 5141, 5142, and 5143, and the second metal reflection layer 5151 and the second Bragg reflection layer 5152 are respectively disposed below and above the fourth to sixth cavities 5161, 5162, and 5163. However, the present disclosure is not limited thereto, and the first Bragg reflection layer 5132 and the first metal reflection layer 5131 may respectively disposed below and above the first to third cavities 5141, 5142, and 5143, and the second Bragg reflection layer 5152 and the second metal reflection layer 5151 may respectively disposed below and above the fourth to sixth cavities 5161, 5162, and 5163.

Figure 25:
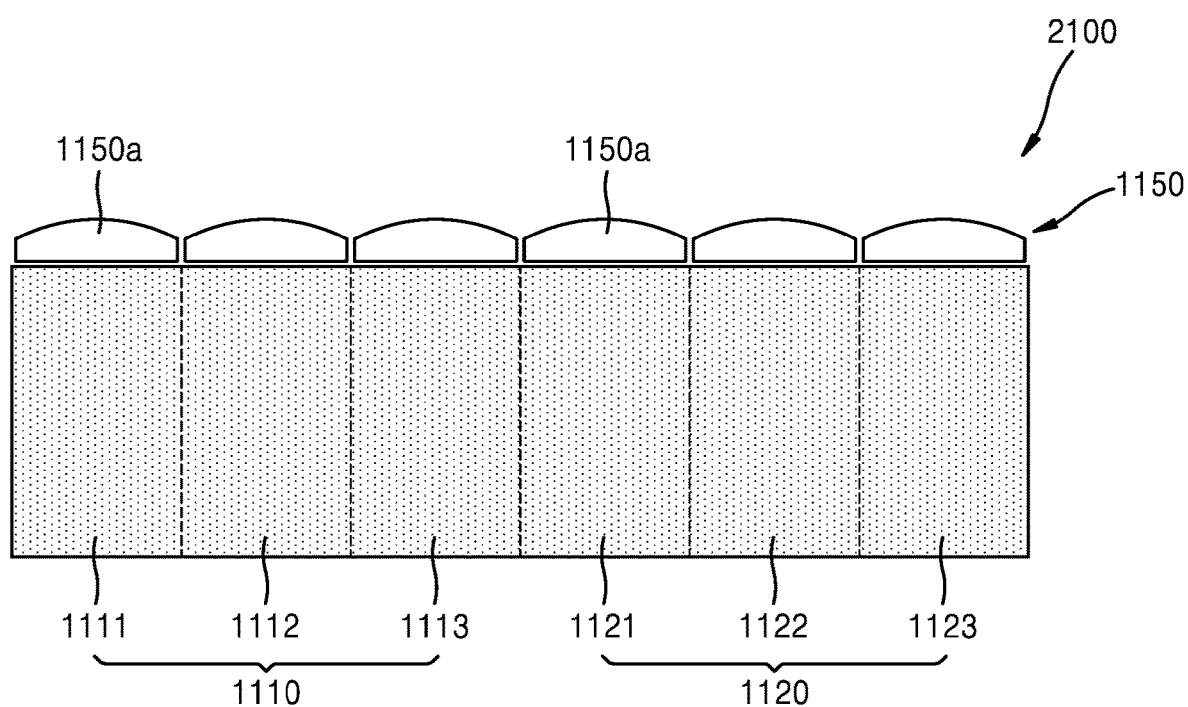
FIG. 25 is a schematic cross-sectional view of a spectral filter according to another example embodiment.

FIG. 25 is a schematic cross-sectional view of a spectral filter 2100 according to another example embodiment.

Referring to FIG. 25, the spectral filter 2100 may include a first filter array 1110, a second filter array 1120 and a microlens array 1150 provided on the first and second filter arrays 1110 and 1120. The first filter array 1110 may include a first filter 1111, a second filter 1112, and a third filter 1113 having a central wavelength in the first wavelength region, and the second filter array 1120 may include a fourth filter 1121, a fifth filter 1122, and a sixth filter 1123 having a central wavelengths of the second wavelength region.

The first filter array 1110 may be any one of the first filter arrays 110 to 1010 and 1710 to 5710 described above, and the second filter array 1120 may be any one of the second filter arrays 120 to 1020 and 1720 to 5720 described above. The descriptions of the first and second filter arrays 1110 and 1120 are omitted.

The microlens array 1150 including a plurality of microlenses 1150a may be provided above the first and second filter arrays 1110 and 1120. The microlenses 1150a may serve to focus external light to be incident on a corresponding filter among the first to sixth filters 1111, 1112, 1113, 1121, 1122, and 1123.

FIG. 25 illustrates a case where the microlenses 1150a are provided to have a one-to-one correspondence with the first to sixth filters 1111, 1112, 1113, 1121, 1122, and 1123. However, this is merely exemplary, and multiple filters from the first to sixth filters 1111, 1112, 1113, 1121, 1122, and 1123 may be provided in correspondence with one microlens 1150a.

Figure 26:
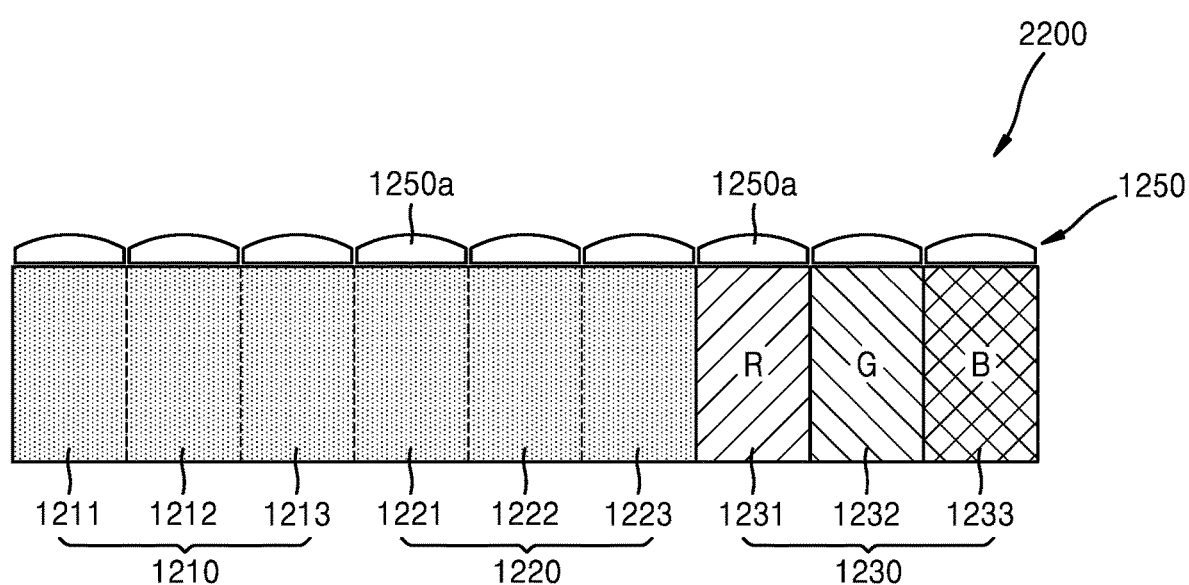
FIG. 26 is a schematic cross-sectional view of a spectral filter according to another example embodiment.

FIG. 26 is a schematic cross-sectional view of a spectral filter 2200 according to another example embodiment.

With reference to FIG. 26, the spectral filter 2200 may include a first filter array 1210, a second filter array 1220, and a color filter array 1230. The first and second filter arrays 1210 and 1220 and the color filter array 1230 may be disposed on substantially the same plane.

The first filter array 1210 may include a first filter 1211, a second filter 1212, and a third filter 1213 having a central wavelength in the first wavelength region, and the second filter array 1220 may include a fourth filter 1221, a fifth filter 1222, and a sixth filter 1223 having a central wavelength in the second wavelength region. The first filter array 1210 may be any one of the first filter arrays 110 to 1010 and 1710 to 5710 described above, and the second filter array 1220 may be any one of the second filter arrays 120 to 1020 and 1720 to 5720 described above. The descriptions of the first and second filter arrays 1210 and 1220 are omitted.

The color filter array 1230 may include, for example, a red color filter 1231, a green color filter 1232, and a blue color filter 1233. The red color filter 1231 may transmit red light having a wavelength band of about 600 nm to about 700 nm, the green color filter 1232 may transmit green light having a wavelength band of about 500 nm to about 600 nm, and the blue color filter 1233 may transmit blue light having a wavelength band of about 400 nm to about 500 nm. For example, typical color filters applied to color display devices such as liquid crystal display devices, organic light-emitting display devices, etc. may be used as the red, green and blue color filters 1231, 1232, and 1233. A microlens array 1250 including a plurality of microlenses 1250a may be further provided above the first and second filter arrays 1210 and 1220 and the color filter array 1230.

According to an embodiment, not only information about central wavelengths of the first to sixth filters 1211, 1212, 1213, 1221, 1222, and 1223 may be obtained by using the first and second filter arrays 1210 and 1220, but also information about wavelengths of the red, green, and blue light may be additionally obtained by using the color filter array 1230.

Figure 27:
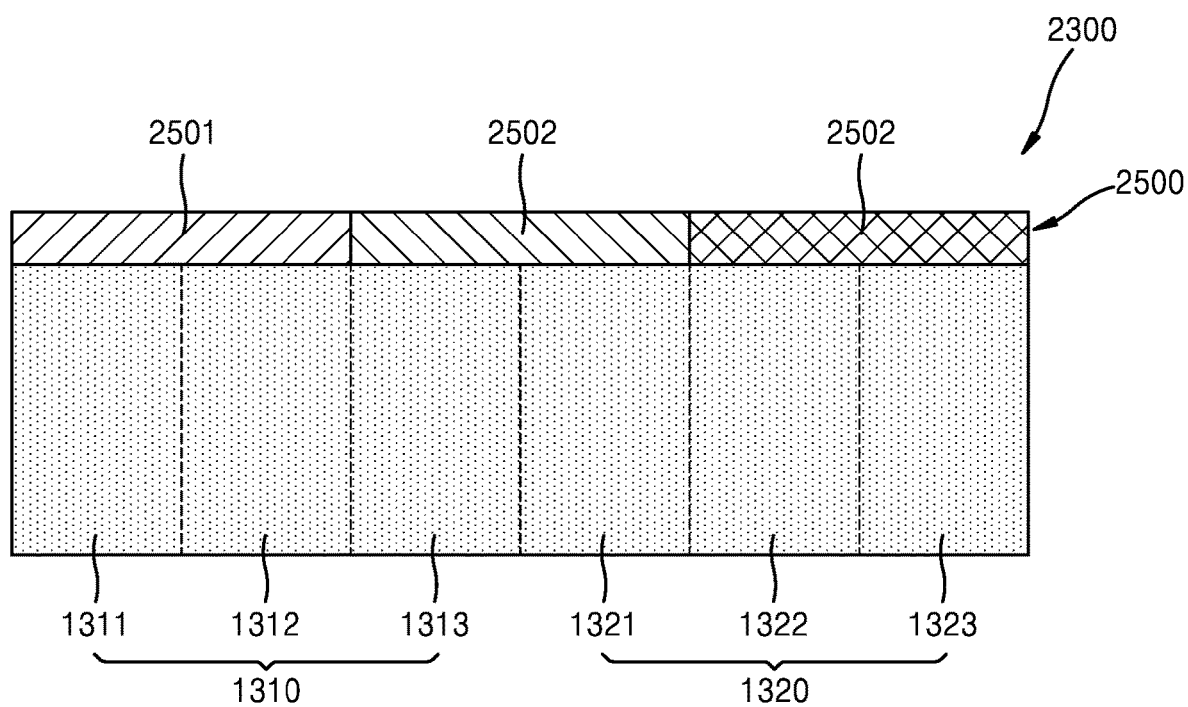
FIG. 27 is a schematic cross-sectional view of a spectral filter according to another example embodiment.

FIG. 27 is a schematic cross-sectional view of a spectral filter 2300 according to another example embodiment.

With reference to FIG. 27, the spectral filter 2300 may include a first filter array 1310, a second filter array 1320 and an additional filter array 2500 provided on the first and second filter arrays 1310 and 1320. The first filter array 1310 may include a first filter 1311, a second filter 1312, and a third filter 1313 having a central wavelength in the first wavelength region, and the second filter array 1320 may include a fourth filter 1321, a fifth filter 1322, and a sixth filter 1323 having a central wavelength in the second wavelength region.

The first filter array 1310 may be any one of the first filter arrays 110 to 1010 and 1710 to 5710 described above, and the second filter array 1320 may be any one of the second filter arrays 120 to 1020 and 1720 to 5720 described above. The descriptions of the first and second filter arrays 1310 and 1320 are omitted.

The additional filter array 2500 may include a plurality of additional filter arrays (i.e., a first additional filter 2501, a second additional filter 2502, and a third additional filter 2503). FIG. 27 illustrates a case where the first additional filter 2501 is provided to correspond to the first and second filters 1311 and 1312, the second additional filter 2502 is provided to correspond to the third and fourth filters 1313 and 1321, and the third additional filter 2503 is provided to correspond to the fifth and sixth filters 1322 and 1323. However, this is merely exemplary, and each of the first to third additional filters 2501, 2502, and 2503 may be provided to correspond to one of the first to sixth filters 1311, 1312, 1313, 1321, 1322, and 1323 or three or more of the first to sixth filters 1311, 1312, 1313, 1321, 1322, and 1323.

Each of the first to third additional filters 2501, 2502, and 2503 may block light of a wavelength band that a corresponding filter from the first to sixth filters 1311, 1312, 1313, 1321, 1322, and 1323 does not substantially pass. For example, when the first and second filters 1311 and 1312 have central wavelengths in a wavelength band of about 400 nm to about 500 nm, the first additional filter 2501 may be a blue filter that transmits blue light. Furthermore, when the third and fourth filters 1313 and 1321 have central wavelengths in a wavelength band of about 500 nm to about 600 nm, the second additional filter 2502 may be a green filter that transmits green light. When the fifth and sixth filters 1322 and 1323 have central wavelengths in a wavelength band of about 600 nm to about 700 nm, the third additional filter 2503 may be a red filter that transmits red light.

The additional filter array 2500 may be a color filter array. In this case, the first to third additional filters 2501, 2502, and 2503 may respectively be blue, green, and red color filters. For example, typical color filters applied to color display apparatuses such as liquid crystal display apparatuses, organic light-emitting display apparatuses, etc. may be used as the blue, green, and red color filters.

The additional filter array 2500 may be a broadband filter array. In this case, the first to third additional filters 2501, 2502, and 2503 may respectively include first, second, and third broadband filters. Each of the first to third broadband filters may have, for example, a multi-cavity structure or a metal mirror structure.

Figure 28:
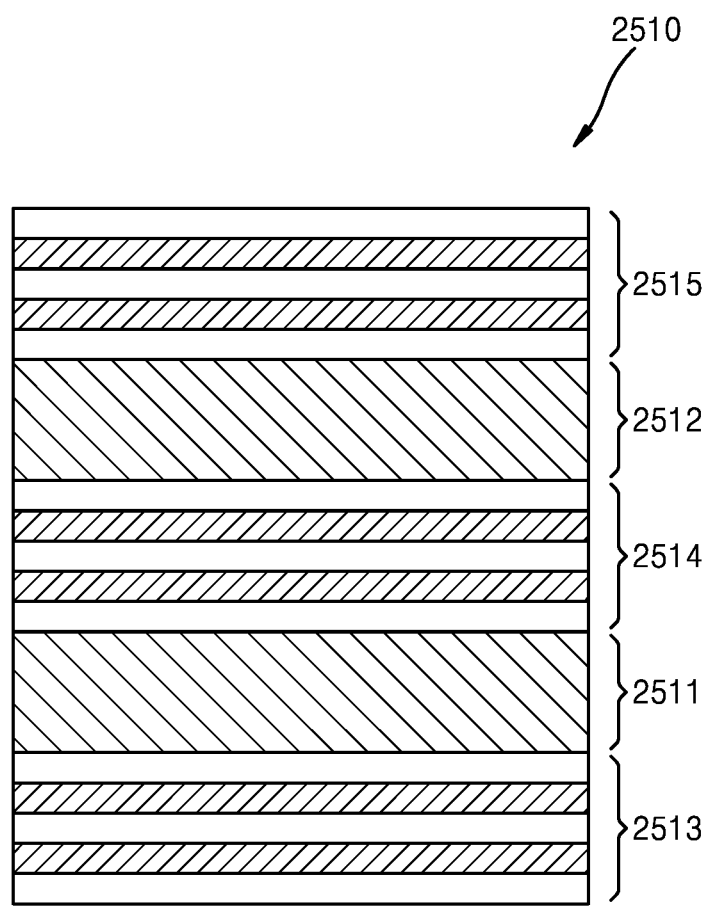
FIG. 28 is a diagram of an example of a broadband filter usable as the additional filter of FIG. 27.

FIG. 28 is a diagram of another example of a broadband filter 2510 usable as the first to third additional filter 2501, 2502, and 2503 of FIG. 27.

With reference to FIG. 28, the broadband filter 2510 may include a plurality of reflection layers 2513, 2514, and 2515 spaced apart from each other and a plurality of cavities 2511 and 2512 disposed between the plurality of reflection layers 2513, 2514, and 2515. FIG. 28 illustrates three reflection layers 2513, 2514, and 2515 and two cavities 2511 and 2512; however, the numbers of the reflection layers 2513, 2514, and 2515 and the cavities 2511 and 2512 may vary.

Each of the reflection layers 2513, 2514, and 2515 may be a DBR. Each of the reflection layers 2513, 2514, and 2515 may have a structure in which a plurality of material layers having different refractive indexes are stacked alternately. Furthermore, each of the cavities 2511 and 2512 may include a material having a certain refractive index, or two or more materials having different refractive indexes.

Figure 29:
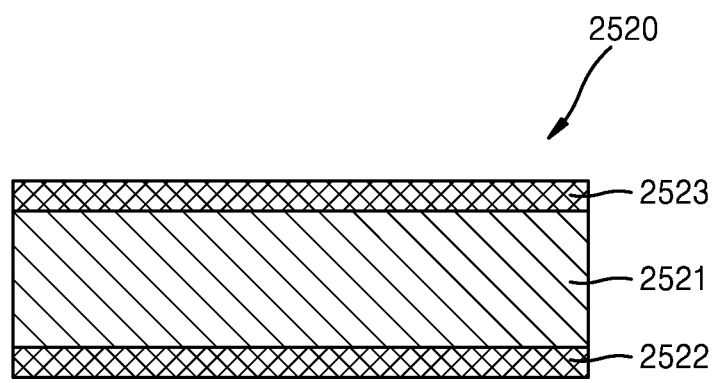
FIG. 29 is a diagram of another example of a broadband filter usable as the additional filter of FIG. 27.

FIG. 29 is a diagram of another example of a broadband filter 2520 usable as the first to third additional filter 2501, 2502, or 2503 of FIG. 27.

With reference to FIG. 29, the broadband filter 2520 may include two metal mirror layers 2522 and 2523 spaced apart from each other, and a cavity 2521 disposed between the metal mirror layers 2522 and 2523.

Figure 30:
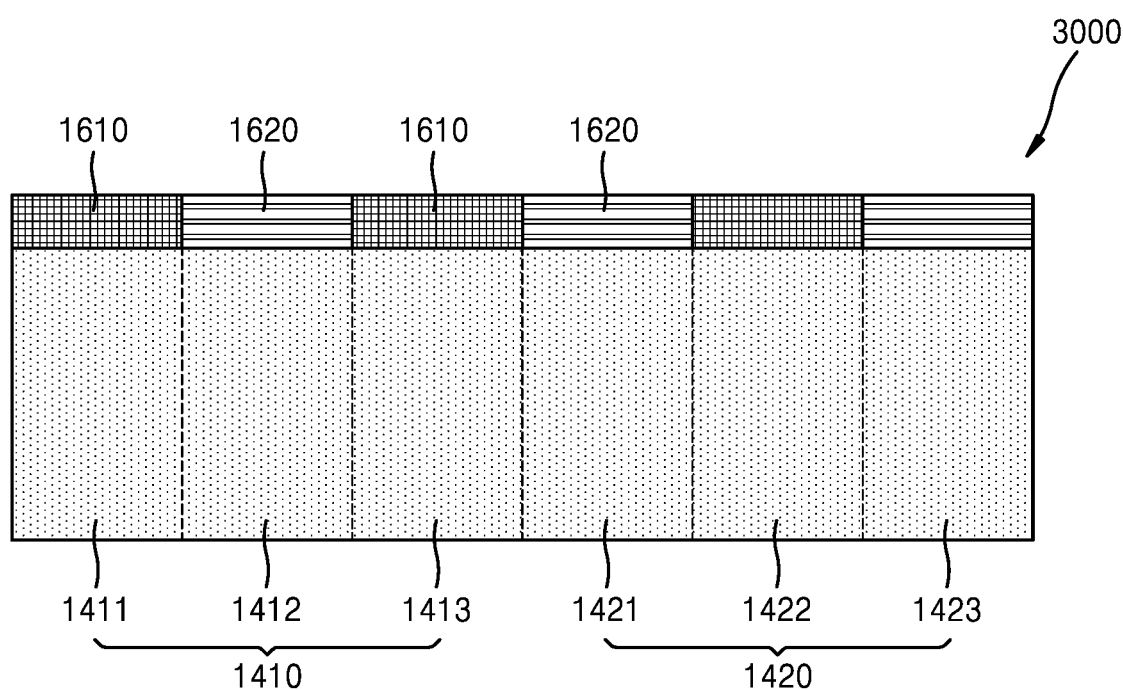
FIG. 30 is a schematic cross-sectional view of a spectral filter according to another example embodiment.

FIG. 30 is a schematic cross-sectional view of a spectral filter 3000 according to another example embodiment.

Referring to FIG. 30, the spectral filter 3000 may include a first filter array 1410, a second filter array 1420, a short-wavelength absorption filter 1610, and a long-wavelength cut-off filter 1620 provided on the first and second filter arrays 1410 and 1420.

The first filter array 1410 may include a first filter 1411, a second filter 1412, and a third filter 1413 having a central wavelength in the first wavelength region, and the second filter array 1420 may include a fourth filter 1421, a fifth filter 1422, and a sixth filter 1423 having a central wavelength in the second wavelength region.

The first filter array 1410 may be any one of the first filter arrays 110 to 1010 described above, and the second filter array 1420 may be any one of the second filter arrays 120 to 1020 described above. The descriptions of the first and second filter arrays 1410 and 1420 are omitted.

The short-wavelength absorption filter 1610 may be provided in some filters (i.e., the first, third, and fifth filters 1411, 1413, and 1422) of the first to sixth filters 1411, 1412, 1413, 1421, 1422, and 1423, and the long-wavelength cut-off filter 1620 may be provided in the other filters (i.e., the second, fourth, and sixth filters 1412, 1421, and 1423) of the first to sixth filters 1411, 1412, 1413, 1421, 1422, and 1423. Although FIG. 30 illustrates a case where each of the short-wavelength absorption filter 1610 and the long-wavelength cut-off filter 1620 is provided to correspond to one of the first to sixth filter 1411, 1412, 1413, 1421, 1422, and 1423, the disclosure is not limited thereto, and each of the short-wavelength absorption filter 1610 and the long-wavelength cut-off filter 1620 may be provided to correspond to two or more of the first to sixth filters 1411, 1412, 1413, 1421, 1422, and 1423.

The short-wavelength absorption filter 1610 may cut off, for example, light of a short wavelength such as visible light. The short-wavelength absorption filter 1610 may be manufactured by depositing, for example, silicon, which is a material capable of absorbing visible light, on some filters (i.e., the first, third, and fifth 1411, 1413, and 1422) of the first to sixth filters 1411, 1412, 1413, 1421, 1422, and 1423. The first, third, and fifth filters 1411, 1413, and 1422 including the short-wavelength absorption filter 1610 may transmit near infrared (NIR) light having a wavelength longer than that of the visible light.

The long-wavelength cut-off filter 1620 may cut off, for example, light having a long wavelength such as NIR light. The long-wavelength cut-off filter 1620 may include a NIR light cut-off filter. The second, fourth, and sixth filters 1412, 1421, and 1423 including the long-wavelength cut-off filter 1620 may transmit visible light having a wavelength shorter than that of NIR light.

According to an embodiment, as the short-wavelength absorption filter 1610 and the long-wavelength cut-off filter 1620 are provided on the first and second filter arrays 1410 and 1420, the spectral filter 3000 having the broadband characteristics capable of implementing a visible light band to an NIR band may be manufactured.

Figure 31:
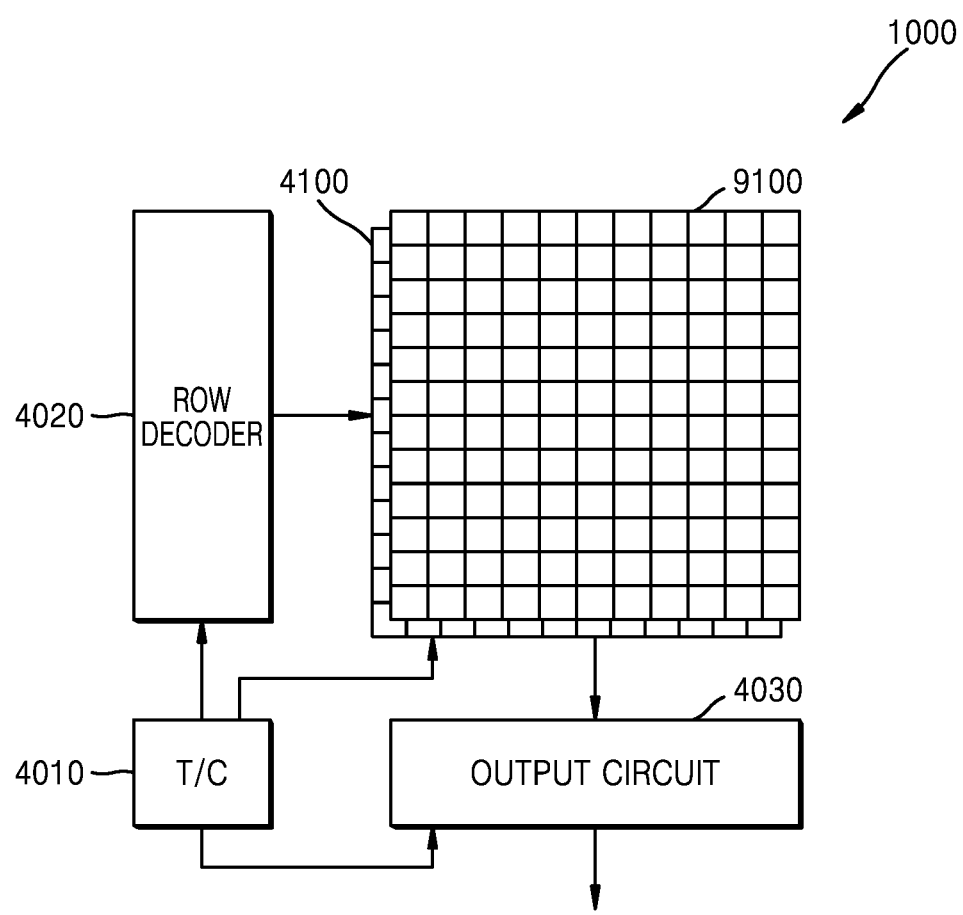
FIG. 31 is a block diagram of an image sensor according to an example embodiment.

FIG. 31 is a schematic block diagram of the image sensor 1000 according to an example embodiment.

With reference to FIG. 31, the image sensor 1000 may include a spectral filter 9100, a pixel array 4100, a timing controller 4010, a row decoder 4020, and an output circuit 4030. The spectral filter 9100 may include a plurality of filters transmitting light of different wavelength regions and disposed in a 2D manner. The pixel array 4100 may include a plurality of pixels that detect light of different wavelengths transmitted through the plurality of filters. In detail, the pixel array 4100 may include pixels disposed in a 2D manner along a plurality of rows and columns. The row decoder 4020 may select one of the rows of the pixel array 4100 in response to a row address signal output from the timing controller 4010. The output circuit 4030 may output a light detection signal in units of columns from the pixels disposed along a selected row. To this end, the output circuit 4030 may include a column decoder and an analog to digital converter (ADC). For example, the output circuit 4030 may include a plurality of ADCs disposed for each column between the column decoder and the pixel array 4100, or a single ADC disposed at an output end of the column decoder. The timing controller 4010, the row decoder 4020, and the output circuit 4030 may be implemented as a single chip or separate chips. A processor for processing an image signal output through the output circuit 4030 may be implemented as a single chip with the timing controller 4010, the row decoder 4020, and the output circuit 4030. The pixel array 4100 may include a plurality of pixels that detect light of different wavelengths, and the pixels may be disposed in various ways.

Figure 32:
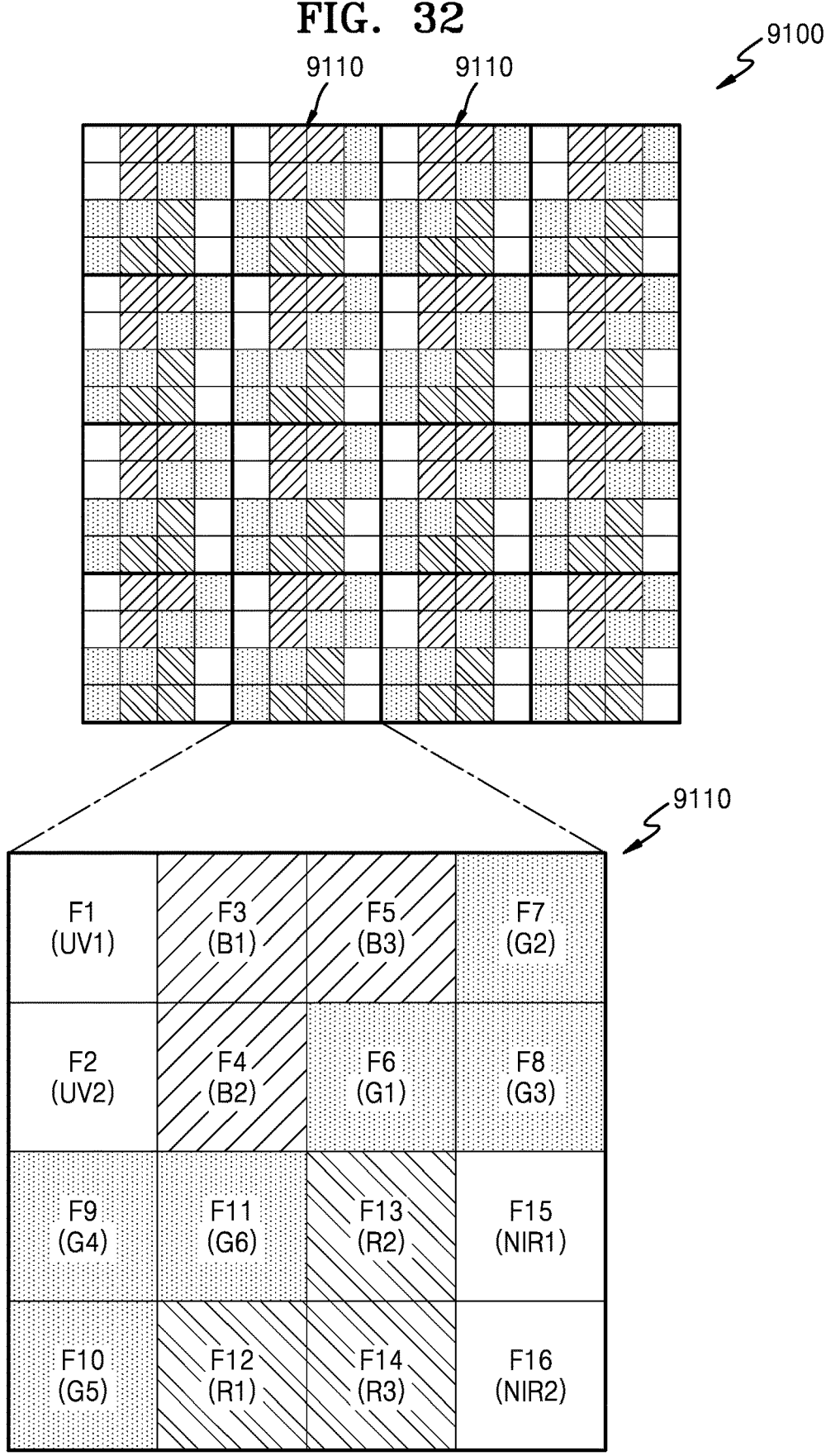
FIG. 32 is a plan view of an example of a spectral filter applicable to the image sensor of FIG. 31.

FIG. 32 is a plan view of an example of a spectral filter 9100 applicable to the image sensor 1000 of FIG. 31.

With reference to FIG. 32, the spectral filter 9100 may include a plurality of filter groups 9110 disposed in a 2D manner. Each of the filter groups 9110 may include sixteen filters (i.e., a first filter F1, a second filter F2, a third filter F3, a fourth filter F4, a fifth filter F5, a sixth filter F6, a seventh filter F7, an eighth filter F8, a ninth filter F9, a tenth filter F10, an eleventh filter F11, a twelfth filter F12, a thirteenth filter F13, a fourteenth filter F14, a fifteenth filter F15, and a sixteenth filter F16) disposed in a 4×4 array.

The first and second filters F1 and F2 may have central wavelengths UV1 and UV2 of an ultraviolet region, and the third to fifth filters F3 to F5 may have central wavelengths B1 to B3 of a blue light region. The sixth to eleventh filter F6 to F11 may have central wavelengths G1 to G6 of a green light region, and the twelfth to fourteenth filters F12 to F14 may have central wavelengths R1 to R3 of a red light region. The fifteenth and sixteenth filters F15 and F16 may have central wavelengths NIR1 and NIR2 in an NIR region.

Figure 33:
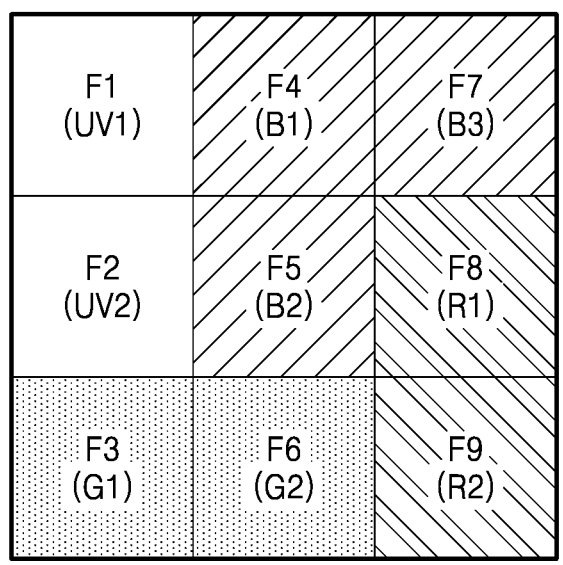
FIG. 33 is a plan view of another example of a spectral filter applicable to the image sensor of FIG. 31.

FIG. 33 is a plan view of another example of the spectral filter 9100 applicable to the image sensor of FIG. 31. FIG. 33 is a plan view of one filter group 9120, for convenience of explanation.

With reference to FIG. 33, each filter group 9120 may include nine filters (i.e., the first to ninth filters F1 to F9) disposed in a 3×3 array. The first and second filters F1 and F2 may have central wavelengths UV1 and UV2 of the ultraviolet region, and the fourth, fifth, and seventh filter F4, F5, and F7 may have central wavelengths B1 to B3 in the blue light region. The third and sixth filters F3 and F6 may have central wavelengths G1 and G2 in the green light region, and the eighth and ninth filters F8 and F9 may have central wavelengths R1 and R2 the red light region.

FIG. 34 is a plan view of another example of the spectral filter 9100 applicable to the image sensor of FIG. 31. FIG. 34 is a plan view of one filter group 9130, for convenience of explanation.

With reference to FIG. 34, each filter group 9130 may include twenty-five filters (i.e., the first to sixteenth filters F1 to F16, a seventeenth filter F17, an eighteenth filter F18, a nineteenth filter F19, a twentieth filter F20, a twenty-first filter F21, a twenty-second filter F22, a twenty-third filter F23, a twenty-fourth filter F24, and a twenty-fifth filter F25) disposed in a 5×5 array. The first to third filter F1 to F3 may have central wavelengths UV1 to UV3 of the ultraviolet region, and the sixth, seventh, eighth, eleventh, and twelfth filters F6, F7, F8, F11, and F12 may have central wavelengths B1 to B5 of the blue light region. The fourth, fifth, and ninth filters F4, F5, and F9 may have central wavelengths G1 to G3 of the green light region, and the tenth, thirteenth, fourteenth, fifteenth, eighteenth, and nineteenth filters F10, F13, F14, F15, F18, and F19 may have central wavelengths R1 to R6 of the red light region. The twentieth, twenty-third twenty-fourth, and twenty-fifth filters F20, F23, F24, and F25 may have central wavelengths NIR1 to NIR4 of the NIR region.

The image sensor 1000 having the above-described spectral filter may be employed in various high performance optical devices or high performance electronic devices. The electronic devices may include, for example, smartphones, mobile phones, cellular phones, personal digital assistants (PDAs), laptop computers, personal computers (PCs), various portable devices, home appliances, security cameras, medical cameras, automobiles, Internet of Things (IoT) devices, and other mobile or non-mobile computing devices, but the disclosure is not limited thereto.

The electronic devices may further include, in addition to the image sensor 1000, a processor for controlling an image sensor, for example, an application processor (AP), control a number of hardware or software constituent elements by driving operating systems or application programs through the processor, and perform various data processing and calculations. The processors may further include graphics processing units (GPUs) and/or image signal processors. When the processors include image signal processors, an image (or video) obtained through an image sensor may be stored and/or output using the processor.

Figure 35:
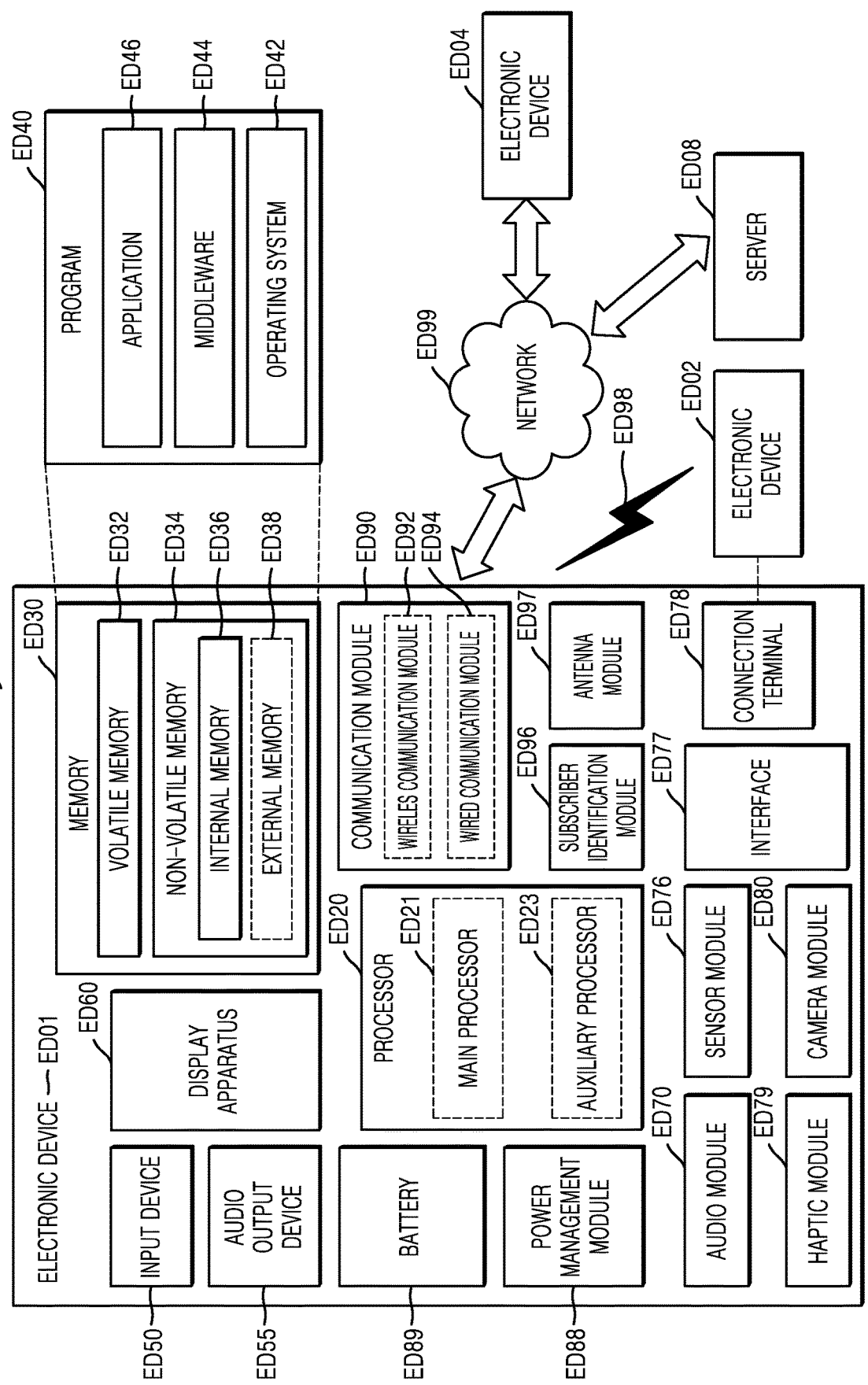
FIG. 35 is a schematic block diagram of an electronic device including an image sensor, according to example embodiments.

FIG. 35 is a schematic block diagram of an electronic device ED01 including the image sensor 1000. With reference to FIG. 35, in a network environment ED00, the electronic device ED01 may communicate with another electronic device ED02 through a first network ED98 (e.g., short-range wireless communication network, etc.), or communicate with another electronic device ED04 and/or a server ED08 through a second network ED99 (e.g., long-range wireless communication network, etc.) The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (e.g., the display device ED60, etc.) of constituent elements may be omitted or other constituent elements may be added. Some of the constituent elements may be implemented as one integrated circuit. For example, the sensor module ED76 (e.g., a fingerprint sensor, an iris sensor, an illuminance sensor, etc.) may be implemented by being embedded in the display device ED60 (e.g., a display, etc.) Furthermore, when the image sensor 1000 includes a spectral function, some functions (e.g., a color sensor and an illuminance sensor) of the sensor module ED76 may be implemented by the image sensor 1000, not by a separate sensor module.

The processor ED20 may control one or a plurality of other constituent elements (e.g., hardware and software constituent elements, etc.) of the electronic device ED01 connected to the processor ED20 by executing software (e.g., a program ED40, etc.), and perform various data processing or calculations. As a part of the data processing or calculations, the processor ED20 may load, in a volatile memory ED32, commands and/or data received from other constituent elements (e.g., the sensor module ED76, the communication module ED90, etc.), process the command and/or data stored in the volatile memory ED32, and store result data in a non-volatile memory ED34. The processor ED20 may include a main processor ED21 (e.g., a central processing unit, an application processor, etc.) and an auxiliary processor ED23 (e.g., a graphics processing unit, an image signal processor, a sensor hub processor, a communication processor, etc.) that is operable independently of or together with the main processor ED21. The auxiliary processor ED23 may use less power than the main processor ED21 and may perform a specialized function.

Instead of the main processor ED21 when the main processor ED21 is in an inactive state (i.e., a sleep state), or with the main processor ED21 when the main processor ED21 is in an active state (i.e., an application execution state), the auxiliary processor ED23 may control functions and/or states related to some constituent elements (e.g., the display device ED60, the sensor module ED76, the communication module ED90, etc.) of the constituent elements of the electronic device ED01. The auxiliary processor ED23 (e.g., an image signal processor, a communication processor, etc.) may be implemented as a part of functionally related other constituent elements (e.g., the camera module ED80, the communication module ED90, etc.)

The memory ED30 may store various data needed by the constituent elements (e.g., the processor ED20, the sensor module ED76, etc.) of the electronic device ED01. The data may include, for example, software (e.g., the program ED40, etc.) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for constituent elements (e.g., the processor ED20, etc.) of the electronic device ED01, from the outside (e.g., a user, etc.) of the electronic device ED01. The input device ED50 may include a microphone, a mouse, a keyboard, and/or a digital pen (e.g., a stylus pen, etc.)

The audio output device ED55 may output an audio signal to the outside of the electronic device ED01. The audio output device ED55 may include a speaker and/or a receiver. The speaker may be used for general purposes such as multimedia playback or recording playback, and the receiver may be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (e.g., a pressure sensor, etc.) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (e.g., the electronic device ED02, etc.) connected to the audio output device ED55 and/or the electronic device ED01 in a wired or wireless manner.

The sensor module ED76 may detect an operation state (e.g., power, temperature, etc.) of the electronic device ED01, or an external environment state (e.g., a user state, etc.), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of specified protocols used for the electronic device ED01 to be connected to another electronic device (e.g., the electronic device ED02, etc.) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (e.g., the electronic device ED02, etc.) The connection terminal ED78 may include an HDMI connector, a USB connector, an SD card connector, and/or an audio connector (e.g., a headphone connector, etc.)

The haptic module ED79 may convert electrical signals into mechanical stimuli (e.g., vibrations, movements, etc.) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include a lens assembly including one or a plurality of lenses, the image sensor 1000 of FIG. 1, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a direct (wired) communication channel and/or a wireless communication channel between the electronic device ED01 and another electronic device (e.g., the electronic device ED02, the electronic device ED04, the server ED08, etc.), and support a communication through an established communication channel. The communication module ED90 may be operated independent of the processor ED20 (e.g., the application processor, etc.), and may include one or a plurality of communication processors supporting a wired communication and/or a wireless communication. The communication module ED90 may include a wireless communication module ED92 (e.g., a cellular communication module, a short-range wireless communication module, a global navigation satellite system (GNSS) communication module, etc.), and/or a wired communication module ED94 (e.g., a local area network (LAN) communication module, a power line communication module, etc.) Among the above communication modules, a corresponding communication module may communicate with another electronic device through the first network ED98 (e.g., a short-range communication network such as Bluetooth, WiFi Direct, or infrared data association (IrDA)) or the second network ED99 (e.g., a long-range communication network such as a cellular network, the Internet, or a computer network (LAN, WAN, etc.)) These various types of communication modules may be integrated into one constituent element (e.g., a single chip, etc.), or may be implemented as a plurality of separate constituent elements (e.g., multiple chips). The wireless communication module ED92 may verify and authenticate the electronic device ED01 in a communication network such as the first network ED98 and/or the second network ED99 by using subscriber information (e.g., an international mobile subscriber identifier (IMSI), etc.) stored in the subscriber identification module ED96.

The antenna module ED97 may transmit signals and/or power to the outside (e.g., another electronic device, etc.) or receive signals and/or power from the outside. An antenna may include an emitter formed in a conductive pattern on a substrate (e.g., a printed circuit board (PCB), etc.) The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (e.g., an RFIC, etc.) than the antenna may be included as a part of the antenna module ED97.

Some of the constituent elements may be connected to each other through a communication method between peripheral devices (e.g., a bus, general purpose input and output (GPIO), a serial peripheral interface (SPI), a mobile industry processor interface (MIPI), etc.) and may mutually exchange signals (e.g., commands, data, etc.)

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices ED02, ED04, and ED08. For example, when the electronic device ED01 needs to perform a function or service, the electronic device ED01 may request one or a plurality of electronic devices to perform a part or the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

Figure 36:
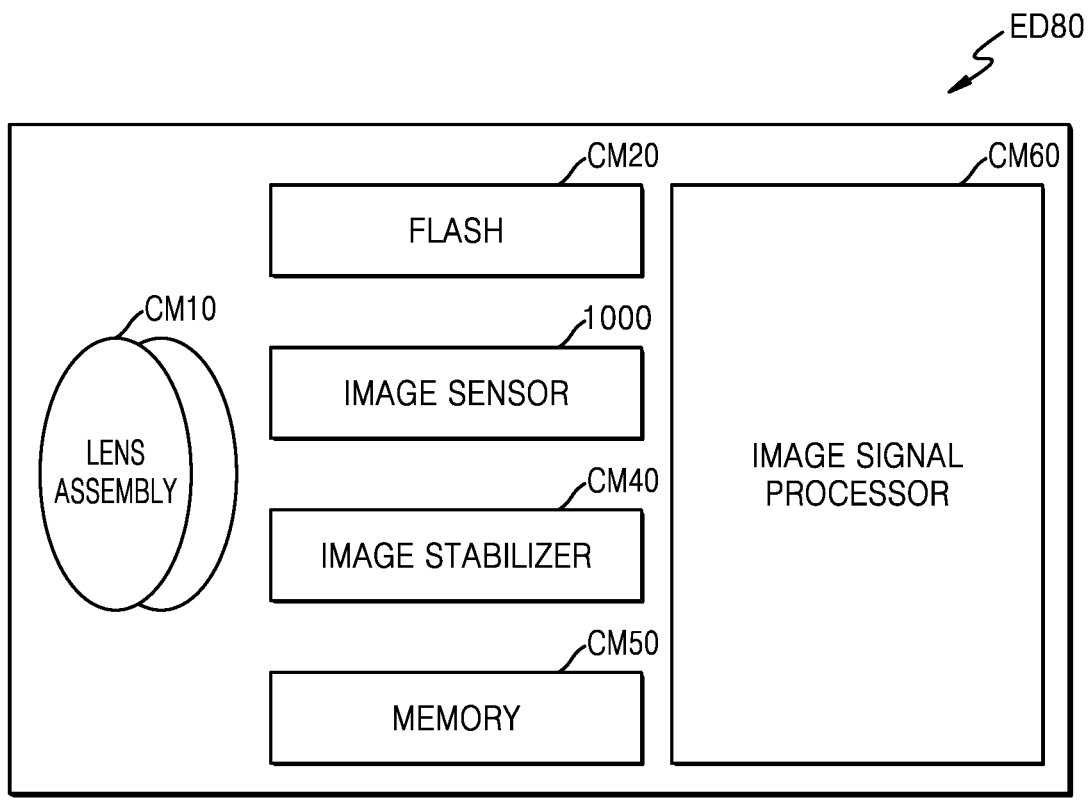
FIG. 36 is a schematic block diagram of the camera module of FIG. 35.

FIG. 36 is a schematic block diagram of the camera module ED80 of FIG. 35. With reference to FIG. 36, the camera module ED80 may include a lens assembly CM10, a flash CM20, the image sensor 1000 (e.g., the image sensor 1000 of FIG. 12, etc.), an image stabilizer CM40, a memory CM50 (e.g., a buffer memory, etc.), and/or an image signal processor CM60. The lens assembly CM10 may collect light emitted from a subject for image capturing. The camera module ED80 may include a plurality of lens assemblies CM10, and in this case, the camera module ED80 may be a dual camera, a 360 degrees camera, or a spherical camera. Some of the lens assemblies CM10 may have the same lens attributes (e.g., a viewing angle, a focal length, auto focus, F Number, optical zoom, etc.), or different lens attributes. The lens assembly CM10 may include a wide angle lens or a telescopic lens.

The flash CM20 may emit light used to reinforce light emitted or reflected from a subject. The flash CM20 may include one or a plurality of light-emitting diodes (e.g., a red-green-blue (RGB) LED, a white LED, an infrared LED, an ultraviolet LED, etc.), and/or a xenon lamp. The image sensor 1000 may include the image sensor of FIG. 1, and convert light emitted or reflected from the subject and transmitted through the lens assembly CM10 into electrical signals, thereby obtaining an image corresponding to the subject. The image sensor 1000 may include one or a plurality of sensors selected from image sensors having different attributes such as an RGB sensor, a black and white (BW) sensor, an IR sensor, or UV sensor. Each sensor included in the image sensor 1000 may be implemented by a charged-coupled device (CCD) sensor and/or a complementary metal oxide semiconductor (CMOS) sensor.

The image stabilizer CM40 may move, in response to a movement of the camera module ED80 or the electronic device ED01 including the same, one or a plurality of lenses included in the lens assembly CM10 or the image sensor 1000 in a particular direction or may compensate for a negative effect due to the movement by controlling (e.g., adjusting a read-out timing, etc.) the movement characteristics of the image sensor 1000. The image stabilizer CM40 may detect a movement of the camera module ED80 or the electronic device ED01 by using a gyro sensor (not shown) or an acceleration sensor (not shown) disposed inside or outside the camera module ED80. The image stabilizer CM40 may be implemented in an optical form.

The memory CM50 may store a part or entire data of an image obtained through the image sensor 1000 for a subsequent image processing operation. For example, when a plurality of images are obtained at high speed, only low resolution images are displayed while the obtained original data (e.g., Bayer-Patterned data, high resolution data, etc.) is stored in the memory CM50. Then, the memory CM50 may be used to transmit the original data of a selected (e.g., user selection, etc.) image to the image signal processor CM60. The memory CM50 may be incorporated into the memory ED30 of the electronic device ED01, or configured to be an independently operated separate memory.

The image signal processor CM60 may perform image processing on the image obtained through the image sensor 1000 or the image data stored in the memory CM50. The image processing may include depth map generation, three-dimensional modeling, panorama generation, feature point extraction, image synthesis, and/or image compensation (e.g., noise reduction, resolution adjustment, brightness adjustment, blurring, sharpening, softening, etc.) The image signal processor CM60 may perform control (e.g., exposure time control, or read-out timing control, etc.) on constituent elements (e.g., the image sensor 1000, etc.) included in the camera module ED80. The image processed by the image signal processor CM60 may be stored again in the memory CM50 for additional processing or provided to external constituent elements (e.g., the memory ED30, the display apparatus ED60, the electronic device ED02, the electronic device ED04, the server ED08, etc.) of the camera module ED80. The image signal processor CM60 may be incorporated into the processor ED20, or configured to be a separate processor operated independently of the processor ED20. When the image signal processor CM60 is configured to be a separate processor from the processor ED20, the image processed by the image signal processor CM60 may undergo additional image processing by the processor ED20 and then displayed through the display apparatus ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

Figure 37:
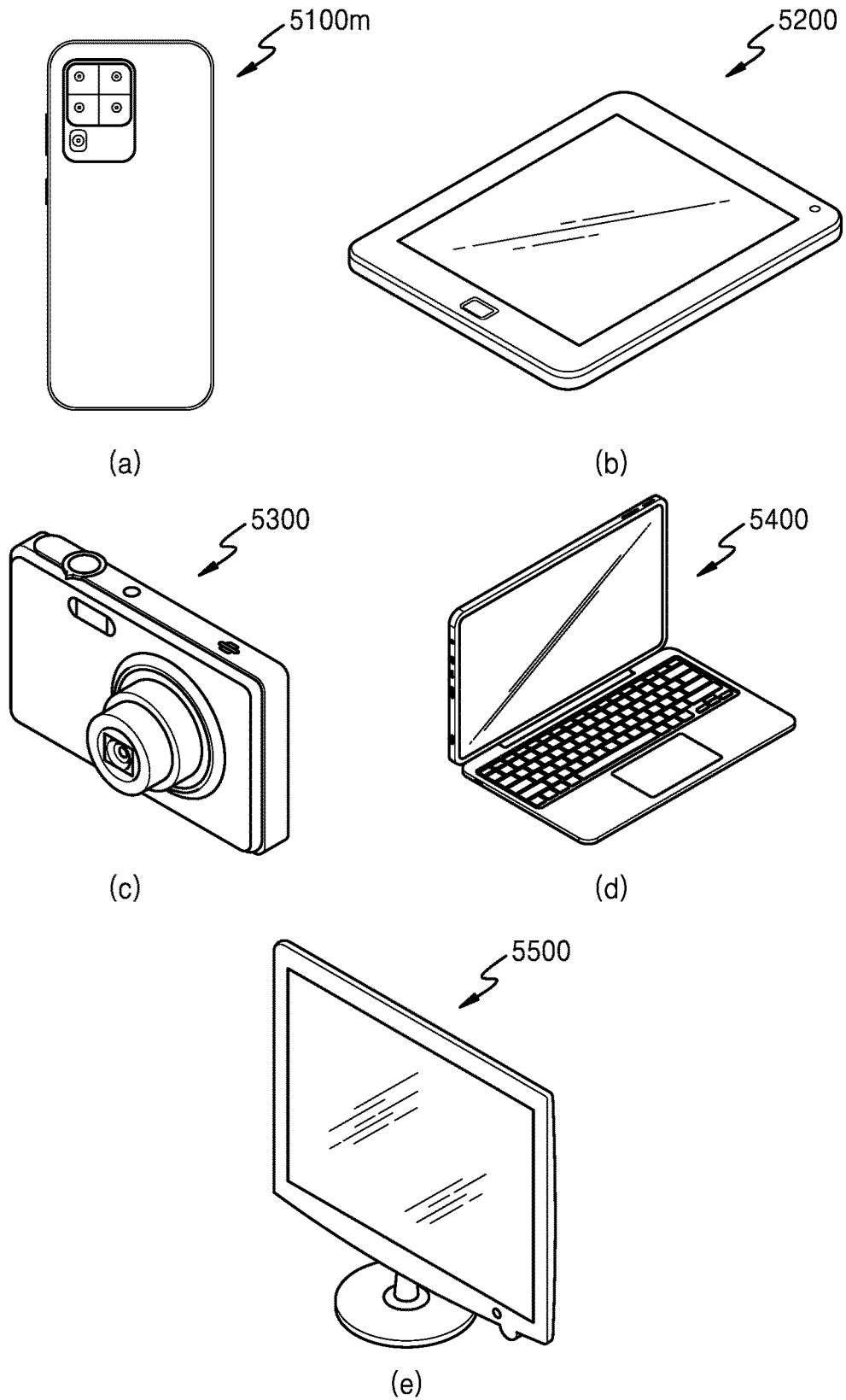
FIGS. 37 to 38 are diagrams of various examples of an electronic device to which image sensors are applied, according to example embodiments.

The image sensor 1000 according to embodiments may be applied to a mobile phone or smartphone 5100m illustrated in (a) of FIG. 37, a tablet or smart tablet 5200 illustrated in (b) of FIG. 37, a digital camera or camcorder 5300 illustrated in (c) of FIG. 37, a notebook computer 5400 illustrated in (d) of FIG. 37, a television or smart television 5500 illustrated in (e) of FIG. 37, etc. For example, the smartphone 5100m or the smart tablet 5200 may include a plurality of high resolution cameras, each having a high resolution image sensor mounted thereon. By using high resolution cameras, depth information of subjects in an image may be extracted, out-focusing of the image may be adjusted, or subjects in the image may be automatically identified.

Figure 38:
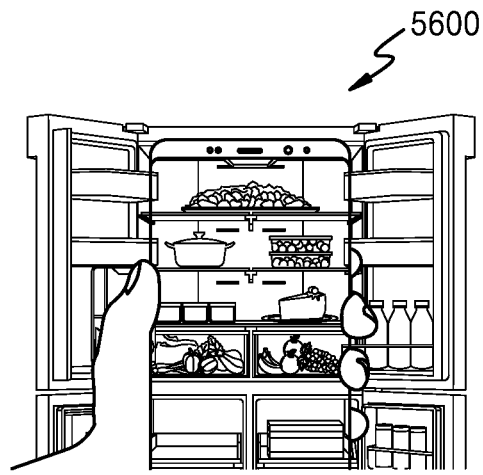
Figure 38:
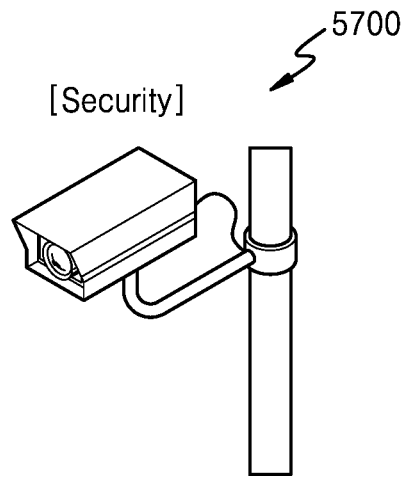
Figure 38:
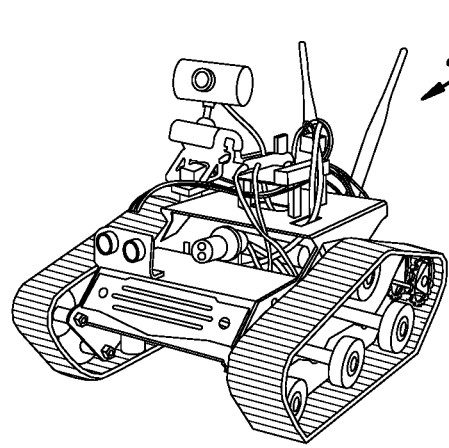
Figure 38:
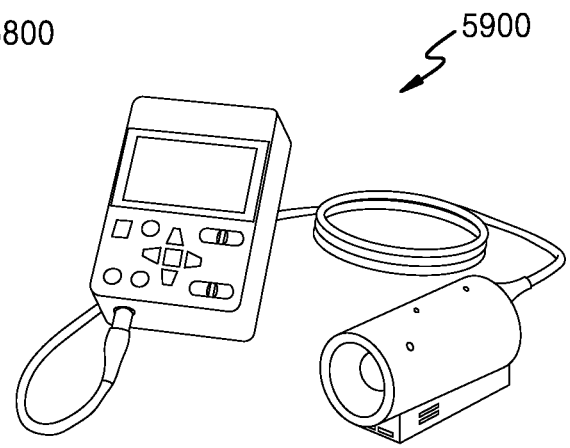
Figure 38:
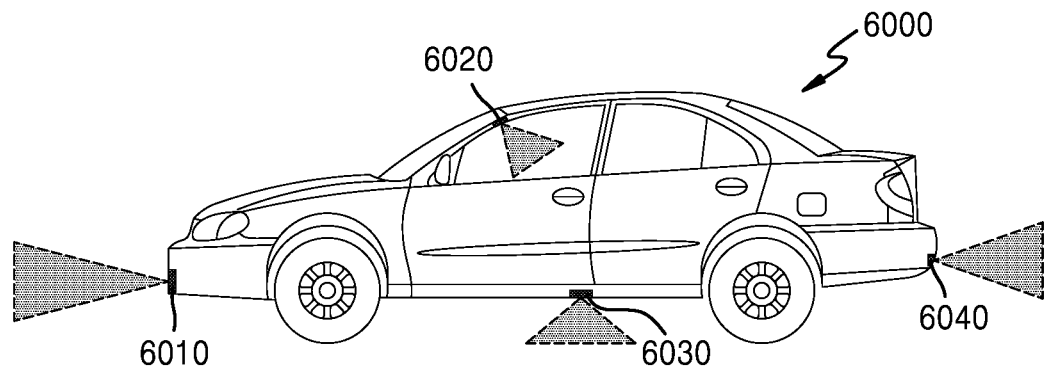

Furthermore, the image sensor 1000 may be applied to a smart refrigerator 5600 illustrated in (a) of FIG. 38, a security camera 5700 illustrated in (b) of FIG. 38, a robot 5800 illustrated in (c) of FIG. 38, a medical camera 5900 illustrated in (d) of FIG. 38, etc. For example, the smart refrigerator 5600 may automatically recognize food in a refrigerator, by using an image sensor, and notify a user of the presence of a particular food, the type of food that is input or output, etc., through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

Furthermore, the image sensor 1000 may be applied to a vehicle 6000 as illustrated in (e) of FIG. 38. The vehicle 6000 may include a plurality of vehicle cameras 6010, 6020, 6030, and 6040 disposed at various positions. Each of the vehicle cameras 6010, 6020, 6030, and 6040 may include an image sensor according to an embodiment. The vehicle 6000 may provide a driver with various pieces of information about the inside or periphery of the vehicle 6000, by using the vehicle cameras 6010, 6020, 6030, and 6040, and thus an object or a person in an image may be automatically recognized and information needed for autonomous driving may be provided.

According to an example embodiment, by arranging filters using a first metal reflection layer and filters using a second metal reflection layer on a plane, a spectral filter having broadband characteristics may be implemented. According to another example embodiment, by arranging filters using a metal reflection layer and filters using a Bragg reflection layer on a plane, a spectral filter having broadband characteristics may be implemented. According to another example embodiment, by arranging filters using a first metal reflection layer and filters using a second metal reflection layer and a Bragg reflection layer on a plane, a spectral filter having an improved transmittance may be implemented. According to another example embodiment, an image sensor including the aforementioned spectral filter and an electronic device including the image sensor may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spectral filter comprising:
   a first filter having a central wavelength in a first wavelength region; and
   a second filter having a central wavelength in a second wavelength region,
   wherein the first filter comprises:
      two first metal reflection layers vertically spaced apart from each other;
      a first cavity provided between the two first metal reflection layers; and
      a first dielectric layer and a second dielectric layer disposed below and above the first cavity, respectively, and
   the second filter comprises:
      a second metal reflection layer and a Bragg reflection layer vertically spaced apart from each other;
      a second cavity disposed between the second metal reflection layer and the Bragg reflection layer; and
      a third dielectric layer and a fourth dielectric layer disposed below and above the second cavity, respectively,
   wherein the second metal refection layer and the Bragg reflection layer are of different materials.

2. The spectral filter of claim 1, wherein the central wavelength in the first wavelength region is shorter than the central wavelength in the second wavelength region.

3. The spectral filter of claim 2, wherein the two first metal reflection layers comprise Al, Ag, Au, Ti, W, or TiN, and the second metal reflection layer comprises Cu, Ag, Au, Ti, W, or TiN.

4. The spectral filter of claim 2, wherein the second metal reflection layer further comprises poly-Si.

5. The spectral filter of claim 1, wherein the first metal reflection layer and the second metal reflection layer have a thickness of 10 nm to 80 nm.

6. The spectral filter of claim 1, wherein the two first metal reflection layers comprise Al, Ag, Au, Ti, W, or TiN, and the second metal reflection layer comprises Cu.

7. The spectral filter of claim 1, wherein the first filter further comprises a first filter array comprising a plurality of first filters having different central wavelengths, and the second filter further comprises a second filter array comprising a plurality of second filters having different central wavelengths.

8. The spectral filter of claim 1, wherein the central wavelength of the first filter is based on a thickness or an effective refractive index of the first cavity, and the central wavelength of the second filter is based on a thickness or an effective refractive index of the second cavity.

9. The spectral filter of claim 1, wherein each of the first, the second, the third, and the fourth dielectric layers has a single-layer or a multi-layer structure.

10. The spectral filter of claim 1, wherein a thickness or an effective refractive index of each of the first and second dielectric layers is based on the central wavelength of the first filter, and a thickness or an effective refractive index of each of the third and fourth dielectric layers is based on the central wavelength of the second filter.

11. The spectral filter of claim 1, further comprising a plurality of microlenses provided at the first filter and the one second filter.

12. The spectral filter of claim 1, further comprising a color filter disposed on a same plane as the first filter and the second filter.

13. The spectral filter of claim 1, further comprising an additional filter provided at the first filter and the second filter and configured to transmit a particular wavelength band.

14. The spectral filter of claim 13, wherein the additional filter comprises a color filter or a broadband filter.

15. The spectral filter of claim 1, wherein a short-wavelength absorption filter is provided at a part of the first filter and the second filter, and a long-wavelength cut-off filter is provided at another part of the first filter and the second filter.

16. An image sensor comprising:
a spectral filter; and
a pixel array receiving light transmitted through the spectral filter,
wherein the spectral filter comprises:
a first filter having a central wavelength in a first wavelength region; and
a second filter having a central wavelength in a second wavelength region,
wherein the first filter comprises:
a plurality of first metal reflection layers vertically spaced apart from each other; and
a first cavity provided between the plurality of first metal reflection layers, and
the second filter comprises:
a second metal reflection layer and a Bragg reflection layer vertically spaced apart from each other; and
a second cavity disposed between the second metal reflection layer and the Bragg reflection layer wherein the plurality of first metal reflection layers comprise Al, Ag, Au, Ti, W, or TiN, and the second metal reflection layer comprises Cu,
wherein the first filter further comprises a first dielectric layer and a second dielectric layer disposed below and above the first cavity, respectively, and the second filter further comprises a third dielectric layer and a fourth dielectric layer disposed below and above the second cavity, respectively, and
wherein the central wavelength of the first filter is based on a thickness or an effective refractive index of each of the first and the second dielectric layers, and the central wavelength of the second filter is based on a thickness or an effective refractive index of each of the third and the fourth dielectric layers.

17. The image sensor of claim 16, wherein the pixel array comprises a plurality of pixels, and each pixel of the plurality of pixels comprising a wiring layer including a driver circuit and a photodiode disposed at the wiring layer.

18. The image sensor of claim 16, wherein the central wavelength in the first wavelength region is shorter than the central wavelength in the second wavelength region.

19. The image sensor of claim 16, wherein the first filter further comprises a first filter array comprising a plurality of first filters having different central wavelengths, and the second filter further comprises a second filter array comprising a plurality of second filters having different central wavelengths.

20. The image sensor of claim 16, wherein the central wavelength of the first filter is based on a thickness or an effective refractive index of the first cavity, and the central wavelength of the second filter is based on a thickness or an effective refractive index of the second cavity.

21. The image sensor of claim 16, wherein the spectral filter further comprises a plurality of microlenses provided at the first filter and the second filter.

22. The image sensor of claim 16, wherein the spectral filter further comprises a color filter disposed on a same plane as the first filter and the second filter.

23. The image sensor of claim 16, wherein the spectral filter further comprises an additional filter provided at the first filter and the second filter and configured to transmit a particular wavelength band.

24. The image sensor of claim 16, further comprising a timing controller, a row decoder, and an output circuit.

25. An electronic device comprising the image sensor of claim 16.

26. The electronic device of claim 25, wherein the electronic device comprises a mobile phone, a smartphone, a tablet, a smart tablet, a digital camera, a camcorder, a notebook computer, a television, a smart television, a smart refrigerator, a security camera, a robot, or a medical camera.

* * * * *